United States Patent
Paul et al.

(10) Patent No.: US 12,542,862 B2
(45) Date of Patent: Feb. 3, 2026

(54) USER INTERFACES FOR MANAGING VISUAL CONTENT IN A MEDIA REPRESENTATION

(71) Applicant: Apple Inc., Cupertino, CA (US)

(72) Inventors: Grant R. Paul, San Francisco, CA (US); James N. Jones, San Francisco, CA (US); Johnnie B. Manzari, San Francisco, CA (US); Adrian Zumbrunnen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 18/167,625

(22) Filed: Feb. 10, 2023

(65) Prior Publication Data
US 2023/0319224 A1 Oct. 5, 2023

Related U.S. Application Data

(60) Provisional application No. 63/349,086, filed on Jun. 4, 2022, provisional application No. 63/318,678, filed on Mar. 10, 2022.

(51) Int. Cl.
*H04N 5/272* (2006.01)
*G06T 7/70* (2017.01)

(52) U.S. Cl.
CPC ............... *H04N 5/272* (2013.01); *G06T 7/70* (2017.01)

(58) Field of Classification Search
CPC ................................ G06T 7/70; H04N 5/272
See application file for complete search history.

(56) References Cited

U.S. PATENT DOCUMENTS

| | | |
|---|---|---|
| 7,542,971 B2 | 6/2009 | Thione et al. |
| 7,575,171 B2 | 8/2009 | Lev |
| 7,908,564 B2 | 3/2011 | Hara et al. |
| 8,286,102 B1 * | 10/2012 | Wilensky ............ G06F 3/04845 715/854 |
| 8,391,697 B2 | 3/2013 | Cho et al. |
| 9,075,520 B2 | 7/2015 | Park et al. |
| 9,332,182 B2 | 5/2016 | Nonaka et al. |

(Continued)

FOREIGN PATENT DOCUMENTS

| | | |
|---|---|---|
| CN | 101609505 A | 12/2009 |
| CN | 103677618 A | 3/2014 |

(Continued)

OTHER PUBLICATIONS

Galaxy S21 Ultra Tips for Editing Photos and Videos Jonathan Casey Feb. 12, 2021 https://www.youtube.com/watch?v=CuymTnn0ias (Year: 2021).*

(Continued)

*Primary Examiner* — Nicholas Augustine
(74) *Attorney, Agent, or Firm* — YHE Law LLP

(57) ABSTRACT

The present disclosure generally relates to managing media representations. In some embodiments, systems, methods, and user interfaces are provided for managing the background of a media representation, copying subjects of a media representation, converting one or more portions of a media representation, providing descriptions for one or more symbols in a media representation, and providing one or more animations for one or more detected objects and/or subjects.

47 Claims, 44 Drawing Sheets

(56) References Cited

U.S. PATENT DOCUMENTS

| | | |
|---|---|---|
| 9,350,924 B2 | 5/2016 | Posa |
| 9,541,407 B1 | 1/2017 | Mohler |
| 9,600,153 B2 | 3/2017 | Roh |
| 9,900,515 B2 | 2/2018 | Kim et al. |
| 9,996,976 B2 | 6/2018 | Zhou et al. |
| 10,444,975 B2 | 10/2019 | Murphy et al. |
| 10,488,218 B2 | 11/2019 | Kim et al. |
| 10,503,820 B2 | 12/2019 | Duggan et al. |
| 10,534,475 B2 | 1/2020 | Yoo et al. |
| 10,572,215 B1 | 2/2020 | Cooper et al. |
| 10,656,823 B2 | 5/2020 | Mukherjee et al. |
| 10,671,834 B2 | 6/2020 | Adato et al. |
| 10,748,345 B2 | 8/2020 | Zhou |
| 10,762,716 B1 | 9/2020 | Paul et al. |
| 10,882,613 B2 | 1/2021 | Sharma et al. |
| 10,891,800 B1 | 1/2021 | Stoyles et al. |
| 10,902,277 B2 * | 1/2021 | Agarwal ............ H04N 1/00681 |
| 10,929,443 B2 | 2/2021 | Grochocki et al. |
| 10,943,382 B2 | 3/2021 | Shapiro et al. |
| 11,107,219 B2 * | 8/2021 | Cohen ................. G06F 16/3344 |
| 11,112,963 B2 | 9/2021 | Chaudhri et al. |
| 11,223,728 B2 | 1/2022 | Kim et al. |
| 11,227,494 B1 | 1/2022 | Stoyles et al. |
| 11,231,832 B2 | 1/2022 | Yang et al. |
| 11,670,023 B2 * | 6/2023 | Xu .......................... G10L 15/16 |
| | | 382/156 |
| 12,001,642 B2 | 6/2024 | Paul et al. |
| 2004/0201720 A1 | 10/2004 | Robins et al. |
| 2005/0171926 A1 | 8/2005 | Thione et al. |
| 2007/0074133 A1 | 3/2007 | Hara et al. |
| 2007/0175998 A1 | 8/2007 | Lev |
| 2008/0253656 A1 | 10/2008 | Schwartzberg et al. |
| 2009/0313584 A1 | 12/2009 | Kerr et al. |
| 2010/0110108 A1 | 5/2010 | Alexandersson et al. |
| 2010/0208999 A1 | 8/2010 | Oh et al. |
| 2011/0076003 A1 | 3/2011 | Cho et al. |
| 2011/0257958 A1 | 10/2011 | Kildevaeld |
| 2013/0016042 A1 | 1/2013 | Makinen et al. |
| 2013/0093833 A1 | 4/2013 | Al-Asaaed et al. |
| 2013/0117025 A1 | 5/2013 | Park et al. |
| 2013/0194254 A1 * | 8/2013 | Miyoshi ................ G06T 15/005 |
| | | 345/419 |
| 2013/0212470 A1 | 8/2013 | Karunamuni et al. |
| 2014/0056475 A1 | 2/2014 | Jang et al. |
| 2014/0062962 A1 | 3/2014 | Jang et al. |
| 2014/0109004 A1 | 4/2014 | Sadhvani et al. |
| 2014/0117076 A1 | 5/2014 | Eberlein |
| 2014/0156412 A1 | 6/2014 | Tse |
| 2014/0168056 A1 | 6/2014 | Swaminathan et al. |
| 2014/0201023 A1 * | 7/2014 | Tang .................. G06Q 30/0621 |
| | | 705/26.8 |
| 2014/0267796 A1 | 9/2014 | Jang et al. |
| 2015/0268928 A1 | 9/2015 | Park et al. |
| 2016/0005189 A1 | 1/2016 | Gray et al. |
| 2016/0057363 A1 * | 2/2016 | Posa .................... H04N 1/2125 |
| | | 348/239 |
| 2016/0063339 A1 | 3/2016 | Kwon et al. |
| 2016/0188181 A1 | 6/2016 | Smith |
| 2016/0210602 A1 * | 7/2016 | Siddique ............. G06Q 20/321 |
| 2016/0301813 A1 * | 10/2016 | Swire ................. H04N 1/00145 |
| 2016/0316147 A1 | 10/2016 | Bernstein et al. |
| 2016/0378277 A1 | 12/2016 | Cho |
| 2016/0378311 A1 | 12/2016 | Kim et al. |
| 2017/0039765 A1 | 2/2017 | Zhou et al. |
| 2017/0052939 A1 | 2/2017 | Seol et al. |
| 2017/0090693 A1 | 3/2017 | Ku et al. |
| 2017/0134605 A1 | 5/2017 | Ju et al. |
| 2017/0336926 A1 | 11/2017 | Chaudhri et al. |
| 2017/0336960 A1 | 11/2017 | Chaudhri et al. |
| 2017/0365097 A1 | 12/2017 | Lim et al. |
| 2018/0066956 A1 | 3/2018 | Kim et al. |
| 2018/0284892 A1 | 10/2018 | Kwon et al. |
| 2018/0302568 A1 | 10/2018 | Kim et al. |
| 2018/0322076 A1 | 11/2018 | Prasad et al. |
| 2018/0349008 A1 * | 12/2018 | Manzari ............. G06F 3/04847 |
| 2018/0350144 A1 | 12/2018 | Rathod |
| 2019/0025999 A1 | 1/2019 | Murphy et al. |
| 2019/0080498 A1 * | 3/2019 | Horie .................... G06T 3/4053 |
| 2019/0084670 A1 | 3/2019 | Sharma et al. |
| 2019/0121522 A1 | 4/2019 | Davis et al. |
| 2019/0179423 A1 | 6/2019 | Rose et al. |
| 2019/0213212 A1 | 7/2019 | Adato et al. |
| 2019/0324546 A1 | 10/2019 | Lee et al. |
| 2019/0347144 A1 | 11/2019 | Chen et al. |
| 2020/0050906 A1 | 2/2020 | Mathai |
| 2020/0106965 A1 | 4/2020 | Malia et al. |
| 2020/0175975 A1 * | 6/2020 | Kong .................. G06F 3/04845 |
| 2020/0184478 A1 | 6/2020 | Peled et al. |
| 2020/0267267 A1 | 8/2020 | Kim et al. |
| 2020/0285379 A1 | 9/2020 | George-svahn |
| 2020/0302135 A1 | 9/2020 | Nirmala |
| 2020/0341610 A1 | 10/2020 | Quintana et al. |
| 2021/0027471 A1 * | 1/2021 | Cohen ....................... G06T 7/90 |
| 2021/0193187 A1 | 6/2021 | Phillips et al. |
| 2021/0208741 A1 | 7/2021 | Yang et al. |
| 2021/0227145 A1 | 7/2021 | Kasugai |
| 2021/0263962 A1 * | 8/2021 | Chang ..................... G06T 11/60 |
| 2021/0272253 A1 * | 9/2021 | Lin ....................... G06V 10/761 |
| 2021/0279409 A1 | 9/2021 | Karunamuni et al. |
| 2021/0389868 A1 | 12/2021 | Crowder |
| 2022/0070385 A1 * | 3/2022 | Van Os ................... H04N 23/62 |
| 2022/0078294 A1 | 3/2022 | Kim et al. |
| 2022/0138913 A1 * | 5/2022 | Huang .................. G06V 10/62 |
| | | 348/241 |
| 2022/0179665 A1 * | 6/2022 | Rathod ................... G06F 9/451 |
| 2022/0240408 A1 | 7/2022 | Faulkner et al. |
| 2022/0269887 A1 | 8/2022 | Chee et al. |
| 2022/0319493 A1 | 10/2022 | Ohishi et al. |
| 2022/0334683 A1 | 10/2022 | Paul et al. |
| 2022/0334693 A1 | 10/2022 | De Vries et al. |
| 2022/0337741 A1 | 10/2022 | Paul et al. |
| 2022/0377248 A1 | 11/2022 | Minifie et al. |
| 2022/0391603 A1 | 12/2022 | Pham et al. |
| 2023/0082876 A1 | 3/2023 | Guzman et al. |
| 2023/0136913 A1 * | 5/2023 | Zhao ......................... G06T 9/008 |
| | | 382/103 |
| 2023/0229279 A1 | 7/2023 | Paul et al. |
| 2023/0379427 A1 | 11/2023 | Manzari et al. |
| 2023/0393865 A1 | 12/2023 | Fleizach et al. |
| 2024/0078375 A1 | 3/2024 | Karunamuni et al. |
| 2024/0220009 A1 | 7/2024 | Dryer et al. |
| 2024/0256100 A1 | 8/2024 | Paul et al. |
| 2024/0406304 A1 | 12/2024 | Foss et al. |
| 2025/0093947 A1 | 3/2025 | Bedard et al. |
| 2025/0113095 A1 | 4/2025 | Alonso et al. |
| 2025/0238127 A1 | 7/2025 | Alonso et al. |
| 2025/0238128 A1 | 7/2025 | Manzari et al. |
| 2025/0238129 A1 | 7/2025 | Moussette et al. |
| 2025/0240516 A1 | 7/2025 | Zumbrunnen et al. |

FOREIGN PATENT DOCUMENTS

| | | |
|---|---|---|
| CN | 105654532 A | 6/2016 |
| CN | 111860479 A | 10/2020 |
| EP | 1826724 B1 | 3/2015 |
| EP | 3833002 A1 | 6/2021 |
| EP | 3958101 A1 | 2/2022 |
| JP | 2013-541107 A | 11/2013 |
| JP | 2015-228009 A | 12/2015 |
| JP | 2016-519377 A | 6/2016 |
| JP | 2017-513143 A | 5/2017 |
| JP | 2018-128955 A | 8/2018 |
| JP | 2020-57204 A | 4/2020 |
| KR | 10-2015-0135844 A | 12/2015 |
| WO | 2013/169849 A2 | 11/2013 |
| WO | 2014/159998 A1 | 10/2014 |
| WO | 2015/105649 A1 | 7/2015 |
| WO | 2019/054999 A1 | 3/2019 |

OTHER PUBLICATIONS

Intention to Grant received for European Patent Application No. 22720880.8, mailed on Sep. 30, 2024, 10 pages.

(56) References Cited

OTHER PUBLICATIONS

International Preliminary Report on Patentability received for PCT Patent Application No. PCT/US2023/014177, mailed on Sep. 19, 2024, 15 pages.
Applicant-Initiated Interview Summary received for U.S. Appl. No. 17/484,856, mailed on Apr. 24, 2023, 4 pages.
Applicant-Initiated Interview Summary received for U.S. Appl. No. 17/484,856, mailed on Oct. 25, 2023, 5 pages.
amazon.com, "Visual ID on Echo Show", Online Available at: <https://www.amazon.com/b?ie=UTF8&node=23615589011>, retrieved on Aug. 16, 2023, 3 pages.
Corrected Notice of Allowance received for U.S. Appl. No. 17/484,714, mailed on Dec. 5, 2023, 3 pages.
Corrected Notice of Allowance received for U.S. Appl. No. 17/547,065, mailed on May 1, 2023, 9 pages.
Examiner-Initiated Interview Summary received for U.S. Appl. No. 17/484,856, mailed on Sep. 6, 2023, 4 pages.
Final Office Action received for U.S. Appl. No. 17/484,856, mailed on Jun. 1, 2023. 31 pages.
Final Office Action received for U.S. Appl. No. 17/484,856, mailed on Nov. 16, 2023, 29 pages.
Han Sangwoo, "AR Glasses interaction prototype", Available Online at: https://sangwoohan.cargo.site/AR-Glasses-interaction-prototype, Oct. 2020, 4 pages.
International Preliminary Report on Patentability received for PCT Patent Application No. PCT/US2022/025096, mailed on Nov. 2, 2023, 14 pages.
International Search Report and Written Opinion received for PCT Patent Application No. PCT/US2022/044236, mailed on Mar. 27, 2023, 17 pages.
International Search Report and Written Opinion received for PCT Patent Application No. PCT/US2023/014177, mailed on Sep. 1, 2023, 21 pages.
Invitation to Pay Additional Fees and Partial International Search Report received for PCT Patent Application No. PCT/US2023/014177, mailed on Jul. 11, 2023, 13 pages.
Non-Final Office Action received for U.S. Appl. No. 17/484,714, mailed on Mar. 30, 2023. 19 pages.
Non-Final Office Action received for U.S. Appl. No. 17/484,856, mailed on Sep. 21, 2023, 32 pages.
Non-Final Office Action received for U.S. Appl. No. 18/125,070, mailed on Sep. 14, 2023, 13 pages.
Notice of Acceptance received for Australian Patent Application No. 2022261717, mailed on Dec. 20, 2023, 4 pages.
Notice of Allowance received for Korean Patent Application No. 10-2023-7033711, mailed on Nov. 29, 2023, 9 pages (2 pages of English Translation and 7 pages of Official Copy).
Notice of Allowance received for U.S. Appl. No. 17/484,714, mailed on May 30, 2023, 6 pages.
Notice of Allowance received for U.S. Appl. No. 17/484,714, mailed on Oct. 31, 2023, 7 pages.
Notice of Allowance received for U.S. Appl. No. 18/125,070, mailed on Feb. 6, 2024, 7 pages.
Office Action received for Australian Patent Application No. 2022261717, mailed on Nov. 6, 2023, 3 pages,.
International Preliminary Report on Patentability received for PCT Patent Application No. PCT/US2022/044236, mailed on Apr. 4, 2024, 12 pages.
Notice of Allowance received for U.S. Appl. No. 18/125,070, mailed on Apr. 23, 2024, 6 pages.
Apple Previews Powerful Software Updates Designed for People with Disabilities, Available online at: https://www.apple.com/newsroom/2021/05/apple-previews-powerful-software-updates-designed-for-people-with-disabilities/, May 19, 2021, 10 pages.
Applicant-Initiated Interview Summary received for U.S. Appl. No. 16/140,211, mailed on Feb. 13, 2020, 3 pages.
Applicant-Initiated Interview Summary received for U.S. Appl. No. 16/140,211, mailed on Sep. 3, 2020, 4 pages.
Applicant-Initiated Interview Summary received for U.S. Appl. No. 16/140,286, mailed on Feb. 20, 2020, 5 pages.
Applicant-Initiated Interview Summary received for U.S. Appl. No. 17/484,714, mailed on Apr. 28, 2022, 2 pages.
Applicant-Initiated Interview Summary received for U.S. Appl. No. 17/484,714, mailed on Nov. 10, 2022, 2 pages.
Applicant-Initiated Interview Summary received for U.S. Appl. No. 17/484,856, mailed on Jul. 27, 2022, 7 pages.
Applicant-Initiated Interview Summary received for U.S. Appl. No. 17/484,856, mailed on Mar. 10, 2022, 3 pages.
Decision on Appeal received for U.S. Appl. No. 16/140,211, mailed on Jul. 1, 2021, 8 pages.
Ex Parte Quayle Action received for U.S. Appl. No. 17/484,844, mailed on Sep. 8, 2022, 8 pages.
Examiner's Answer to Appeal Brief received for U.S. Appl. No. 16/140,211, mailed on Mar. 25, 2021, 21 pages.
Final Office Action received for U.S. Appl. No. 16/140,211, mailed on May 26, 2020, 22 pages.
Final Office Action received for U.S. Appl. No. 17/484,714, mailed on May 23, 2022, 22 pages.
Final Office Action received for U.S. Appl. No. 17/484,856, mailed on Mar. 30, 2022, 26 pages.
International Search Report and Written Opinion received for PCT Patent Application No. PCT/US2022/025096, mailed on Sep. 26, 2022, 19 pages.
Invitation to Pay Additional Fees received for PCT Patent Application No. PCT/US2022/025096, mailed on Aug. 1, 2022, 11 pages.
Non-Final Office Action received for U.S. Appl. No. 16/140,211, mailed on Oct. 3, 2019, 15 pages.
Non-Final Office Action received for U.S. Appl. No. 16/140,286, mailed on Oct. 3, 2019, 14 pages.
Non-Final Office Action received for U.S. Appl. No. 16/897,551, mailed on Jun. 25, 2020, 12 pages.
Non-Final Office Action received for U.S. Appl. No. 17/142,134, mailed on Jul. 22, 2021, 11 pages.
Non-Final Office Action received for U.S. Appl. No. 17/484,714, mailed on Dec. 1, 2021, 19 pages.
Non-Final Office Action received for U.S. Appl. No. 17/484,856, mailed on Dec. 8, 2021, 24 pages.
Non-Final Office Action received for U.S. Appl. No. 17/484,856, mailed on Feb. 22, 2023, 26 pages.
Notice of Allowance received for U.S. Appl. No. 16/140,211, mailed on Sep. 10, 2021, 10 pages.
Notice of Allowance received for U.S. Appl. No. 16/140,286, mailed on Mar. 12, 2020, 5 pages.
Notice of Allowance received for U.S. Appl. No. 16/897,551, mailed on Oct. 16, 2020, 5 pages.
Notice of Allowance received for U.S. Appl. No. 17/142,134, mailed on Jan. 4, 2022, 5 pages.
Notice of Allowance received for U.S. Appl. No. 17/484,844, mailed on Jan. 17, 2023, 10 pages.
Notice of Allowance received for U.S. Appl. No. 17/547,065, mailed on Feb. 16, 2023, 16 pages.
Supplemental Notice of Allowance received for U.S. Appl. No. 17/142,134, mailed on Jan. 12, 2022, 2 pages.
Text of 2nd CD Mixed and Augmented Reality (MAR) Reference Model, International Organisation for Standardisation Organisation Internationale De Normalisation, ISO/IEC JTC 1/SC 29/WG 11, Coding of Moving Pictures and Audio, Feb. 2016, 67 pages.
Stone Zeda, "Could AR Be the Unlikely Savior of Print?", Online available at: https://adage.com/article/digitalnext/ar-savior-print/308923, May 11, 2017, 4 pages.
Aprio Editorial Department, "[Line] Useful ways to use the OCR feature, and how to easily copy and translate text within images", Available online at: <https://appllio.com/line-how-to-use-ocr>, May 15, 2019, 14 pages (Official Copy Only) {See Communication Under Rule 37 CFR § 1.98(a) (3)}.
Office Action received for Chinese Patent Application No. 202311577936.6, mailed on May 23, 2024, 20 pages (10 pages of English Translation and 10 pages of Official Copy).
Smahoto.JP, "An application for capturing unreadable characters in books and signboards with a camera!", Available Online at: <https://www.kitamura.jp/smahoto/photolife/app/items/205.html>, Oct. 15, 2015, 8 pages (Official Copy Only) {See Communication Under Rule 37 CFR § 1.98(a) (3)}.

(56) References Cited

OTHER PUBLICATIONS

Takafumi, Yamazoe, "Development of character recognition technology that achieves highly accurate recognition", Technology Reports, NTT DOCOMO Technical Journal, vol. 20, No. 1. Telecommunications Association, Apr. 1, 2012, pp. 40-43 (Official Copy Only) {See Communication Under Rule 37 CFR § 1.98(a) (3)}.
Corrected Notice of Allowance received for U.S. Appl. No. 18/125,070, mailed on Apr. 29, 2024, 2 pages.
Notice of Allowance received for Japanese Patent Application No. 2023-560220, mailed on Mar. 1, 2024, 4 pages (1 page of English Translation and 3 pages of Official Copy).
Corrected Notice of Allowance received for U.S. Appl. No. 17/484,856, mailed on Nov. 6, 2024, 2 pages.
Notice of Allowance received for U.S. Appl. No. 17/484,856, mailed on Oct. 30, 2024, 9 pages.
Intention to Grant received for European Patent Application No. 22720880.8, mailed on Nov. 20, 2024, 11 pages.
Office Action received for Australian Patent Application No. 2024201515, mailed on Dec. 11, 2024, 3 pages.
Decision to Grant received for European Patent Application No. 22720880.8, mailed on Mar. 27, 2025, 4 pages.
International Search Report and Written Opinion received for PCT Patent Application No. PCT/US2024/043090, mailed on Jan. 28, 2025, 21 pages.
Invitation to Pay Additional Fees and Partial International Search Report received for PCT Patent Application No. PCT/US2024/043090, mailed on Dec. 4, 2024, 12 pages.
Non-Final Office Action received for U.S. Appl. No. 18/441,971, mailed on Apr. 10, 2025, 39 pages.
Notice of Allowance received for Chinese Patent Application No. 202311577936.6, mailed on Jan. 22, 2025, 4 pages (1 page of English Translation and 3 pages of Official Copy).
Notice of Allowance received for Japanese Patent Application No. 2024-049961, mailed on Apr. 7, 2025, 4 pages (1 page of English Translation and 3 pages of Official Copy).
Notice of Allowance received for U.S. Appl. No. 18/611,216, mailed on May 12, 2025, 8 pages.
Office Action received for Japanese Patent Application No. 2024-049961, mailed on Feb. 28, 2025, 8 pages (4 pages of English Translation and 4 pages of Official Copy).
Applicant-Initiated Interview Summary received for U.S. Appl. No. 18/441,971, mailed on Jul. 15, 2025, 4 pages.
Corrected Notice of Allowance received for U.S. Appl. No. 18/611,216, mailed on Jul. 31, 2025, 5 pages.
Corrected Notice of Allowance received for U.S. Appl. No. 18/611,216, mailed on Jun. 24, 2025, 2 pages.
Extended European Search Report received for European Patent Application No. 25164608.9, mailed on Jul. 4, 2025, 9 pages.
International Search Report and Written Opinion received for PCT Patent Application No. PCT/US2025/010440, mailed on Jul. 4, 2025, 20 pages.
Invitation to Pay Additional Fees and Partial International Search Report received for PCT Patent Application No. PCT/US2025/010440, maiied on May 13, 2025, 15 pages.
Non-Final Office Action received for U.S. Appl. No. 18/892,251, mailed on Jul. 11, 2025, 28 pages.
Notice of Allowance received for U.S. Appl. No. 18/441,971, mailed on Aug. 5, 2025, 11 pages.
Office Action received for Australian Patent Application No. 2024201515, mailed on May 28, 2025, 3 pages.
Corrected Notice of Allowance received for U.S. Appl. No. 18/441,971, mailed on Aug. 21, 2025, 2 pages.
Corrected Notice of Allowance received for U.S. Appl. No. 18/611,216, mailed on Aug. 11, 2025, 2 pages.

* cited by examiner

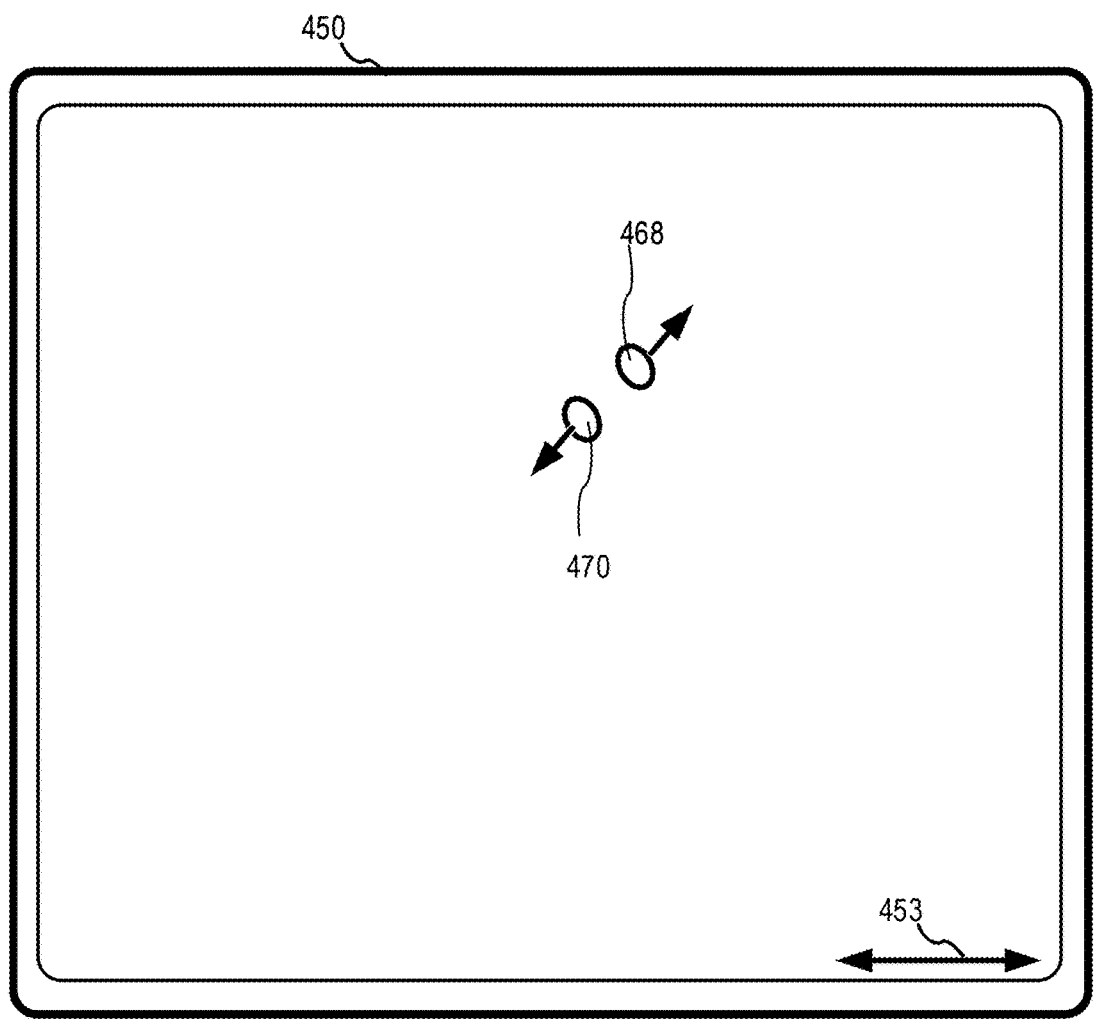
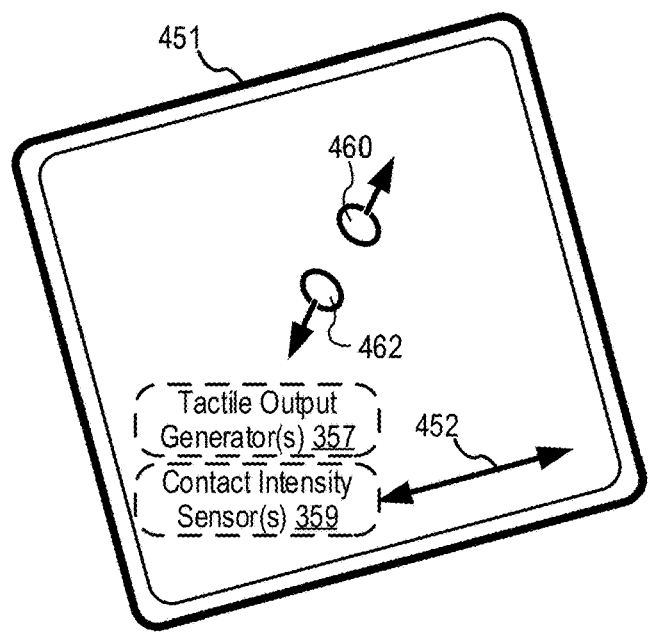
FIG. 4B

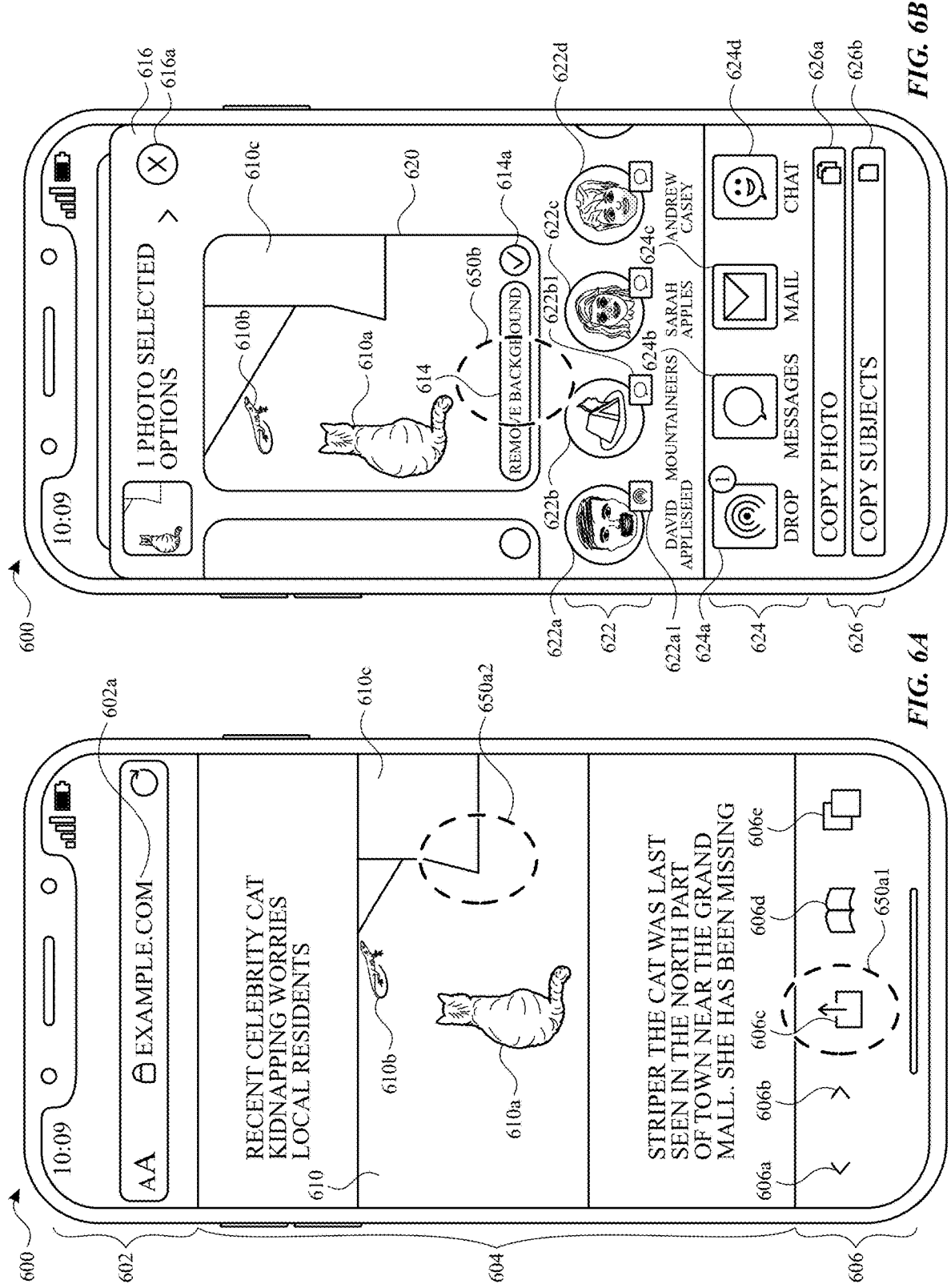

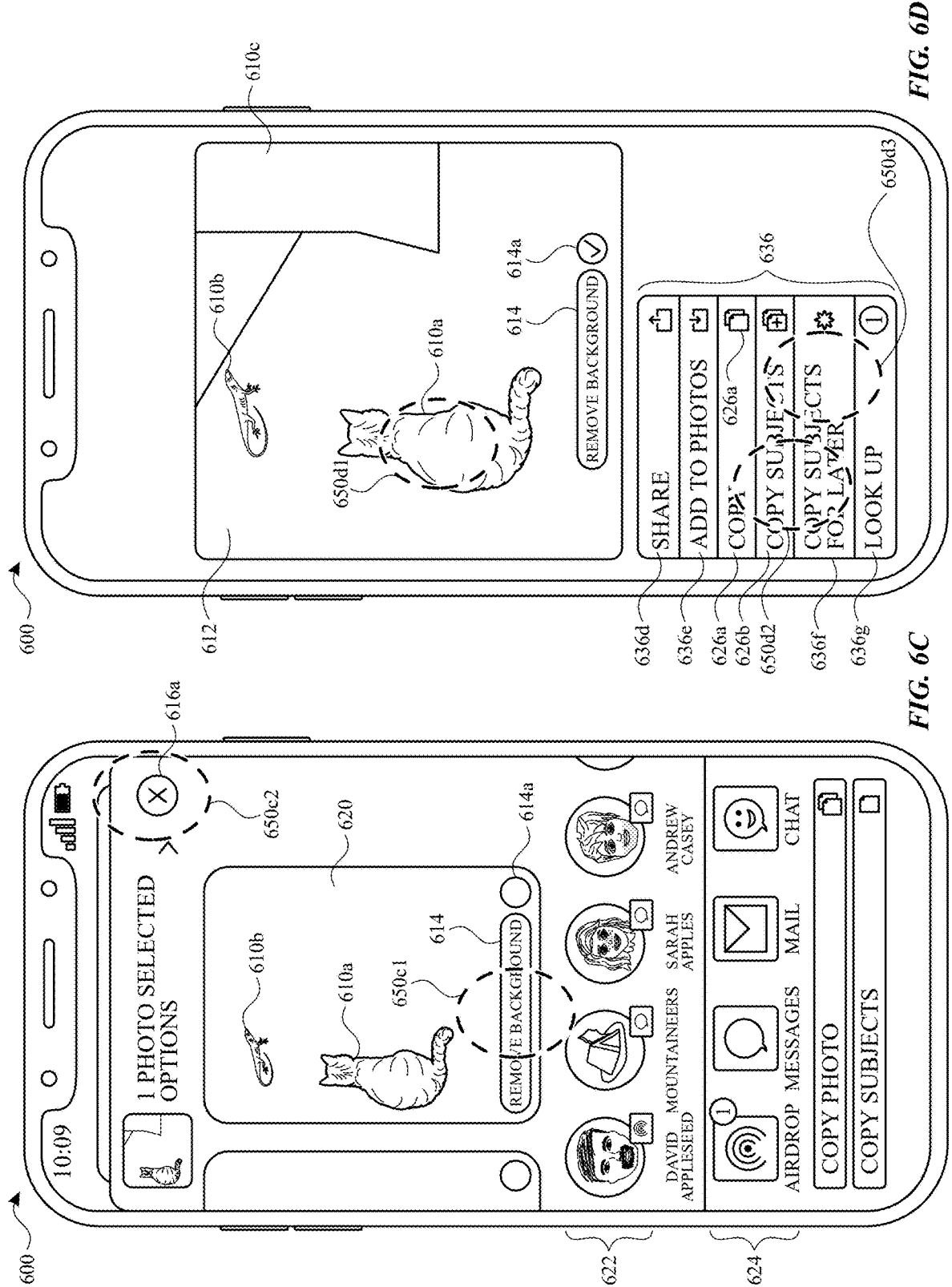

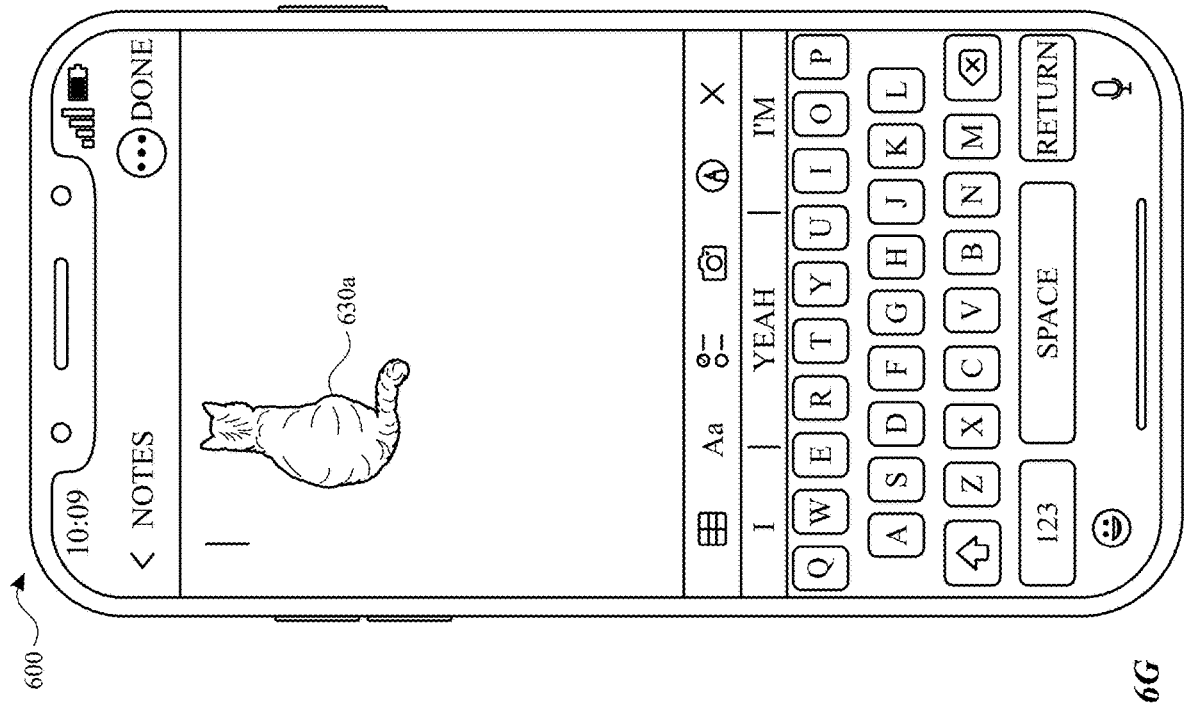
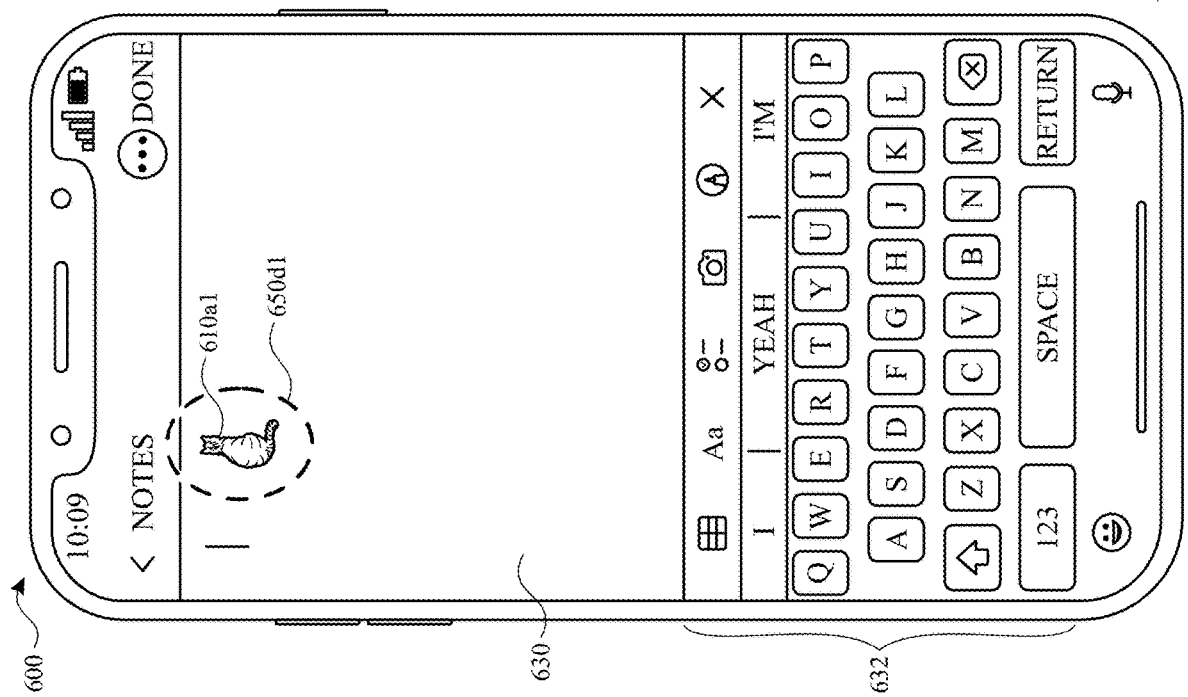
FIG. 6G
FIG. 6H

800 ⬊

---

802
While displaying, via the display generation component, a representation of visual content that includes a first portion and a second portion, detect an input directed to the visual content.

↓

804
In response to detecting the input directed to the visual content and in accordance with a determination that the first portion includes a subject that is available to be copied, provide an indication that an operation can be performed to copy the subject without copying the second portion.

*FIG. 8*

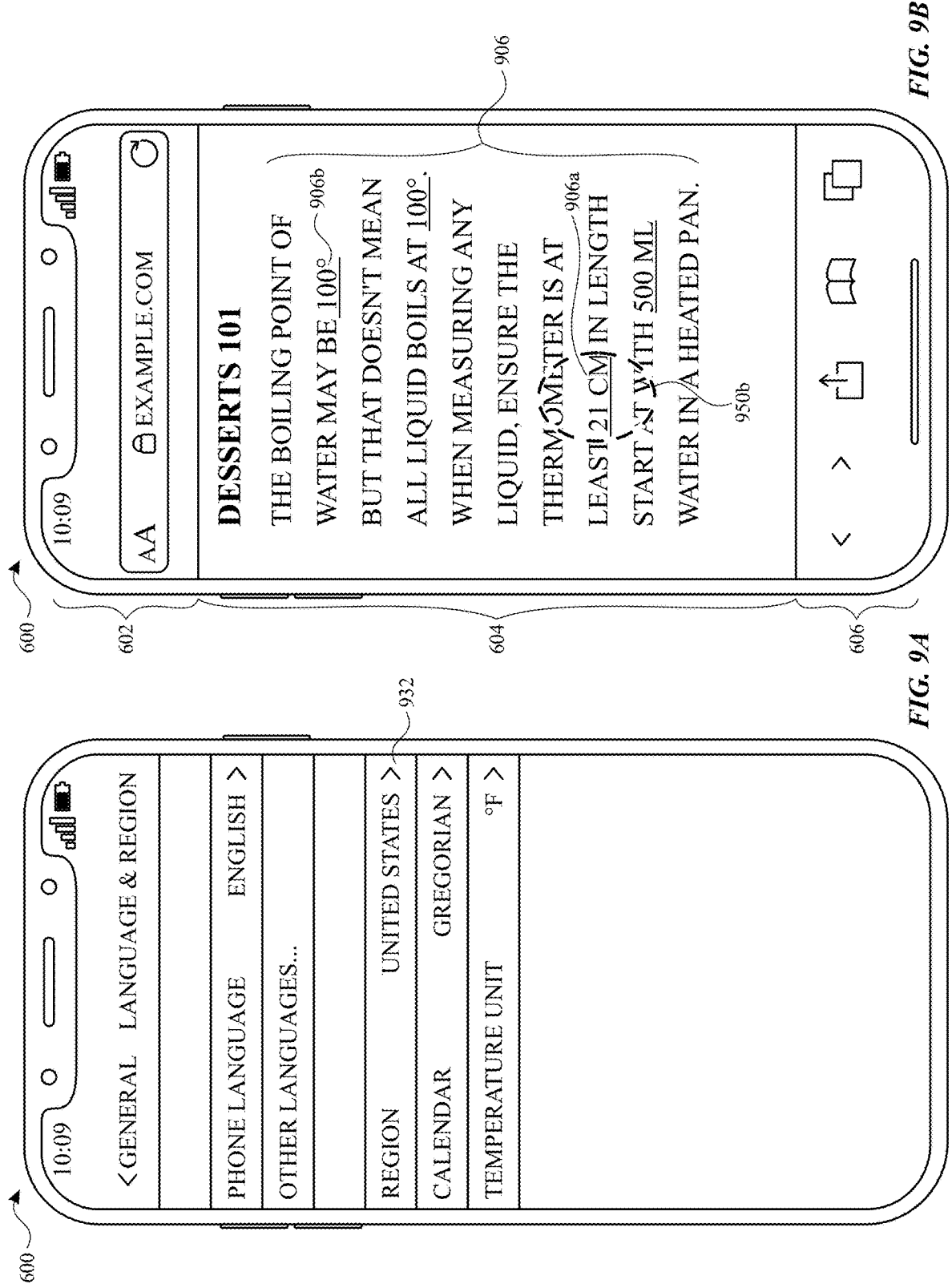

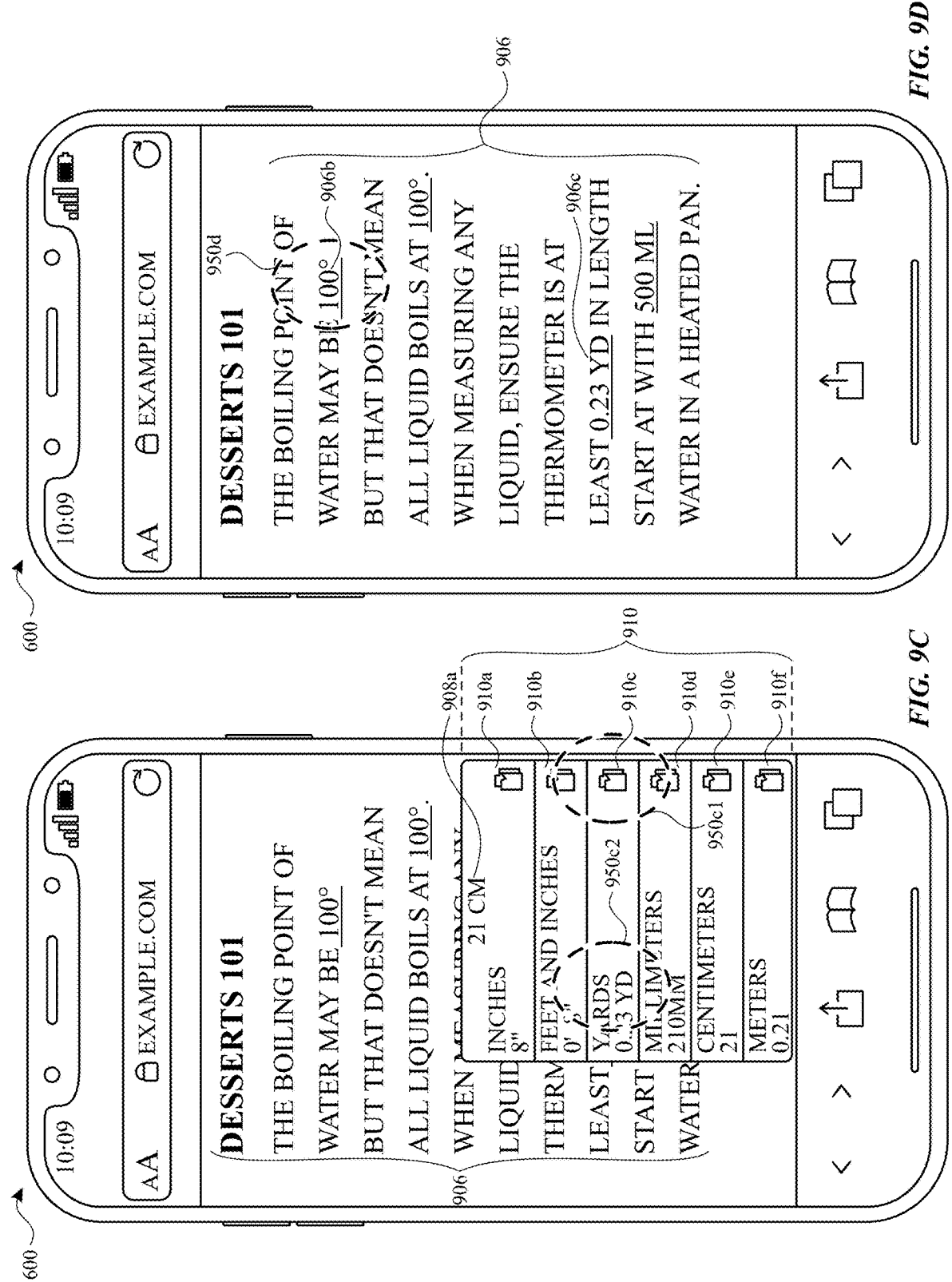

1000 ↘

1002
While displaying a representation that includes text, detect an input that corresponds to selection of a portion of the text in the representation.

1004
In response to detecting the input that corresponds to selection of the portion of the text in the representation and in accordance with a determination that the portion of the text in the representation meets a respective set of criteria, where the respective set of criteria includes a criterion that is met when a determination is made that the portion of the text corresponds to a first measurement that has a first number and a first unit of measurement, display, via the display generation component, a respective user interface for converting the first measurement into one or more other units of measurement, wherein the respective user interface includes a visual representation of a second measurement that has a second number with a second unit of measurement that is different from the first unit of measurement, and wherein the second number is a conversion of the first number from the first unit of measurement to the second unit of measurement.

*FIG. 10*

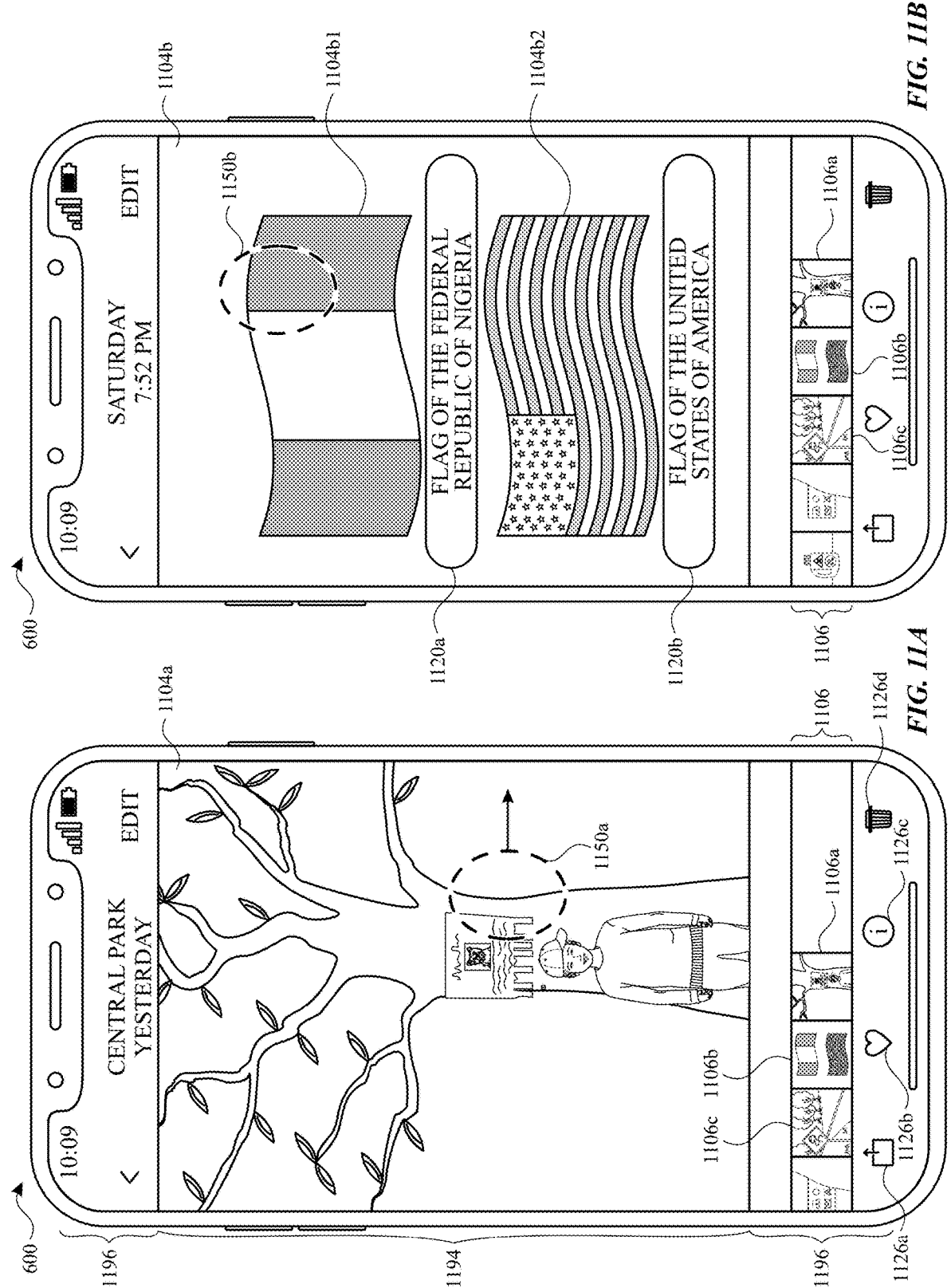

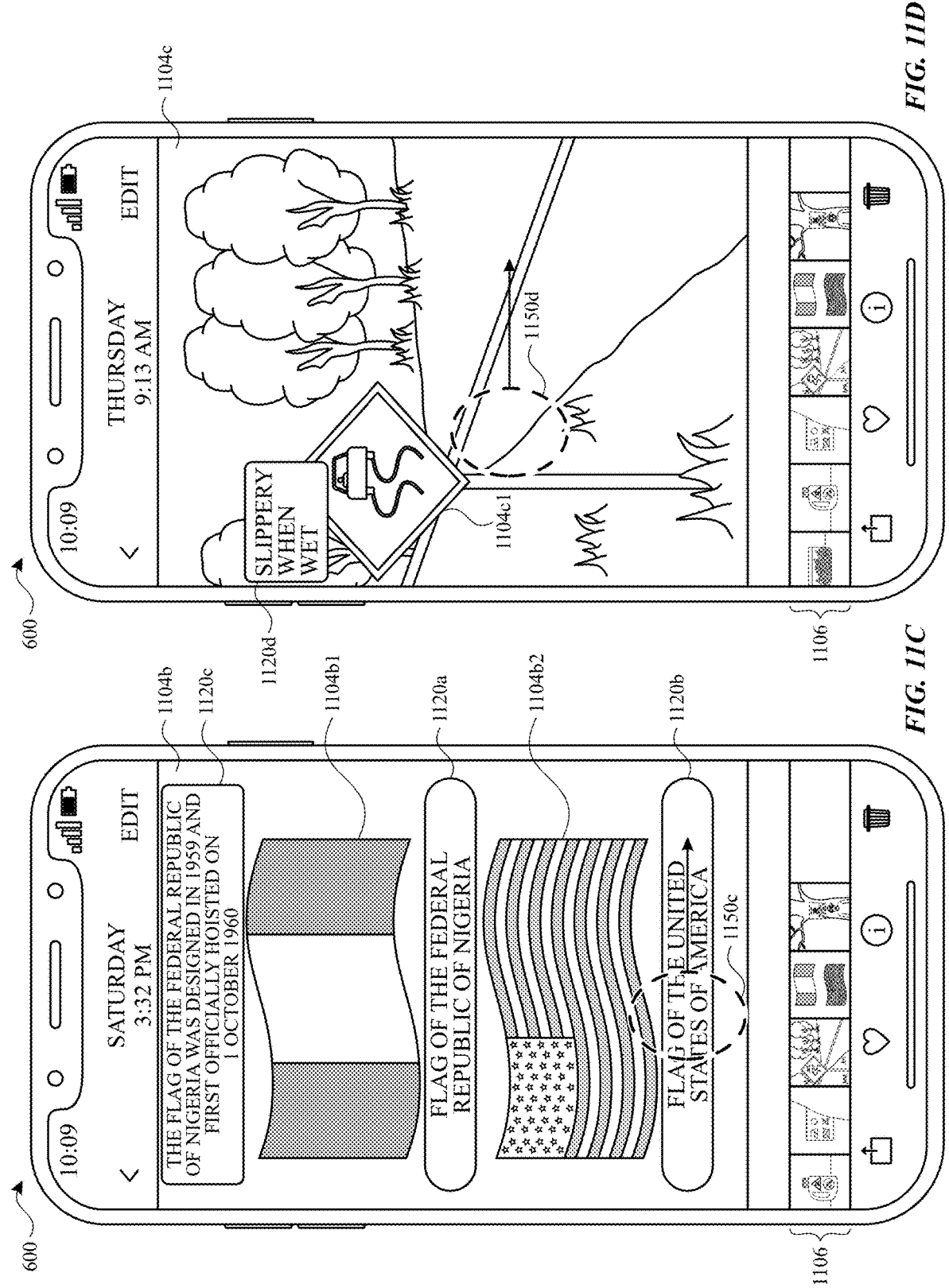

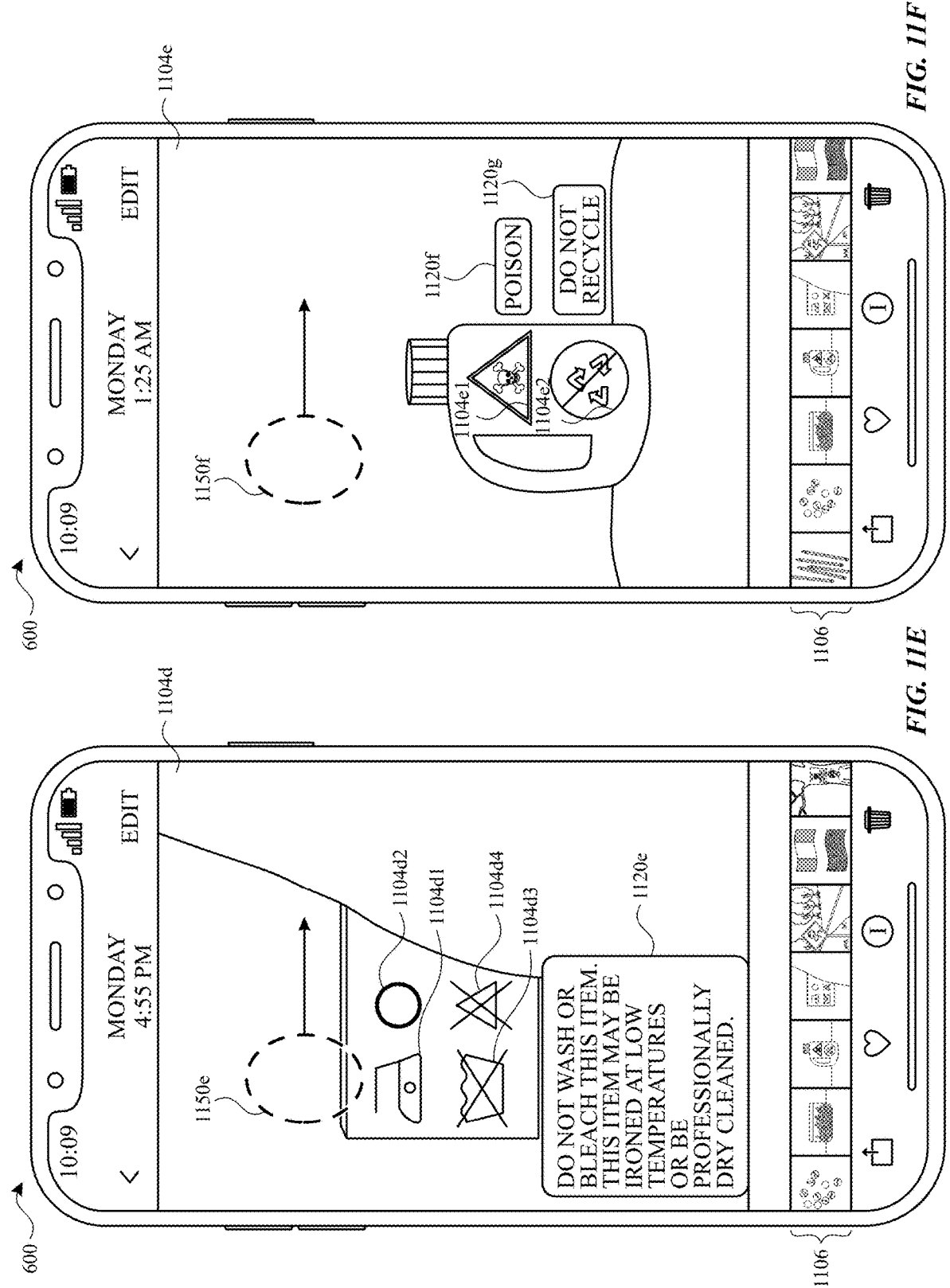

```
                    1200 ─┐

┌─────────────────────────────────────────────────────────────┐
│                            1202                              │
│        Detect a request to display a representation          │
│                    of a media item.                          │
└─────────────────────────────────────────────────────────────┘
                              │
                              ▼
┌─────────────────────────────────────────────────────────────┐
│                            1204                              │
│ In response to detecting the request to display the          │
│ representation of the media item, display, via the display   │
│ generation component, a respective user interface that       │
│ includes a representation of a media item, where the         │
│ displaying the respective user interface includes:           │
│                                                              │
│ ┌─────────────────────────────────────────────────────────┐ │
│ │                         1206                             │ │
│ │ In accordance with a determination that the              │ │
│ │ representation of the media item includes one or more    │ │
│ │ symbols, displaying, via the display generation          │ │
│ │ component, a representation of an interpretation of at   │ │
│ │ least a first symbol of the one or more symbols          │ │
│ │ concurrently with the representation of the media,       │ │
│ │ wherein the representation of the interpretation of the  │ │
│ │ one or more symbols in the media item is separate from   │ │
│ │ the media item.                                          │ │
│ └─────────────────────────────────────────────────────────┘ │
└─────────────────────────────────────────────────────────────┘
```

1402
While displaying, via the display generation component, a representation of visual content that includes a first portion and a second portion, detect an input directed to the first portion of the representation of the visual content.

1404
In response to detecting the input directed to the first portion of the representation of the visual content and in accordance with a determination that the first portion of the representation of the visual content includes a detected foreground object that is represented in the visual content, display, via the display generation component, an animation, including:

1406
During a first period of time while displaying the animation, display, via the display generation component, a first portion of the animation at a location that corresponds to the detected foreground object, wherein displaying the first portion of the animation includes emphasizing a detected boundary of the detected foreground object during the first period of time.

*FIG. 14*

USER INTERFACES FOR MANAGING VISUAL CONTENT IN A MEDIA REPRESENTATION

CROSS-REFERENCE TO RELATED APPLICATIONS

This application claims priority to U.S. Provisional Patent Application Ser. No. 63/349,086, entitled "USER INTERFACES FOR MANAGING VISUAL CONTENT IN A MEDIA REPRESENTATION," filed Jun. 4, 2022 and U.S. Provisional Patent Application Ser. No. 63/318,678, entitled "USER INTERFACES FOR MANAGING VISUAL CONTENT IN A MEDIA REPRESENTATION," filed on May 10, 2022.

FIELD

The present disclosure relates generally to computer user interfaces, and more specifically to techniques for managing visual content in a media representation.

BACKGROUND

Smartphones and other personal electronic devices allow users to capture and view content in media. Users can capture a variety of types of media, including video and image data. Users can store the captured media on smartphones or other personal electronic devices.

BRIEF SUMMARY

Some techniques for managing visual content in a media representation using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing visual content in a media representation. Such methods and interfaces optionally complement or replace other methods for managing visual content in a media representation. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component is described. The method comprises: detecting a request to display a user interface that corresponds to a media item; and in response to detecting the request to display the user interface that corresponds to the media item, displaying, via the display generation component, the user interface that corresponds to the media item, including: in accordance with a determination that a subject has automatically been detected in the media item, displaying, via the display generation component, a first user interface object that, when selected, causes the computer system to alter display of a portion of the media item in a representation of the media item without altering display of the subject in the representation of the media item; and in accordance with a determination that the subject has not automatically been detected in the media item, forgoing display of the first user interface object.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting a request to display a user interface that corresponds to a media item; and in response to detecting the request to display the user interface that corresponds to the media item, displaying, via the display generation component, the user interface that corresponds to the media item, including: in accordance with a determination that a subject has automatically been detected in the media item, displaying, via the display generation component, a first user interface object that, when selected, causes the computer system to alter display of a portion of the media item in a representation of the media item without altering display of the subject in the representation of the media item; and in accordance with a determination that the subject has not automatically been detected in the media item, forgoing display of the first user interface object.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting a request to display a user interface that corresponds to a media item; and in response to detecting the request to display the user interface that corresponds to the media item, displaying, via the display generation component, the user interface that corresponds to the media item, including: in accordance with a determination that a subject has automatically been detected in the media item, displaying, via the display generation component, a first user interface object that, when selected, causes the computer system to alter display of a portion of the media item in a representation of the media item without altering display of the subject in the representation of the media item; and in accordance with a determination that the subject has not automatically been detected in the media item, forgoing display of the first user interface object.

In accordance with some embodiments a computer system is described. The computer system is configured to communicate with a display generation component, the computer system comprises: one or more processors; and memory storing one or more programs configured to be executed by the one or more processors, the one or more programs including instructions for: detecting a request to display a user interface that corresponds to a media item; and in response to detecting the request to display the user interface that corresponds to the media item, displaying, via the display generation component, the user interface that corresponds to the media item, including: in accordance with a determination that a subject has automatically been detected in the media item, displaying, via the display generation component, a first user interface object that, when selected, causes the computer system to alter display of a portion of the media item in a representation of the media item without altering display of the subject in the representation of the media item; and in accordance with a determination that the subject has not automatically been detected in the media item, forgoing display of the first user interface object.

In accordance with some embodiments, a computer system is described. The computer system is configured to communicate with a display generation component. The computer system comprises: means for detecting a request to display a user interface that corresponds to a media item; and means for, in response to detecting the request to display the user interface that corresponds to the media item, displaying, via the display generation component, the user interface that corresponds to the media item, including: in accordance with a determination that a subject has automatically been detected in the media item, displaying, via the display generation component, a first user interface object that, when selected, causes the computer system to alter display of a portion of the media item in a representation of the media item without altering display of the subject in the representation of the media item; and in accordance with a determination that the subject has not automatically been detected in the media item, forgoing display of the first user interface object.

In accordance with some embodiments, a computer program product is described. The computer program product comprises: one or more programs configured to be executed by one or more processors of a computer system that is in communication with a display generation component, the one or more programs including instructions for: detecting a request to display a user interface that corresponds to a media item; and in response to detecting the request to display the user interface that corresponds to the media item, displaying, via the display generation component, the user interface that corresponds to the media item, including: in accordance with a determination that a subject has automatically been detected in the media item, displaying, via the display generation component, a first user interface object that, when selected, causes the computer system to alter display of a portion of the media item in a representation of the media item without altering display of the subject in the representation of the media item; and in accordance with a determination that the subject has not automatically been detected in the media item, forgoing display of the first user interface object.

In some embodiments, a method performed at a computer system that is in communication with a display generation component is described. The method comprises: while displaying, via the display generation component, a representation of visual content that includes a first portion and a second portion, detecting an input directed to the visual content; and in response to detecting the input directed to the visual content and in accordance with a determination that the first portion includes a subject that is available to be copied, providing an indication that an operation can be performed to copy the subject without copying the second portion.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while displaying, via the display generation component, a representation of visual content that includes a first portion and a second portion, detecting an input directed to the visual content; and in response to detecting the input directed to the visual content and in accordance with a determination that the first portion includes a subject that is available to be copied, providing an indication that an operation can be performed to copy the subject without copying the second portion.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while displaying, via the display generation component, a representation of visual content that includes a first portion and a second portion, detecting an input directed to the visual content; and in response to detecting the input directed to the visual content and in accordance with a determination that the first portion includes a subject that is available to be copied, providing an indication that an operation can be performed to copy the subject without copying the second portion.

In accordance with some embodiments, a computer system is described. The computer system is configured to communicate with a display generation component, the computer system comprises: one or more processors; and memory storing one or more programs configured to be executed by the one or more processors, the one or more programs including instructions for: while displaying, via the display generation component, a representation of visual content that includes a first portion and a second portion, detecting an input directed to the visual content; and in response to detecting the input directed to the visual content and in accordance with a determination that the first portion includes a subject that is available to be copied, providing an indication that an operation can be performed to copy the subject without copying the second portion.

In accordance with some embodiments, a computer system is described. The computer system is configured to communicate with a display generation component, the computer system comprises: means for, while displaying, via the display generation component, a representation of visual content that includes a first portion and a second portion, detecting an input directed to the visual content; and means for, in response to detecting the input directed to the visual content and in accordance with a determination that the first portion includes a subject that is available to be copied, providing an indication that an operation can be performed to copy the subject without copying the second portion.

In accordance with some embodiments, a computer program product is described. The computer program product comprises: one or more programs configured to be executed by one or more processors of a computer system that is in communication a display generation component, the one or more programs including instructions for: while displaying, via the display generation component, a representation of visual content that includes a first portion and a second portion, detecting an input directed to the visual content; and in response to detecting the input directed to the visual content and in accordance with a determination that the first portion includes a subject that is available to be copied, providing an indication that an operation can be performed to copy the subject without copying the second portion.

In accordance with some embodiments, a method performed at a computer system that is in communication with a display generation component is described. The method comprises: while displaying a representation that includes text, detecting an input that corresponds to selection of a portion of the text in the representation; and in response to detecting the input that corresponds to selection of the portion of the text in the representation and in accordance with a determination that the portion of the text in the representation meets a respective set of criteria, wherein the respective set of criteria includes a criterion that is met when a determination is made that the portion of the text corresponds to a first measurement that has a first number and a first unit of measurement, displaying, via the display generation component, a respective user interface for converting the first measurement into one or more other units of measurement, wherein the respective user interface includes a visual representation of a second measurement that has a second number with a second unit of measurement that is different from the first unit of measurement, and wherein the second number is a conversion of the first number from the first unit of measurement to the second unit of measurement.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while displaying a representation that includes text, detecting an input that corresponds to selection of a portion of the text in the representation; and in response to detecting the input that corresponds to selection of the portion of the text in the representation and in accordance with a determination that the portion of the text in the representation meets a respective set of criteria, wherein the respective set of criteria includes a criterion that is met when a determination is made that the portion of the text corresponds to a first measurement that has a first number and a first unit of measurement, displaying, via the display generation component, a respective user interface for converting the first measurement into one or more other units of measurement, wherein the respective user interface includes a visual representation of a second measurement that has a second number with a second unit of measurement that is different from the first unit of measurement, and wherein the second number is a conversion of the first number from the first unit of measurement to the second unit of measurement.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while displaying a representation that includes text, detecting an input that corresponds to selection of a portion of the text in the representation; and in response to detecting the input that corresponds to selection of the portion of the text in the representation and in accordance with a determination that the portion of the text in the representation meets a respective set of criteria, wherein the respective set of criteria includes a criterion that is met when a determination is made that the portion of the text corresponds to a first measurement that has a first number and a first unit of measurement, displaying, via the display generation component, a respective user interface for converting the first measurement into one or more other units of measurement, wherein the respective user interface includes a visual representation of a second measurement that has a second number with a second unit of measurement that is different from the first unit of measurement, and wherein the second number is a conversion of the first number from the first unit of measurement to the second unit of measurement.

In accordance with some embodiments a computer system is described. The computer system is configured to communicate with a display generation component. The computer system comprises: one or more processors; and memory storing one or more programs configured to be executed by the one or more processors, the one or more programs including instructions for: while displaying a representation that includes text, detecting an input that corresponds to selection of a portion of the text in the representation; and in response to detecting the input that corresponds to selection of the portion of the text in the representation and in accordance with a determination that the portion of the text in the representation meets a respective set of criteria, wherein the respective set of criteria includes a criterion that is met when a determination is made that the portion of the text corresponds to a first measurement that has a first number and a first unit of measurement, displaying, via the display generation component, a respective user interface for converting the first measurement into one or more other units of measurement, wherein the respective user interface includes a visual representation of a second measurement that has a second number with a second unit of measurement that is different from the first unit of measurement, and wherein the second number is a conversion of the first number from the first unit of measurement to the second unit of measurement.

In accordance with some embodiments, a computer system is described. The computer system is configured to communicate with a display generation component. The computer system comprises: means for, while displaying a representation that includes text, detecting an input that corresponds to selection of a portion of the text in the representation; and means for in response to detecting the input that corresponds to selection of the portion of the text in the representation and in accordance with a determination that the portion of the text in the representation meets a respective set of criteria, wherein the respective set of criteria includes a criterion that is met when a determination is made that the portion of the text corresponds to a first measurement that has a first number and a first unit of measurement, displaying, via the display generation component, a respective user interface for converting the first measurement into one or more other units of measurement, wherein the respective user interface includes a visual representation of a second measurement that has a second number with a second unit of measurement that is different from the first unit of measurement, and wherein the second number is a conversion of the first number from the first unit of measurement to the second unit of measurement.

In some embodiments, a computer program product is described. The computer program product comprises: one or more programs configured to be executed by one or more processors of a computer system that is in communication with a display generation component, the one or more programs including instructions for: while displaying a representation that includes text, detecting an input that corresponds to selection of a portion of the text in the representation; and in response to detecting the input that corresponds to selection of the portion of the text in the representation and in accordance with a determination that the portion of the text in the representation meets a respective set of criteria, wherein the respective set of criteria includes a criterion that is met when a determination is made that the portion of the text corresponds to a first measurement that has a first number and a first unit of measurement, displaying, via the display generation component, a respective user interface for converting the first measurement into one or more other units of measurement, wherein the respective user interface includes a visual representation of a second measurement that has a second number with a second unit of measurement that is different from the first unit of measurement, and wherein the second number is a conversion of the first number from the first unit of measurement to the second unit of measurement.

In some embodiments, a method performed at a computer system that is in communication with a display generation component is described. The method comprises: detecting a request to display a representation of a media item; and in response to detecting the request to display the representation of the media item, displaying, via the display generation component, a respective user interface that includes a representation of a media item, wherein displaying the respective user interface includes: in accordance with a determination that the representation of the media item includes one or more symbols, displaying, via the display generation component, a representation of an interpretation of at least a first symbol of the one or more symbols concurrently with the representation of the media, wherein the representation of the interpretation of the one or more symbols in the media item is separate from the media item.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: detecting a request to display a representation of a media item; and in response to detecting the request to display the representation of the media item, displaying, via the display generation component, a respective user interface that includes a representation of a media item, wherein displaying the respective user interface includes: in accordance with a determination that the representation of the media item includes one or more symbols, displaying, via the display generation component, a representation of an interpretation of at least a first symbol of the one or more symbols concurrently with the representation of the media, wherein the representation of the interpretation of the one or more symbols in the media item is separate from the media item.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: detecting a request to display a representation of a media item; and in response to detecting the request to display the representation of the media item, displaying, via the display generation component, a respective user interface that includes a representation of a media item, wherein displaying the respective user interface includes: in accordance with a determination that the representation of the media item includes one or more symbols, displaying, via the display generation component, a representation of an interpretation of at least a first symbol of the one or more symbols concurrently with the representation of the media, wherein the representation of the interpretation of the one or more symbols in the media item is separate from the media item.

In accordance with some embodiments a computer system is described. The computer system is configured to communicate with a display generation component. The computer system comprises: one or more processors; and memory storing one or more programs configured to be executed by the one or more processors, the one or more programs including instructions for: detecting a request to display a representation of a media item; and in response to detecting the request to display the representation of the media item, displaying, via the display generation component, a respective user interface that includes a representation of a media item, wherein displaying the respective user interface includes: in accordance with a determination that the representation of the media item includes one or more symbols, displaying, via the display generation component, a representation of an interpretation of at least a first symbol of the one or more symbols concurrently with the representation of the media, wherein the representation of the interpretation of the one or more symbols in the media item is separate from the media item.

In accordance with some embodiments, a computer system is described. The computer system is configured to communicate with a display generation component. The computer system comprises: means for, detecting a request to display a representation of a media item; and means for, in response to detecting the request to display the representation of the media item, displaying, via the display generation component, a respective user interface that includes a representation of a media item, wherein displaying the respective user interface includes: in accordance with a determination that the representation of the media item includes one or more symbols, displaying, via the display generation component, a representation of an interpretation of at least a first symbol of the one or more symbols concurrently with the representation of the media, wherein the representation of the interpretation of the one or more symbols in the media item is separate from the media item.

In some embodiments, a computer program product is described. The computer program product comprises: one or more programs configured to be executed by one or more processors of a computer system that is in communication with a display generation component, the one or more programs including instructions for: detecting a request to display a representation of a media item; and in response to detecting the request to display the representation of the media item, displaying, via the display generation component, a respective user interface that includes a representation of a media item, wherein displaying the respective user interface includes: in accordance with a determination that the representation of the media item includes one or more symbols, displaying, via the display generation component, a representation of an interpretation of at least a first symbol of the one or more symbols concurrently with the representation of the media, wherein the representation of the interpretation of the one or more symbols in the media item is separate from the media item.

In accordance with some embodiments, a method is described. The method comprises: at a computer system that is in communication with a display generation component: while displaying, via the display generation component, a representation of visual content that includes a first portion and a second portion, detecting an input directed to the first portion of the representation of the visual content; and in response to detecting the input directed to the first portion of the representation of the visual content and in accordance with a determination that the first portion of the representation of the visual content includes a detected foreground object that is represented in the visual content, displaying, via the display generation component, an animation, including: during a first period of time while displaying the animation, displaying, via the display generation component, a first portion of the animation at a location that corresponds to the detected foreground object, wherein displaying the first portion of the animation includes emphasizing a detected boundary of the detected foreground object during the first period of time.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: while displaying, via the display generation component, a representation of visual content that includes a first portion and a second portion, detecting an input directed to the first portion of the representation of the visual content; and in response to detecting the input directed to the first portion of the representation of the visual content and in accordance with a determination that the first portion of the representation of the visual content includes a detected foreground object that is represented in the visual content, displaying, via the display generation component, an animation, including: during a first period of time while displaying the animation, displaying, via the display generation component, a first portion of the animation at a location that corresponds to the detected foreground object, wherein displaying the first portion of the animation includes emphasizing a detected boundary of the detected foreground object during the first period of time.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: while displaying, via the display generation component, a representation of visual content that includes a first portion and a second portion, detecting an input directed to the first portion of the representation of the visual content; and in response to detecting the input directed to the first portion of the representation of the visual content and in accordance with a determination that the first portion of the representation of the visual content includes a detected foreground object that is represented in the visual content, displaying, via the display generation component, an animation, including: during a first period of time while displaying the animation, displaying, via the display generation component, a first portion of the animation at a location that corresponds to the detected foreground object, wherein displaying the first portion of the animation includes emphasizing a detected boundary of the detected foreground object during the first period of time.

In accordance with some embodiments, a computer system configured to communicate with a display generation component is described. The computer system comprises: one or more processors; and memory storing one or more programs configured to be executed by the one or more processors, the one or more programs including instructions for: while displaying, via the display generation component, a representation of visual content that includes a first portion and a second portion, detecting an input directed to the first portion of the representation of the visual content; and in response to detecting the input directed to the first portion of the representation of the visual content and in accordance with a determination that the first portion of the representation of the visual content includes a detected foreground object that is represented in the visual content, displaying, via the display generation component, an animation, including: during a first period of time while displaying the animation, displaying, via the display generation component, a first portion of the animation at a location that corresponds to the detected foreground object, wherein displaying the first portion of the animation includes emphasizing a detected boundary of the detected foreground object during the first period of time.

In accordance with some embodiments, a computer system configured to communicate with a display generation component is described. The computer system comprises: means for, while displaying, via the display generation component, a representation of visual content that includes a first portion and a second portion, detecting an input directed to the first portion of the representation of the visual content; and means for, in response to detecting the input directed to the first portion of the representation of the visual content and in accordance with a determination that the first portion of the representation of the visual content includes a detected foreground object that is represented in the visual content, displaying, via the display generation component, an animation, including: during a first period of time while displaying the animation, displaying, via the display generation component, a first portion of the animation at a location that corresponds to the detected foreground object, wherein displaying the first portion of the animation includes emphasizing a detected boundary of the detected foreground object during the first period of time.

In accordance with some embodiments, a computer program product is described. The computer program product comprises one or more programs configured to be executed by one or more processors of a computer system that is in communication with a display generation component, the one or more programs including instructions for: while displaying, via the display generation component, a representation of visual content that includes a first portion and a second portion, detecting an input directed to the first portion of the representation of the visual content; and in response to detecting the input directed to the first portion of the representation of the visual content and in accordance with a determination that the first portion of the representation of the visual content includes a detected foreground object that is represented in the visual content, displaying, via the display generation component, an animation, including: during a first period of time while displaying the animation, displaying, via the display generation component, a first portion of the animation at a location that corresponds to the detected foreground object, wherein displaying the first portion of the animation includes emphasizing a detected boundary of the detected foreground object during the first period of time.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing visual content in a media representation, thereby increasing the effectiveness, efficiency, and user satisfaction with such devices. Such methods and interfaces may complement or replace other methods for managing visual content in a media representation.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6M illustrate exemplary user interfaces for managing one or more portions of a media representation in accordance with some embodiments.

FIG. 8 is a flow diagram illustrating methods of copying subjects of a media representation in accordance with some embodiments.

FIGS. 9A-9I illustrate exemplary user interfaces for converting one or more portions of a media representation in accordance with some embodiments.

FIG. 10 is a flow diagram illustrating methods of converting of one or more portions of a media representation in accordance with some embodiments.

FIGS. 11A-11G illustrate exemplary user interfaces for providing descriptions for one or more symbols in a media representation in accordance with some embodiments.

FIG. 12 is a flow diagram illustrating methods of providing descriptions for one or more symbols in a media representation in accordance with some embodiments.

FIG. 14 is a flow diagram illustrating methods of providing one or more animations for detected objects in a media representation in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing visual content in a media representation (e.g., a representation of media, such as photo and/or video media). For example, there is a need for electronic devices and/or computer systems to allow a user to manage visual content in media representations that includes objects, such as signs or restaurant menus, that are captured by one or more cameras of the computer system. Such techniques can reduce the cognitive burden on a user who views, edits, and/or manages media representations, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing visual content in a media representation.

Figure 6F:
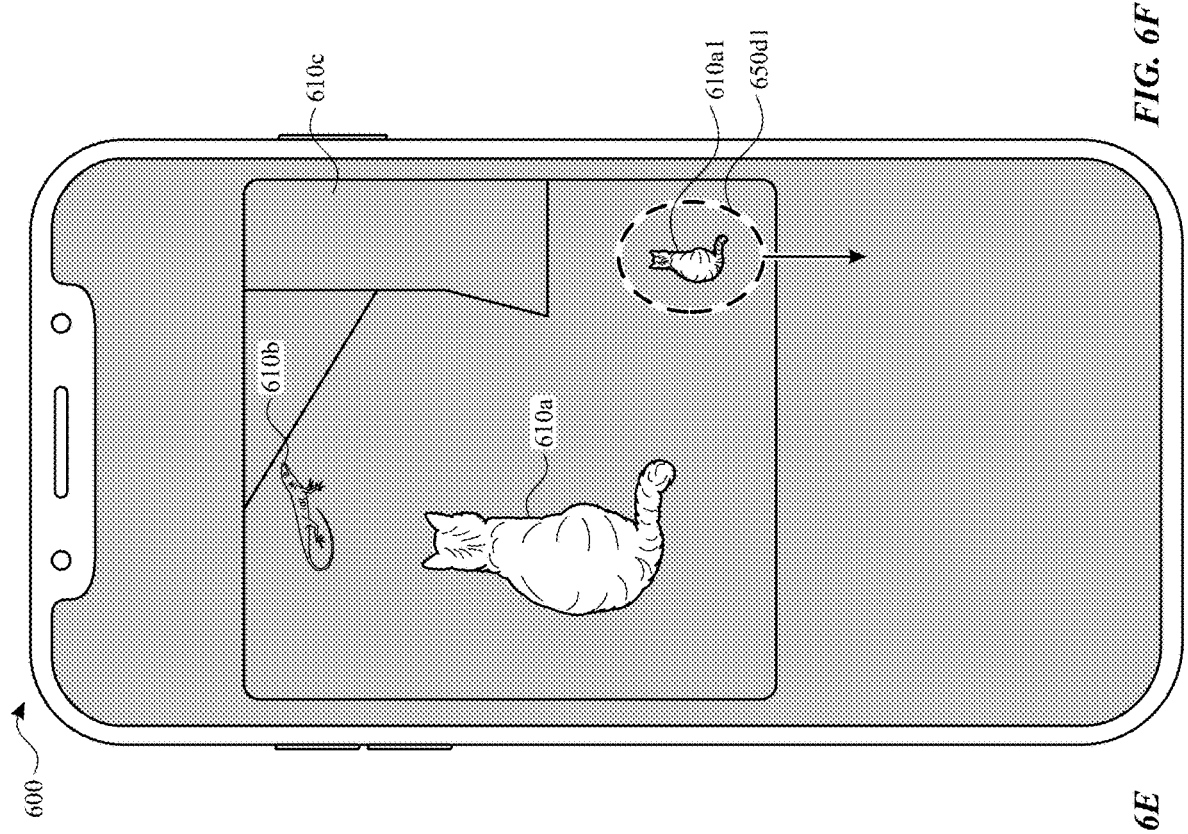

FIGS. 6A-6M illustrate exemplary user interfaces for managing one or more portions of a media representation in accordance with some embodiments. FIG. 7 is a flow diagram illustrating methods of managing the background of a media representation in accordance with some embodiments. FIG. 8 is a flow diagram illustrating methods of copying subjects of a media representation in accordance with some embodiments. The user interfaces in FIGS. 6A-6M are used to illustrate the processes described below, including the processes in FIGS. 7 and 8.

FIGS. 9A-9I illustrate exemplary user interfaces for converting one or more portions of a media representation in accordance with some embodiments. FIG. 10 is a flow diagram illustrating methods of converting of one or more portions of a media representation in accordance with some embodiments. The user interfaces in FIGS. 9A-9I are used to illustrate the processes described below, including the processes in FIG. 10.

FIGS. 11A-11G illustrate exemplary user interfaces for providing descriptions for one or more symbols in a media representation in accordance with some embodiments. FIG. 12 is a flow diagram illustrating methods of providing descriptions for one or more symbols in a media representation in accordance with some embodiments. The user interfaces in FIGS. 11A-11G are used to illustrate the processes described below, including the processes in FIG. 12.

Figure 13A:
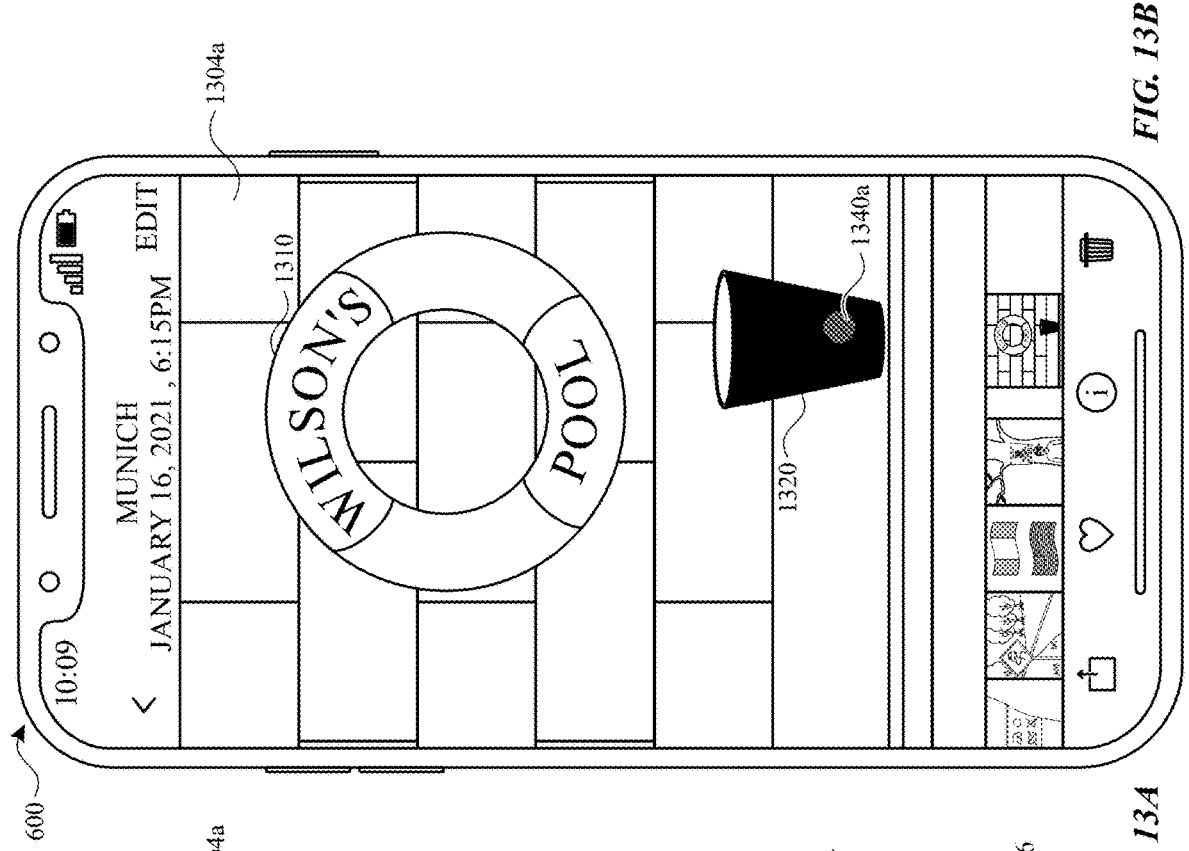
FIGS. 13A-13T illustrate exemplary user interfaces for providing one or more animations for detected objects in a media representation in accordance with some embodiments.
Figure 13B:
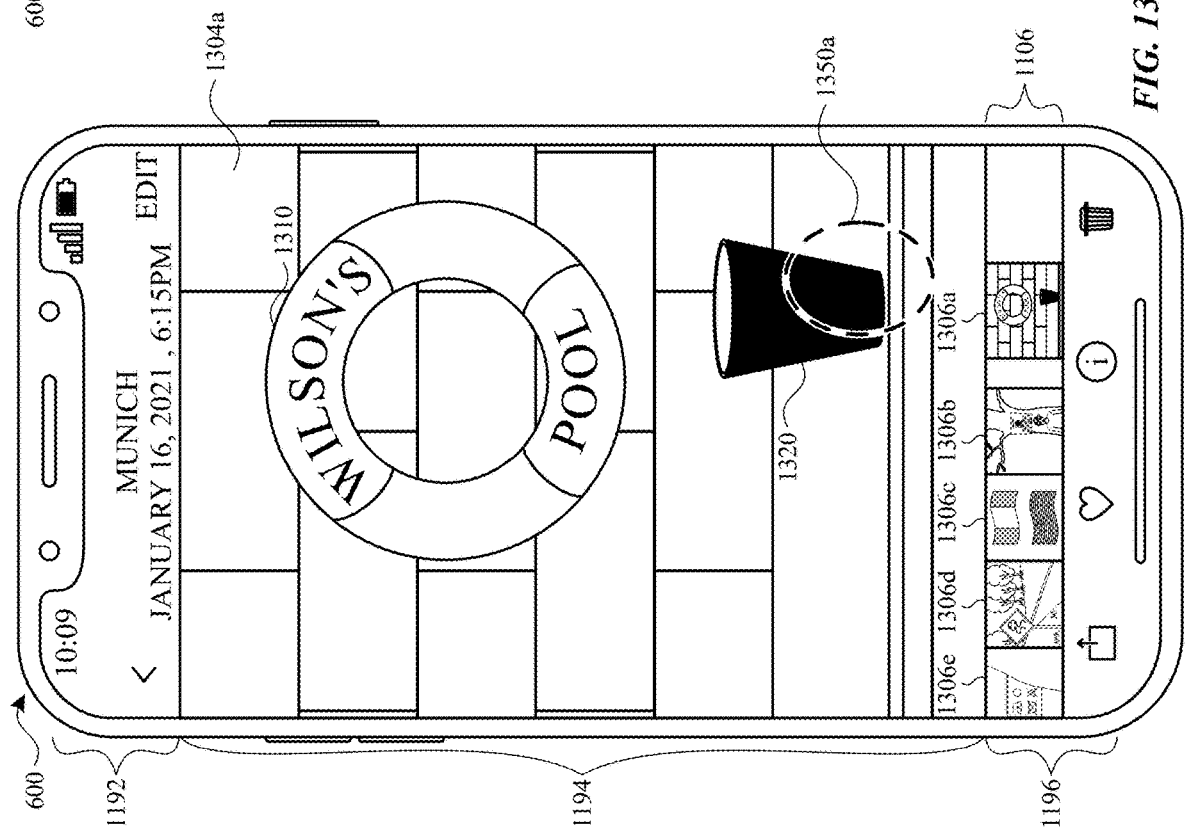
Figure 13C:
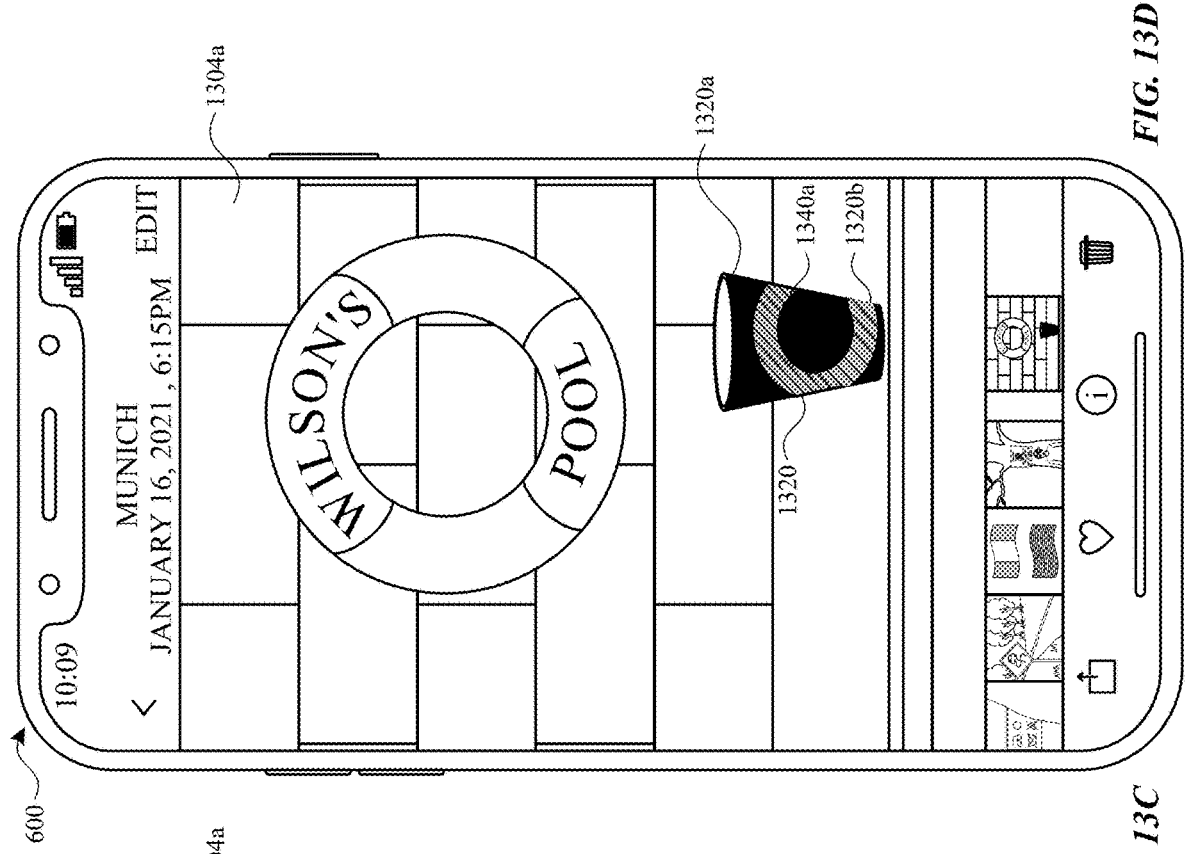
Figure 13D:
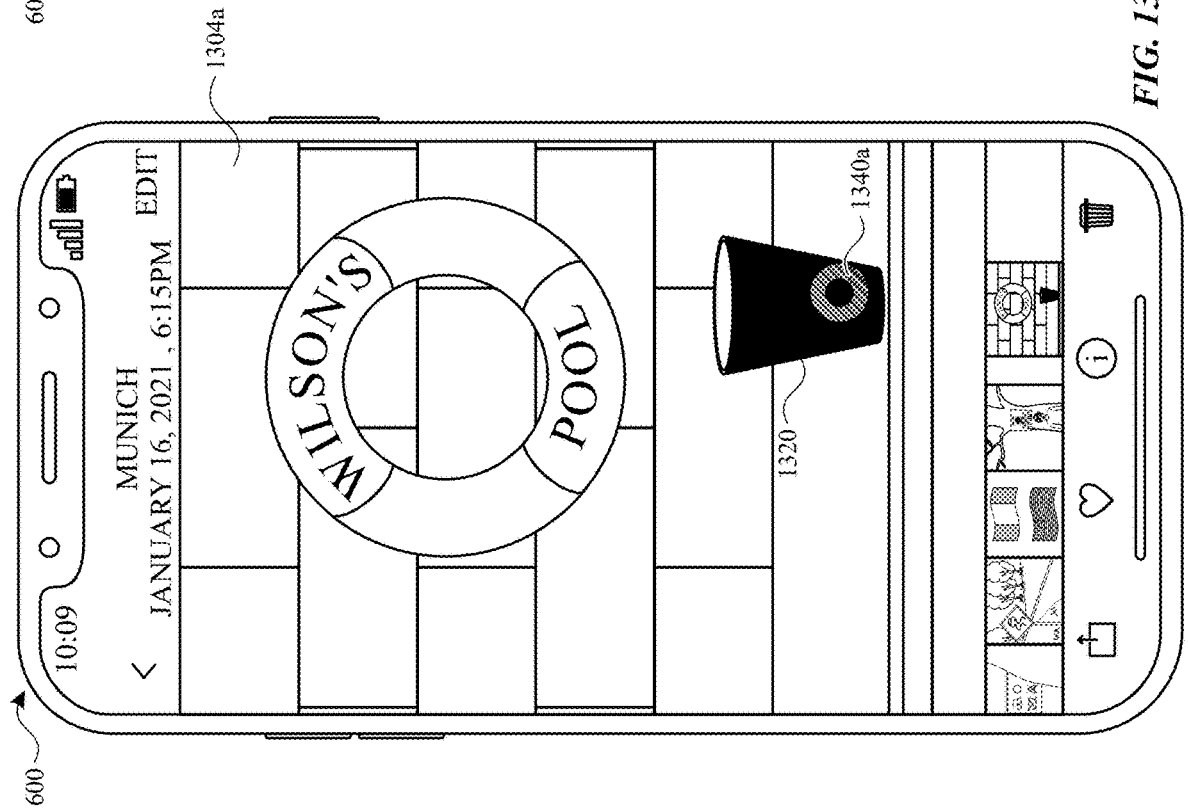
Figure 13E:
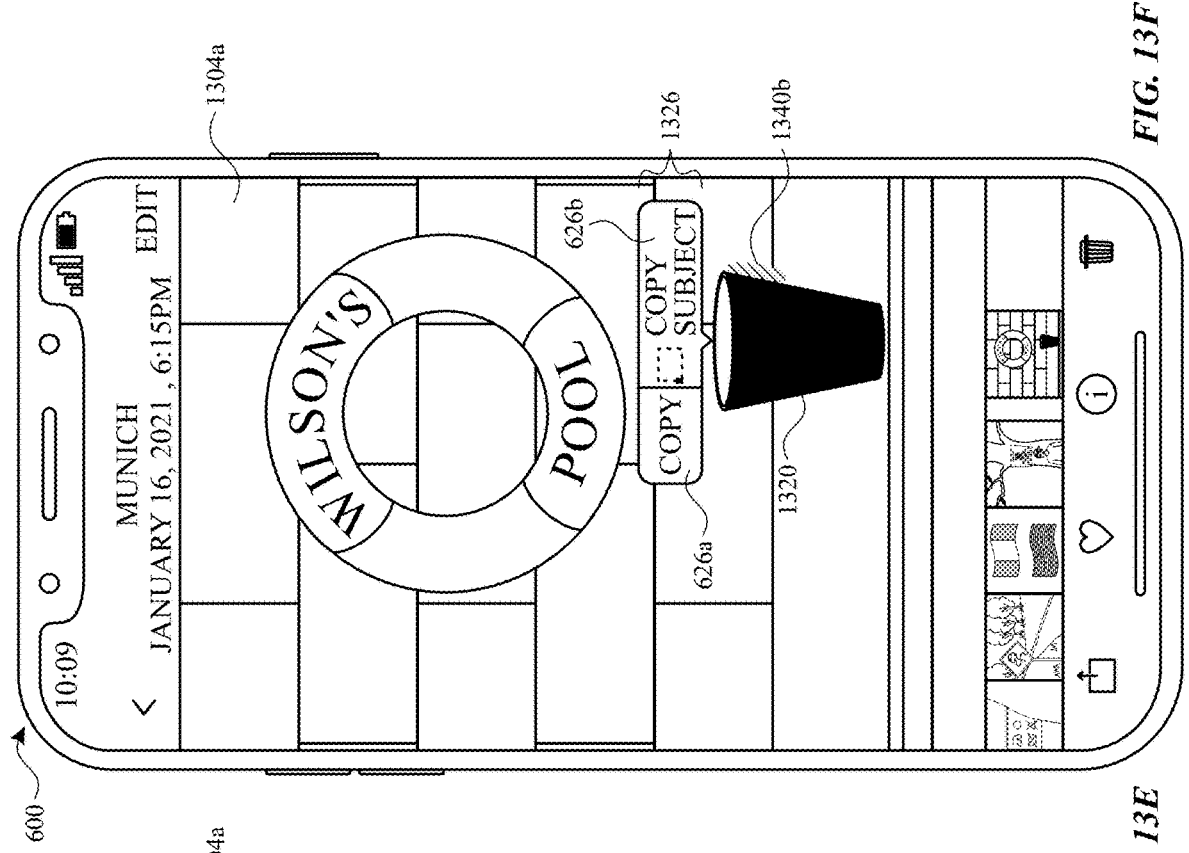
Figure 13F:
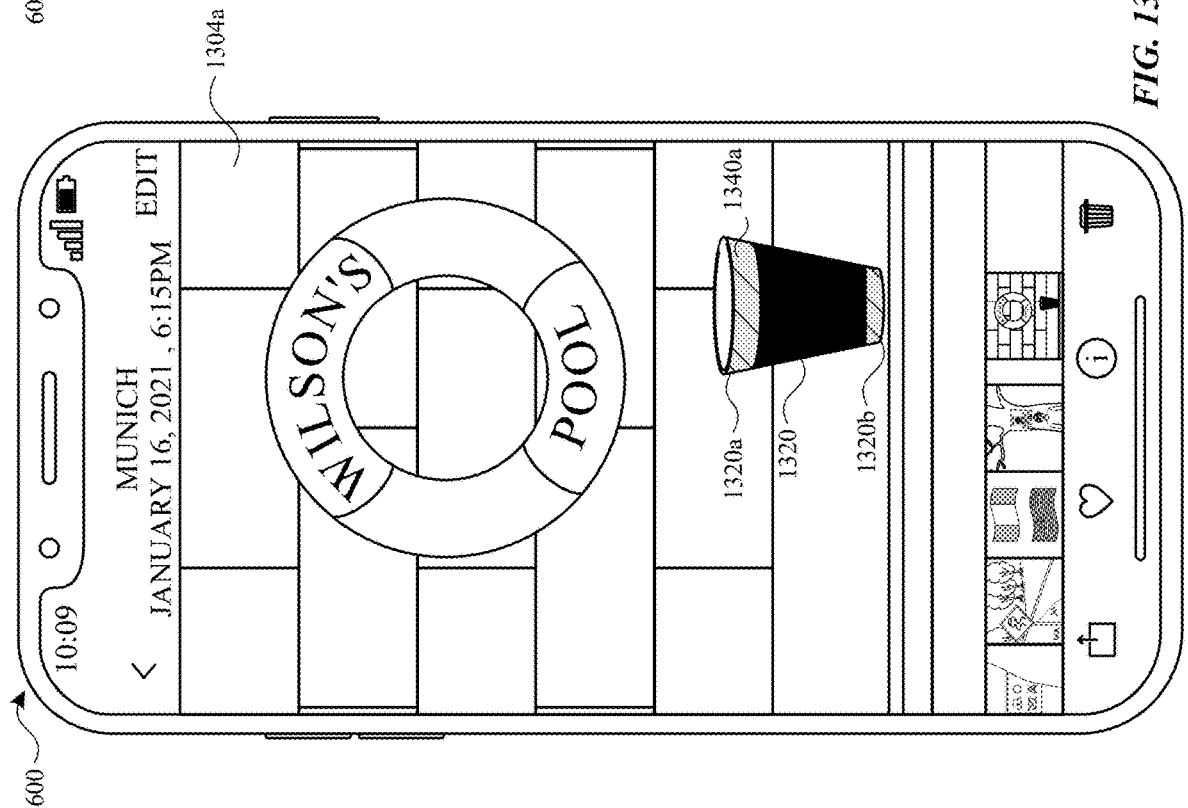
Figure 13H:
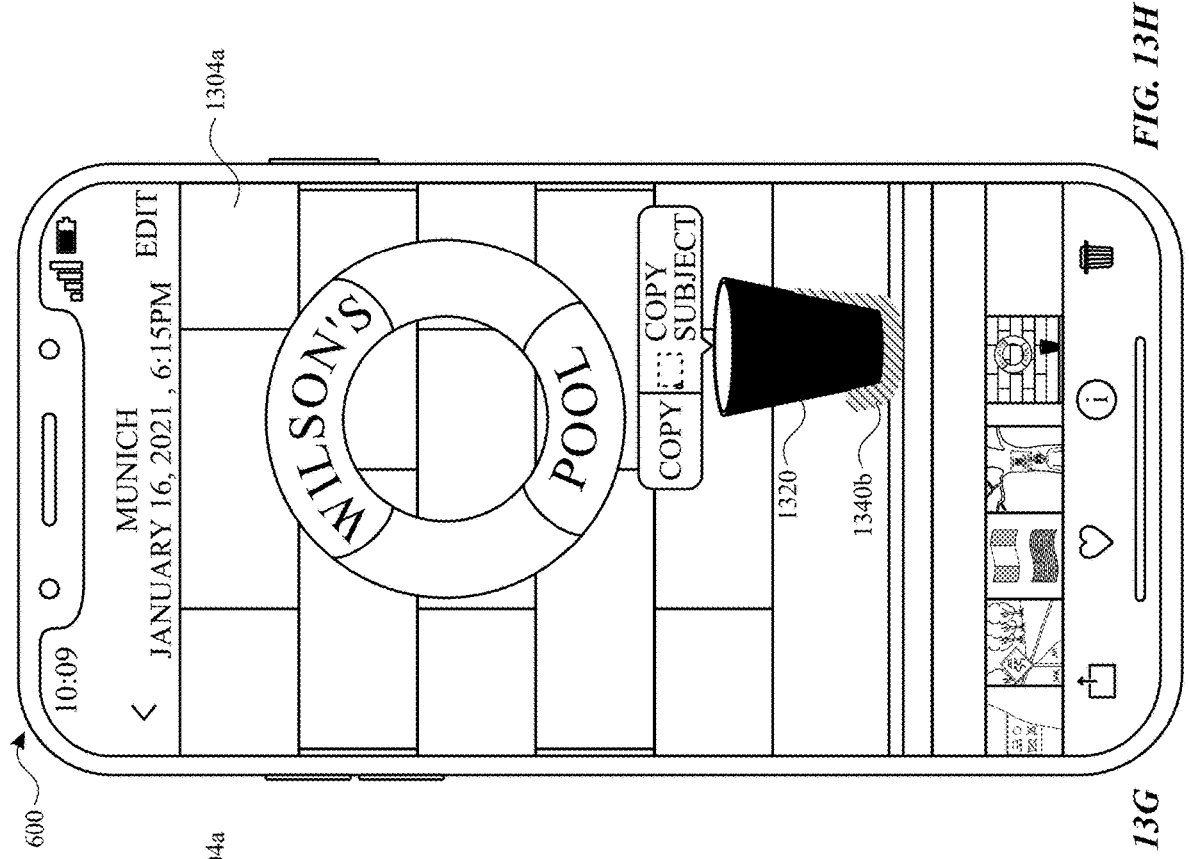
Figure 13G:
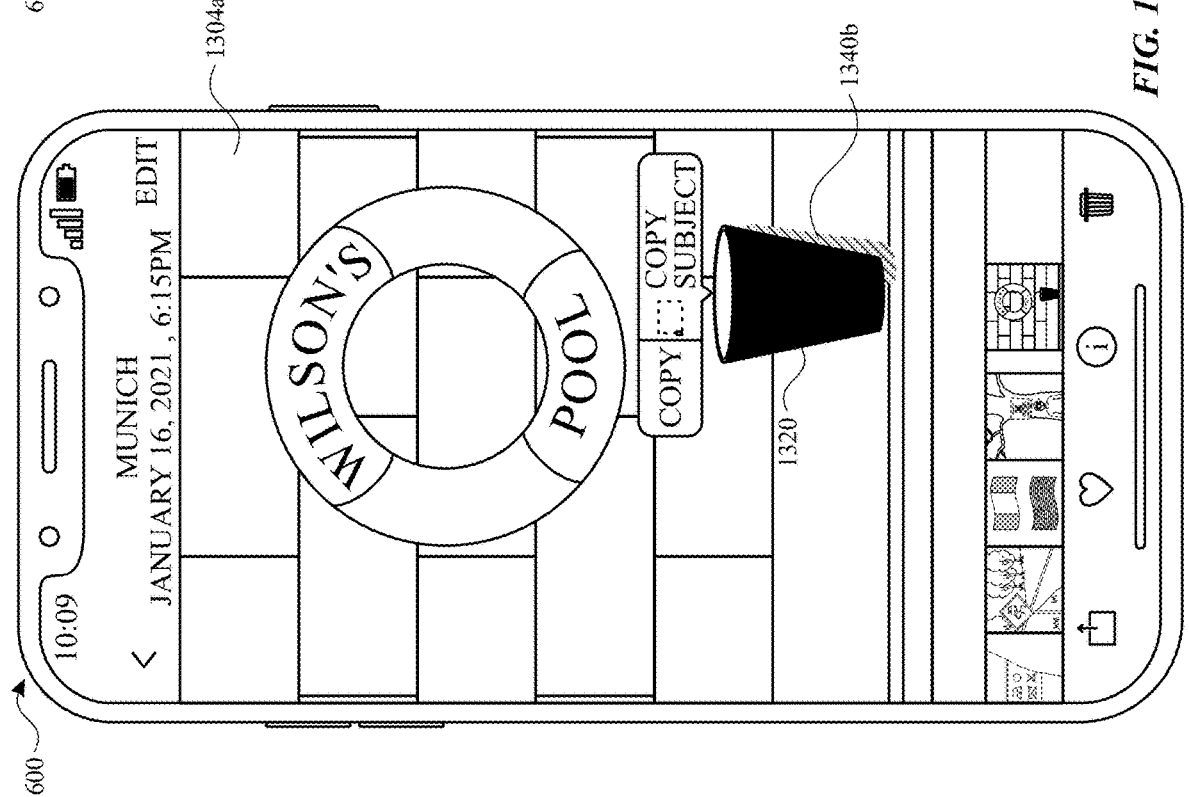
Figure 13J:
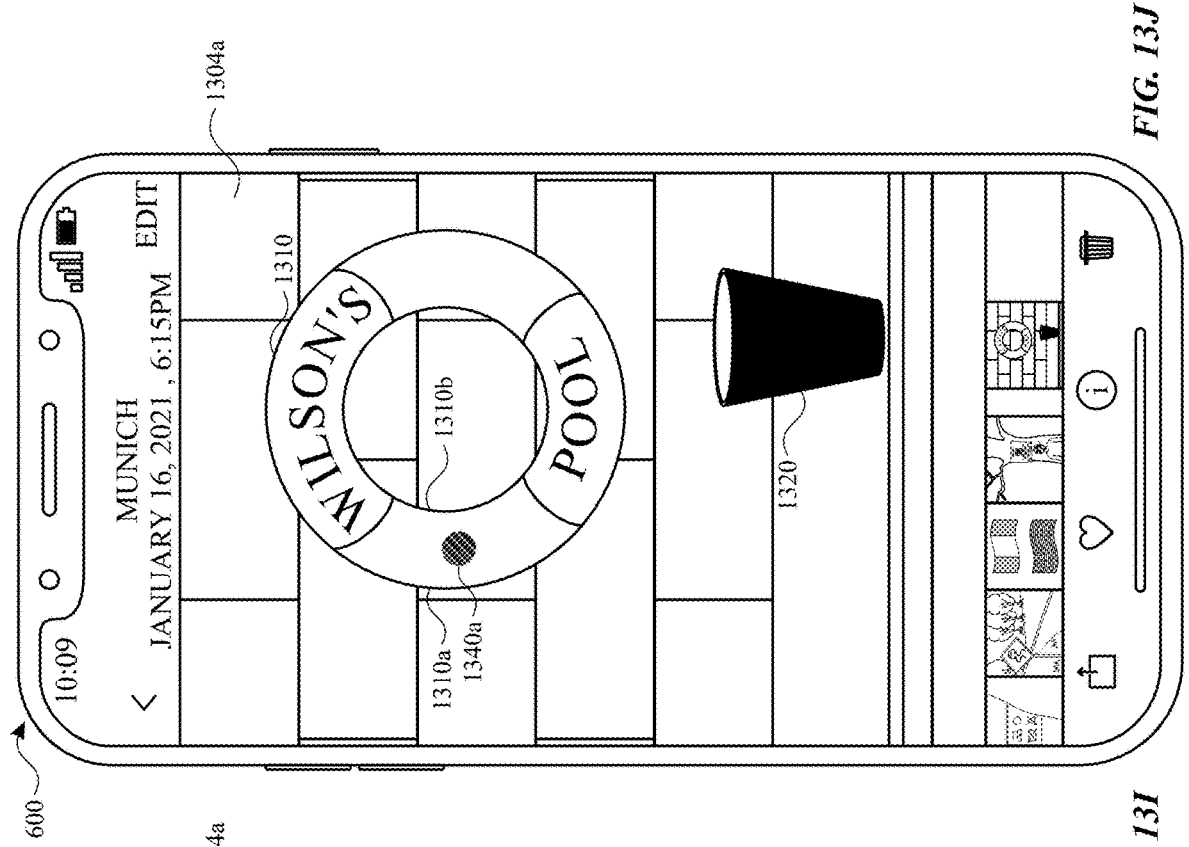
Figure 13I:
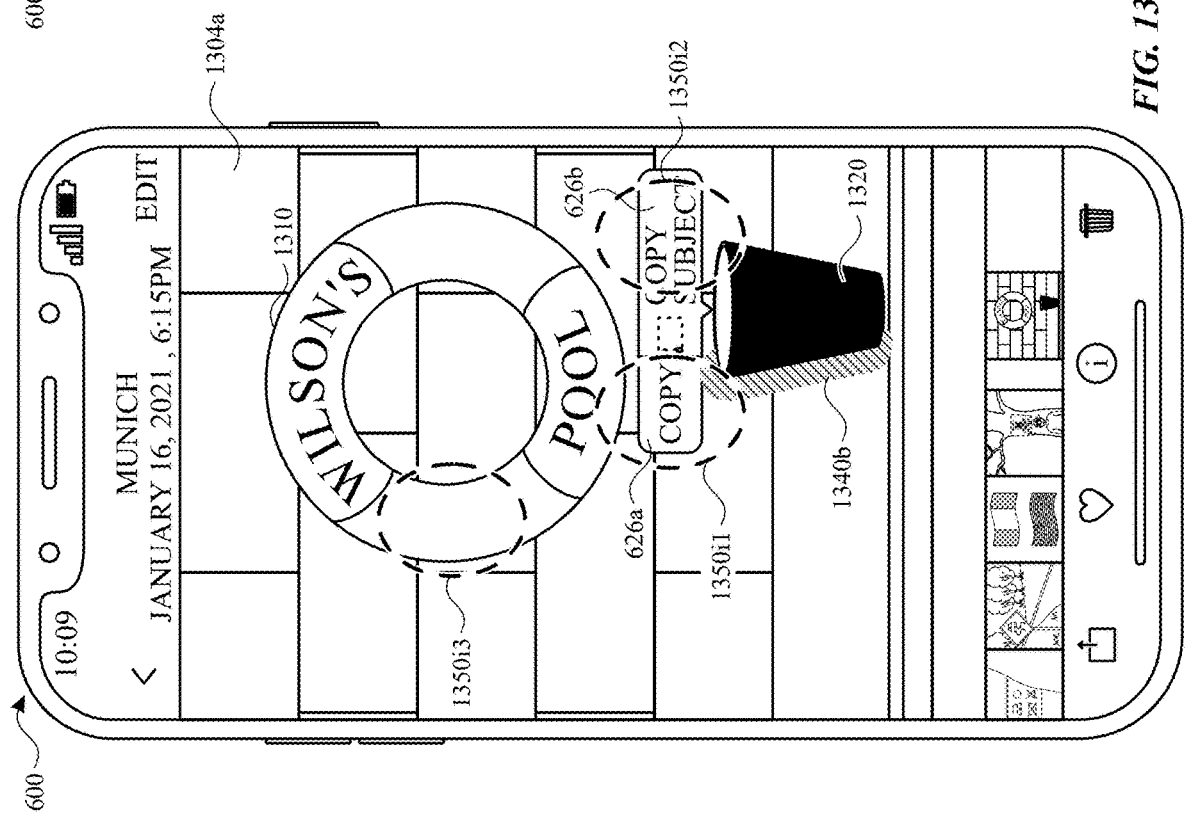
Figure 13K:
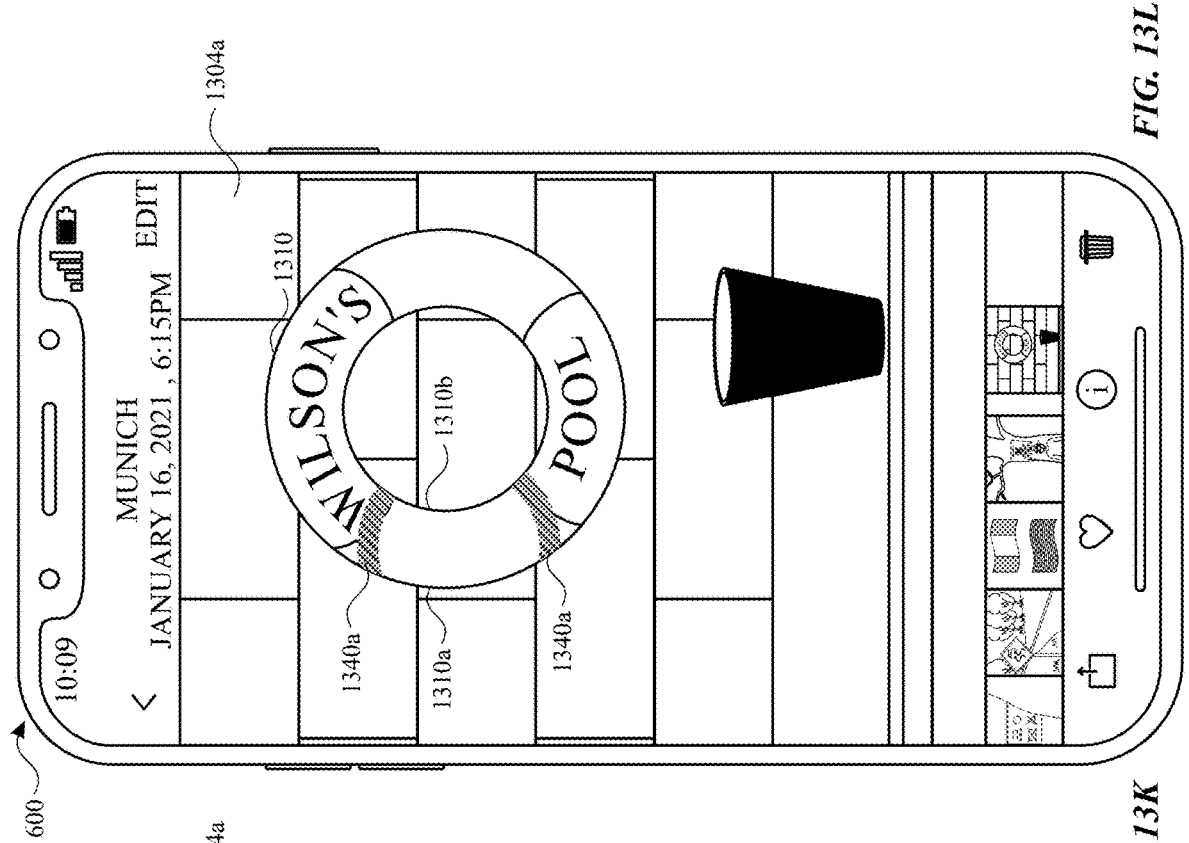
Figure 13L:
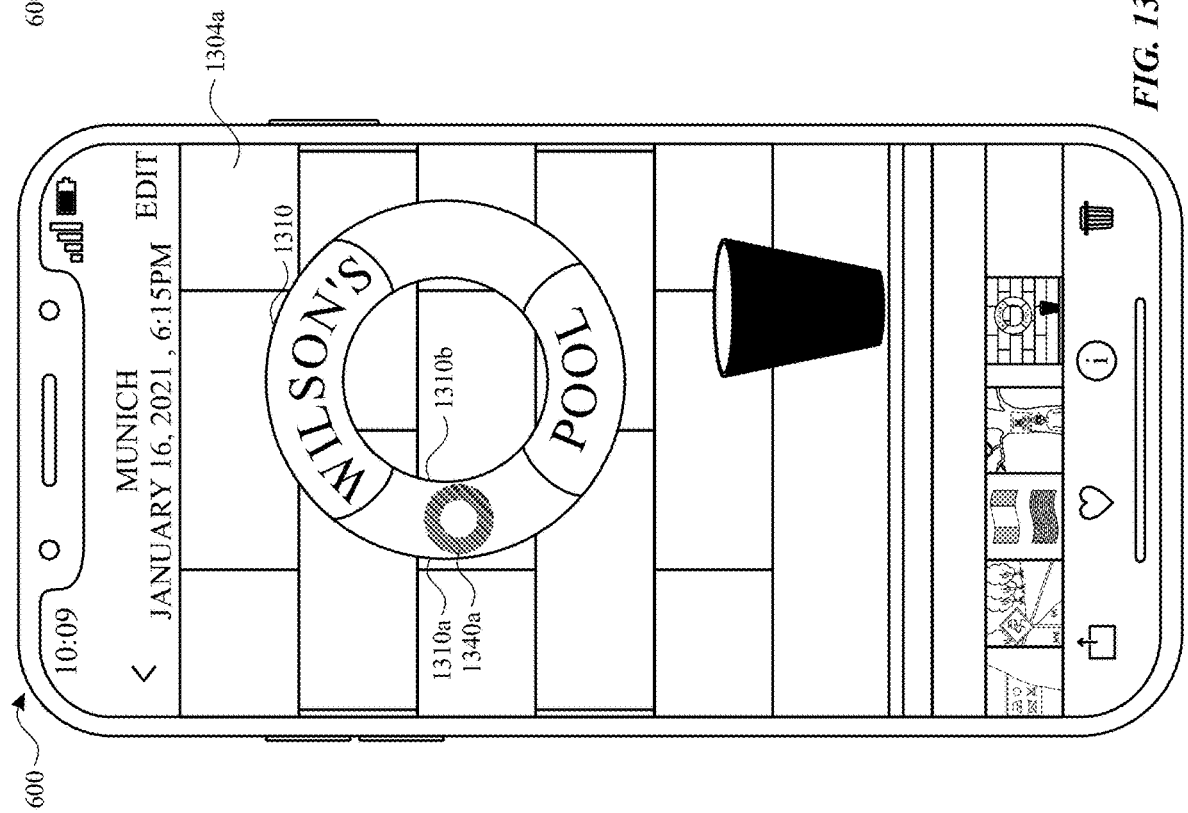
Figure 13M:
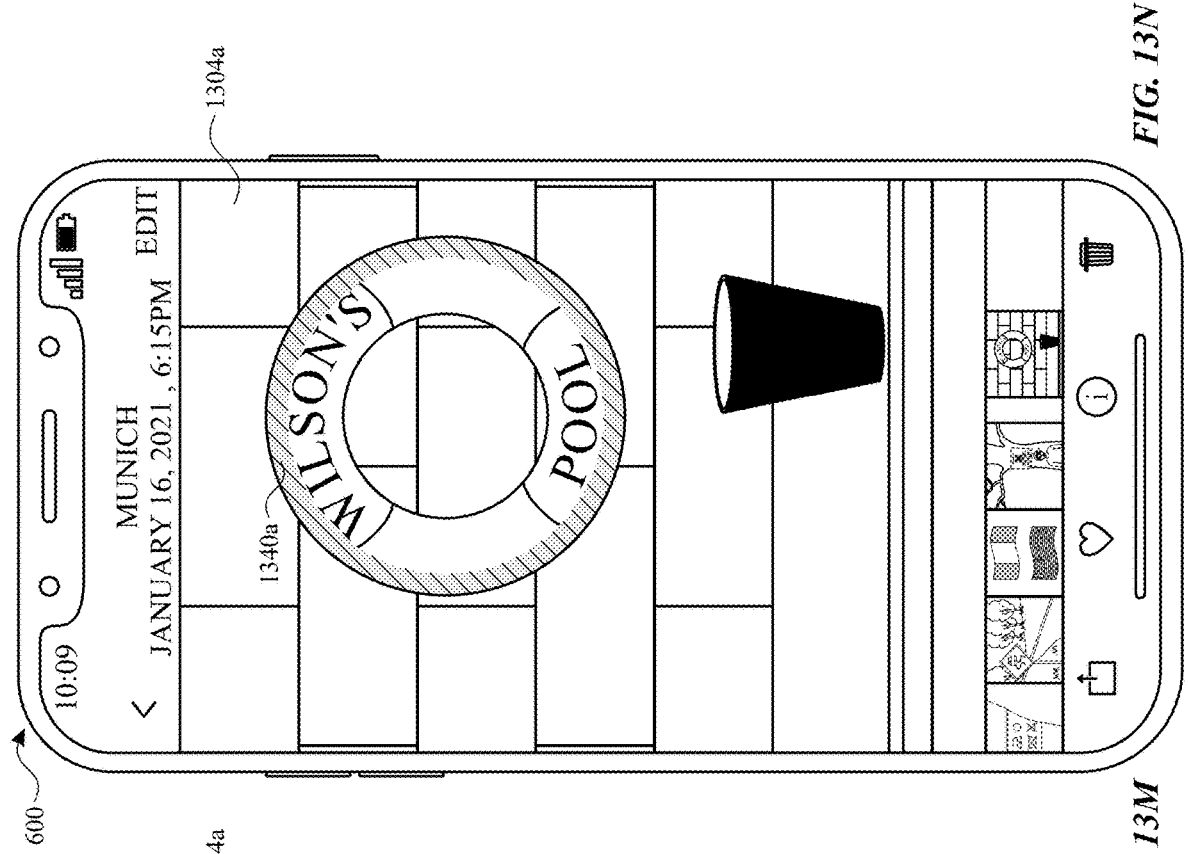
Figure 13N:
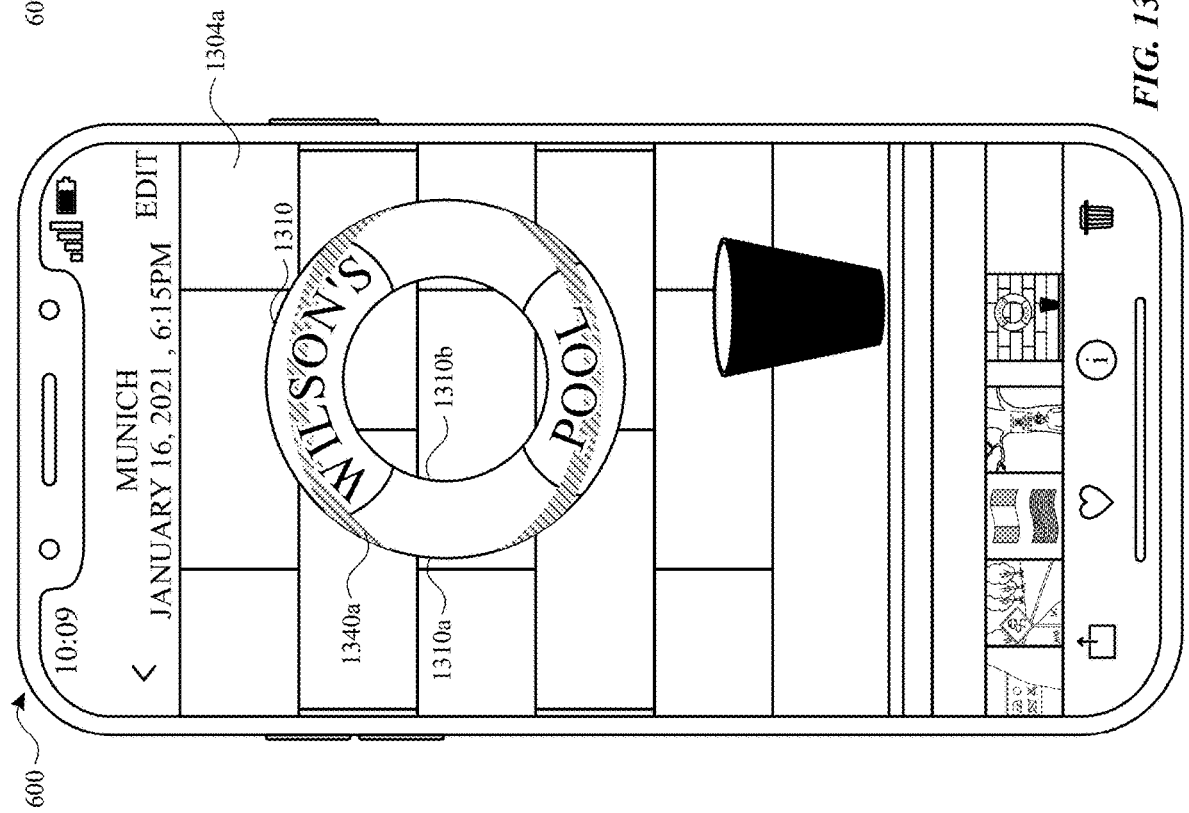
Figure 13O:
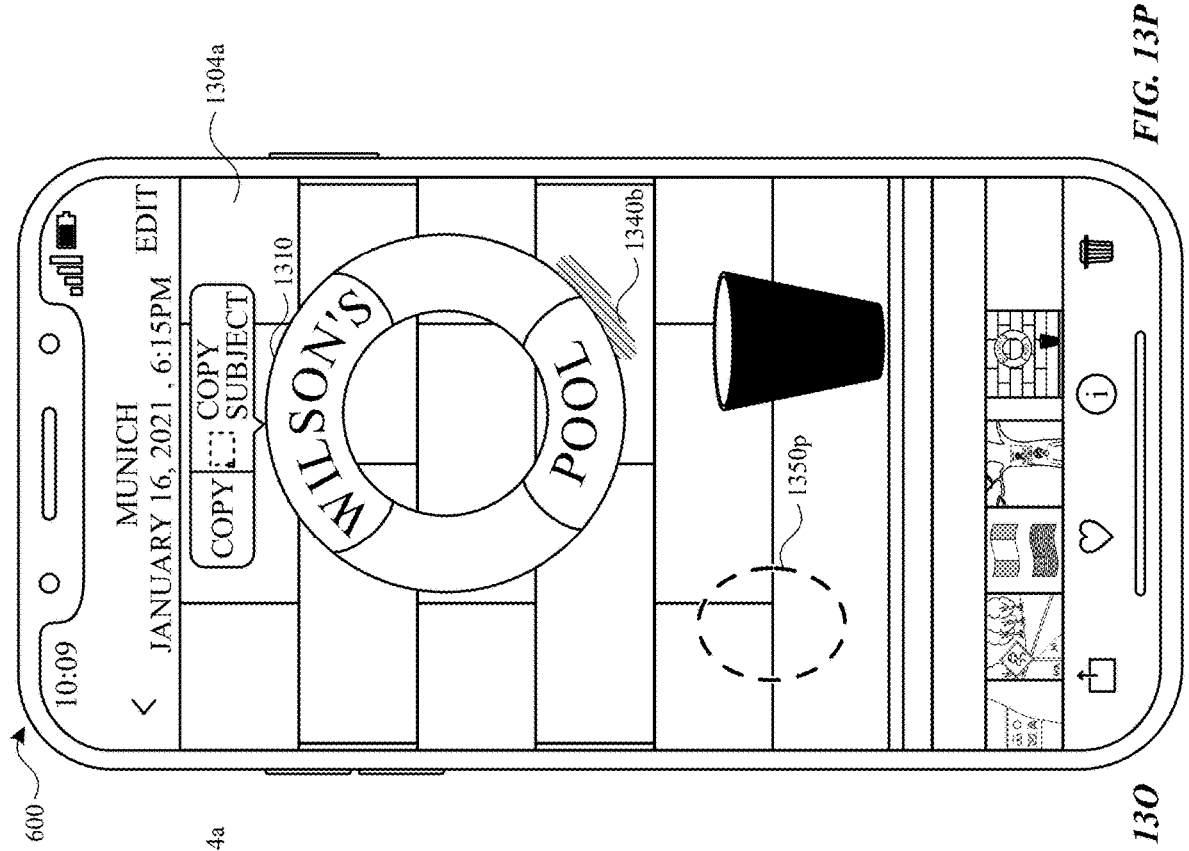
Figure 13P:
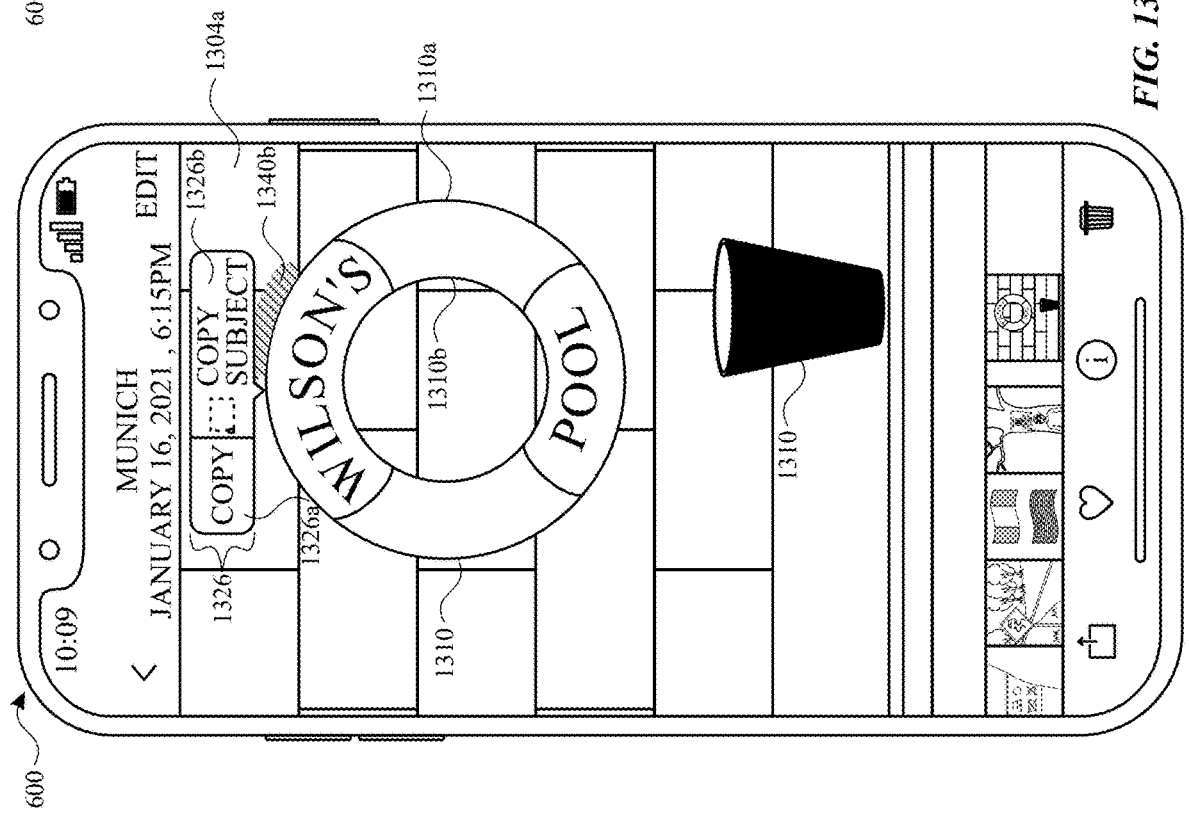
Figure 13Q:
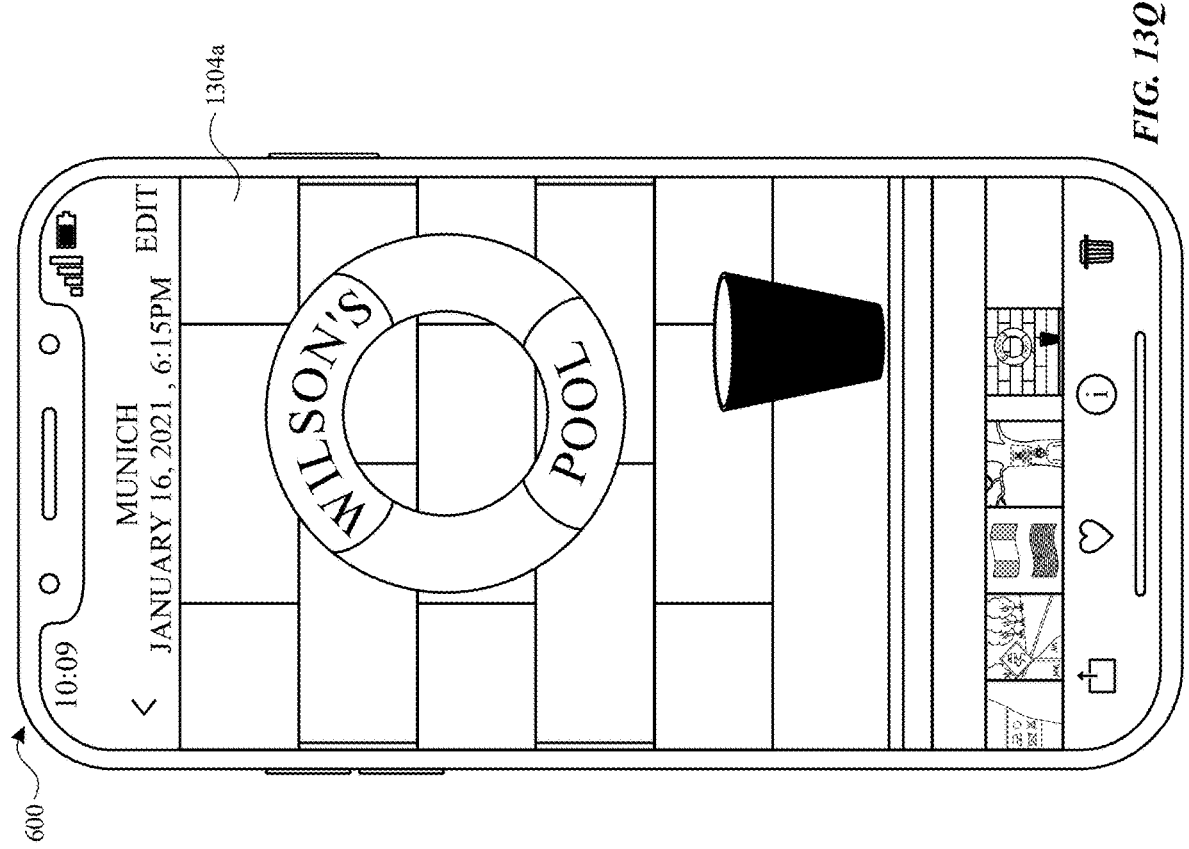
Figure 13R:
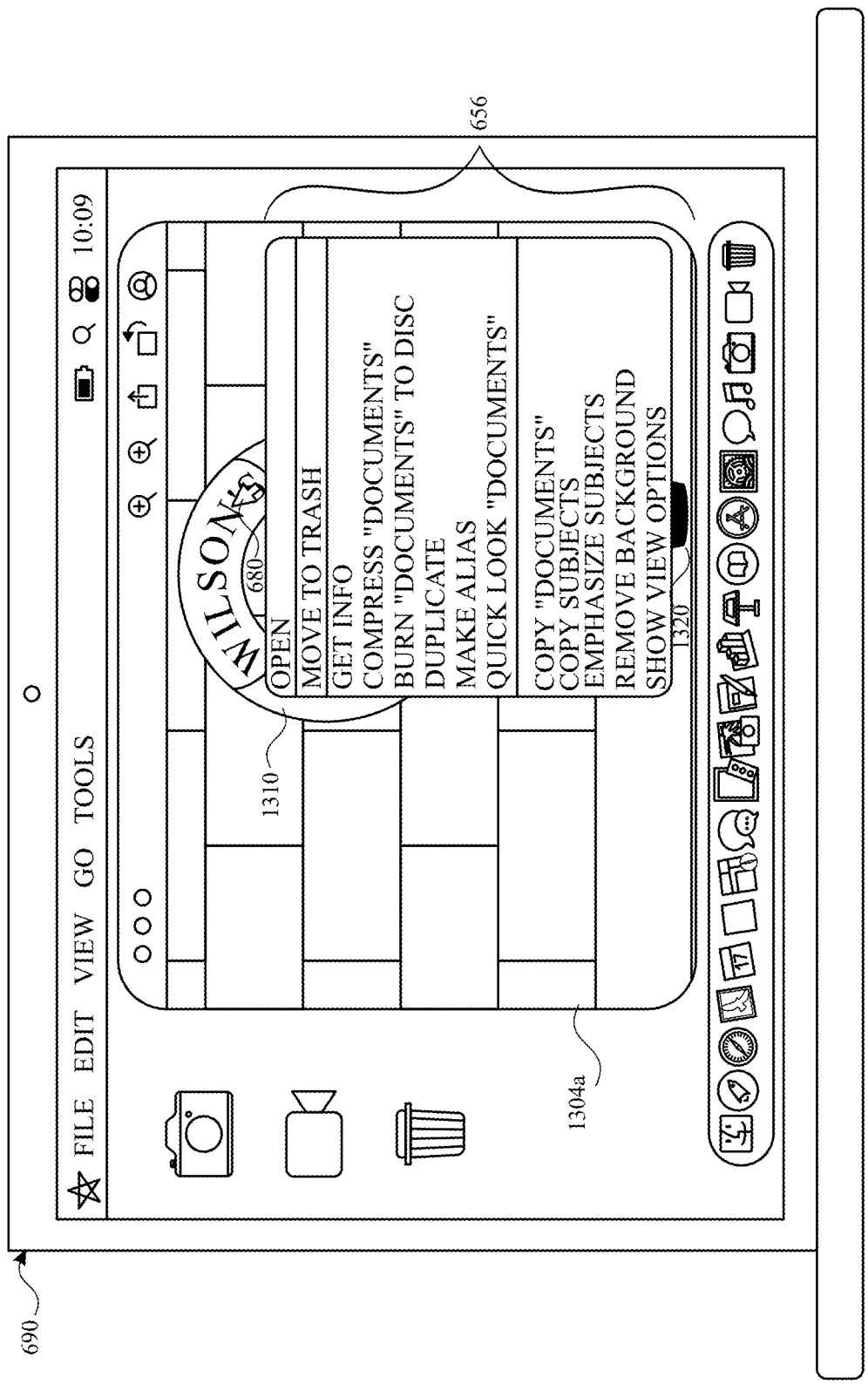
Figure 13S:
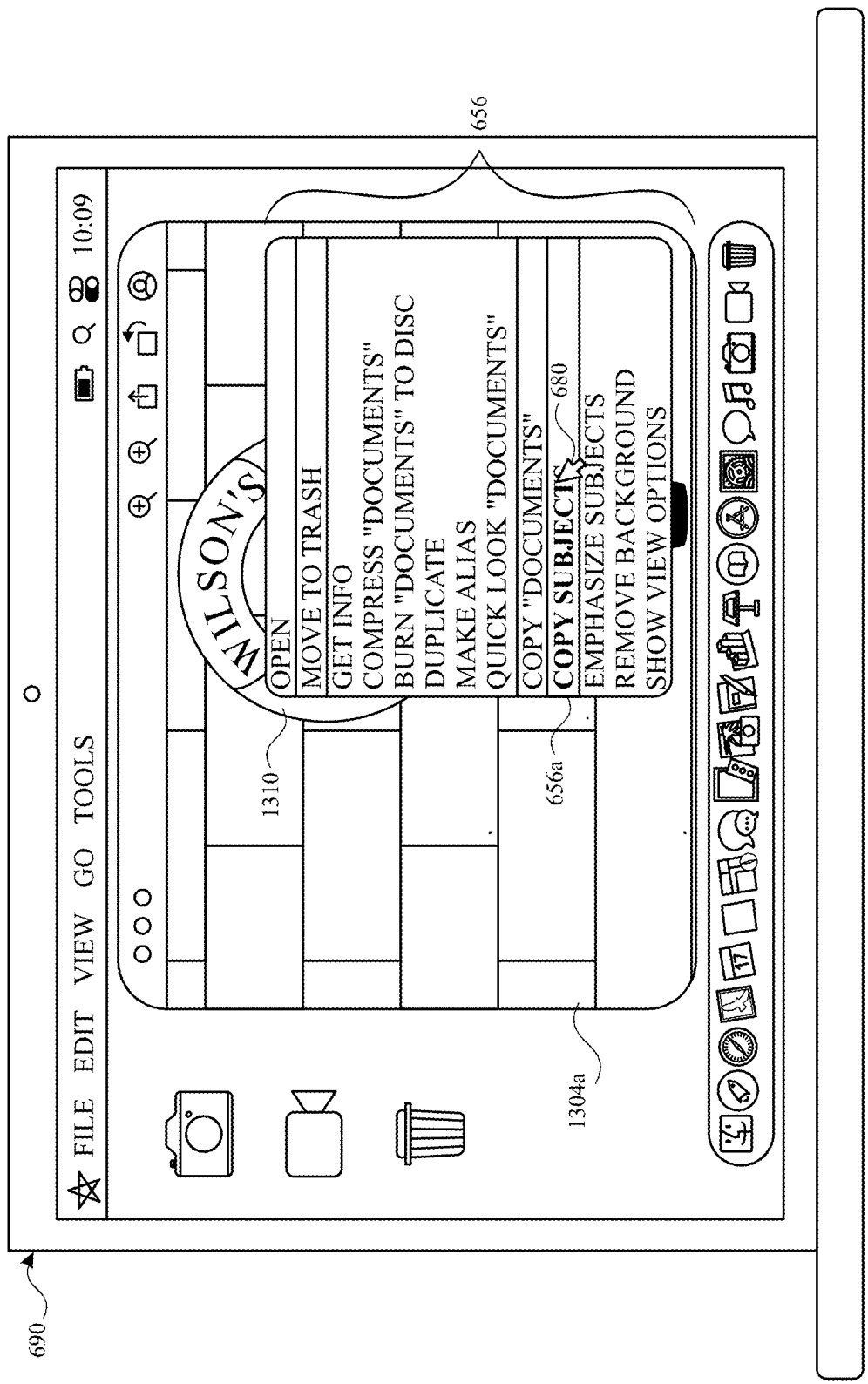
Figure 13T:
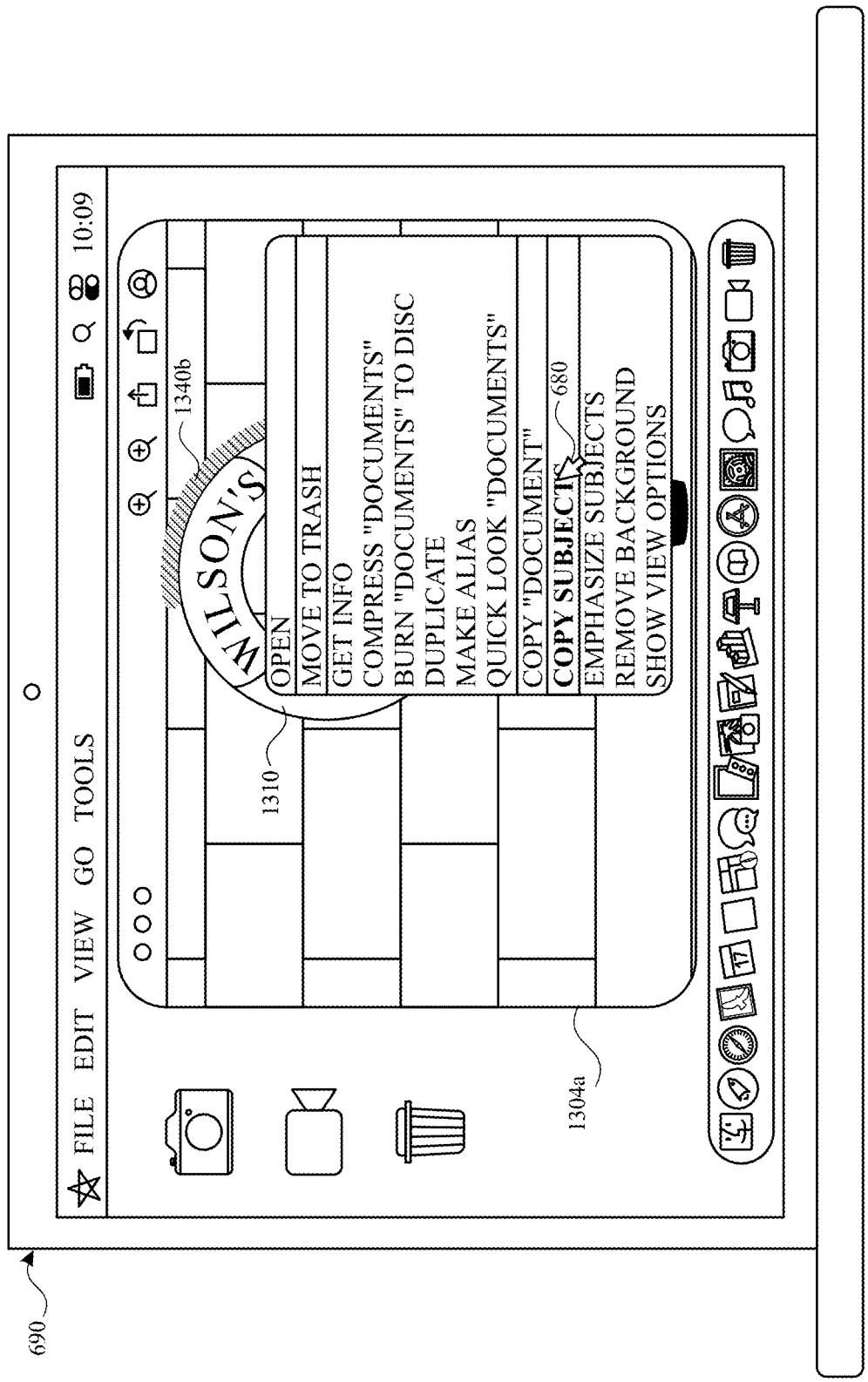

FIGS. 13A-13T illustrate exemplary user interfaces for providing one or more animations for detected objects in a media representation in accordance with some embodiments. FIG. 14 is a flow diagram illustrating methods of providing one or more animations for detected objects in a media representation in accordance with some embodiments. The user interfaces in FIGS. 13A-13T are used to illustrate the processes described below, including the processes in FIG. 14.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
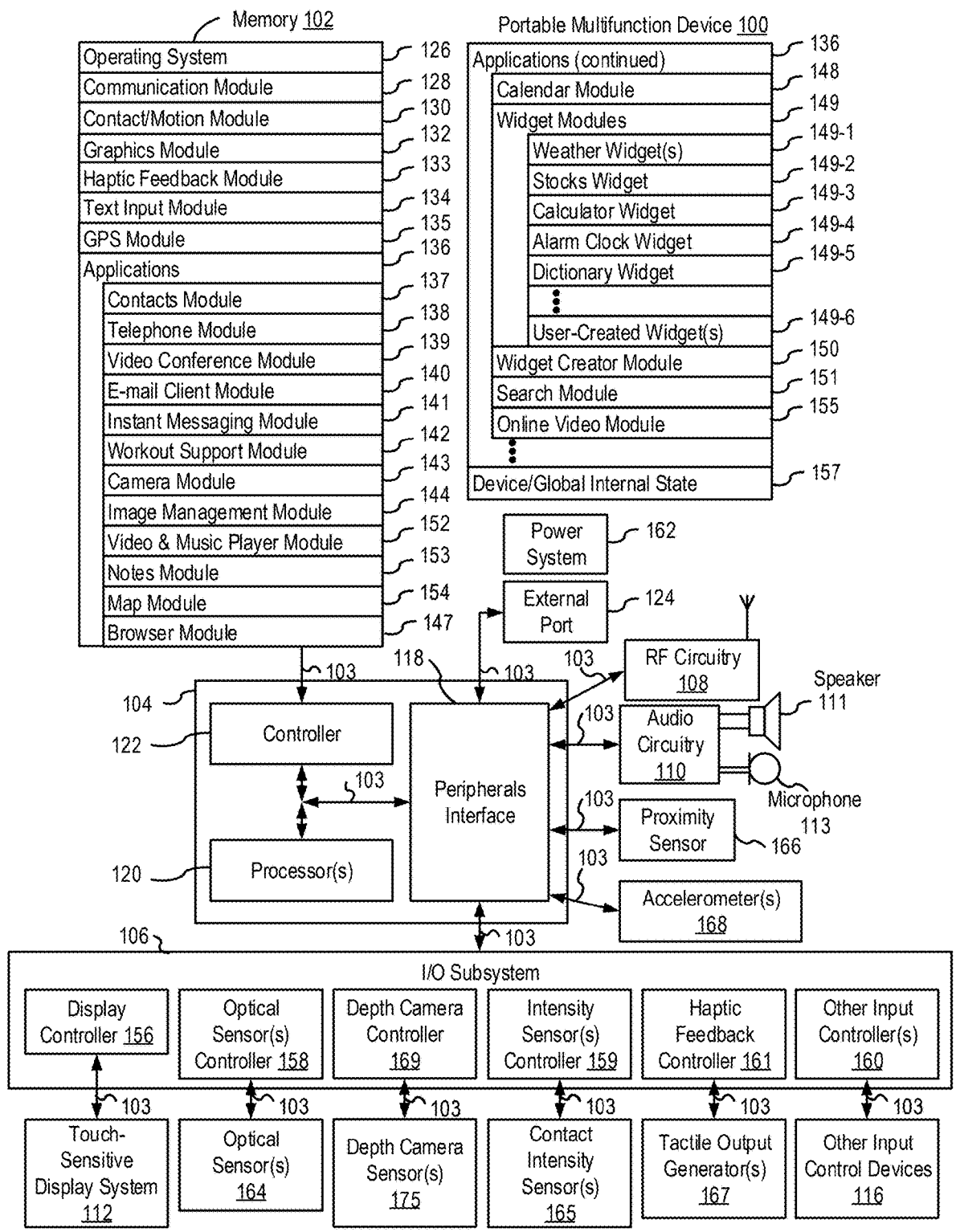
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio.

The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management, and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three-dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
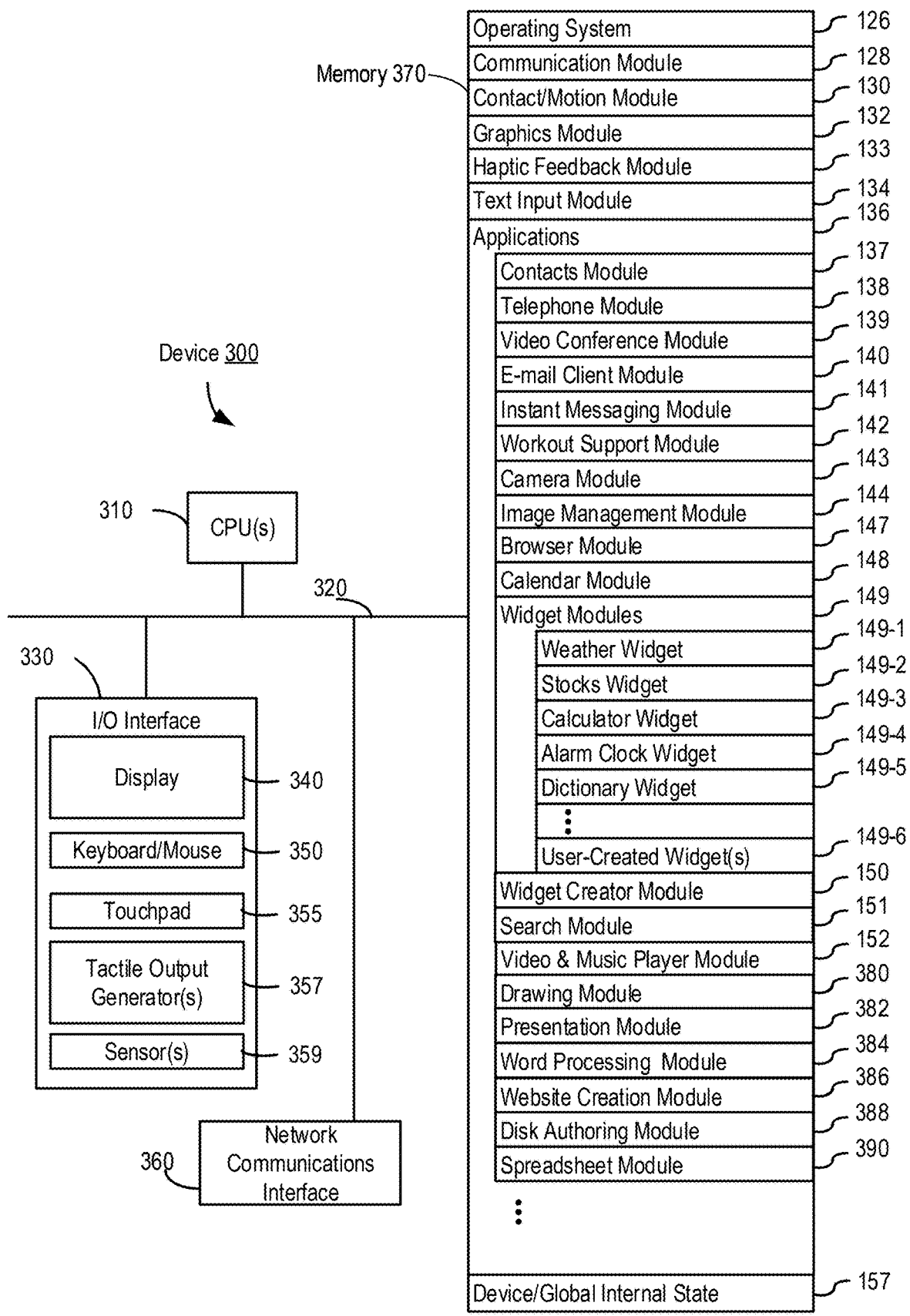
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, instant messaging module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138 telephone client module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
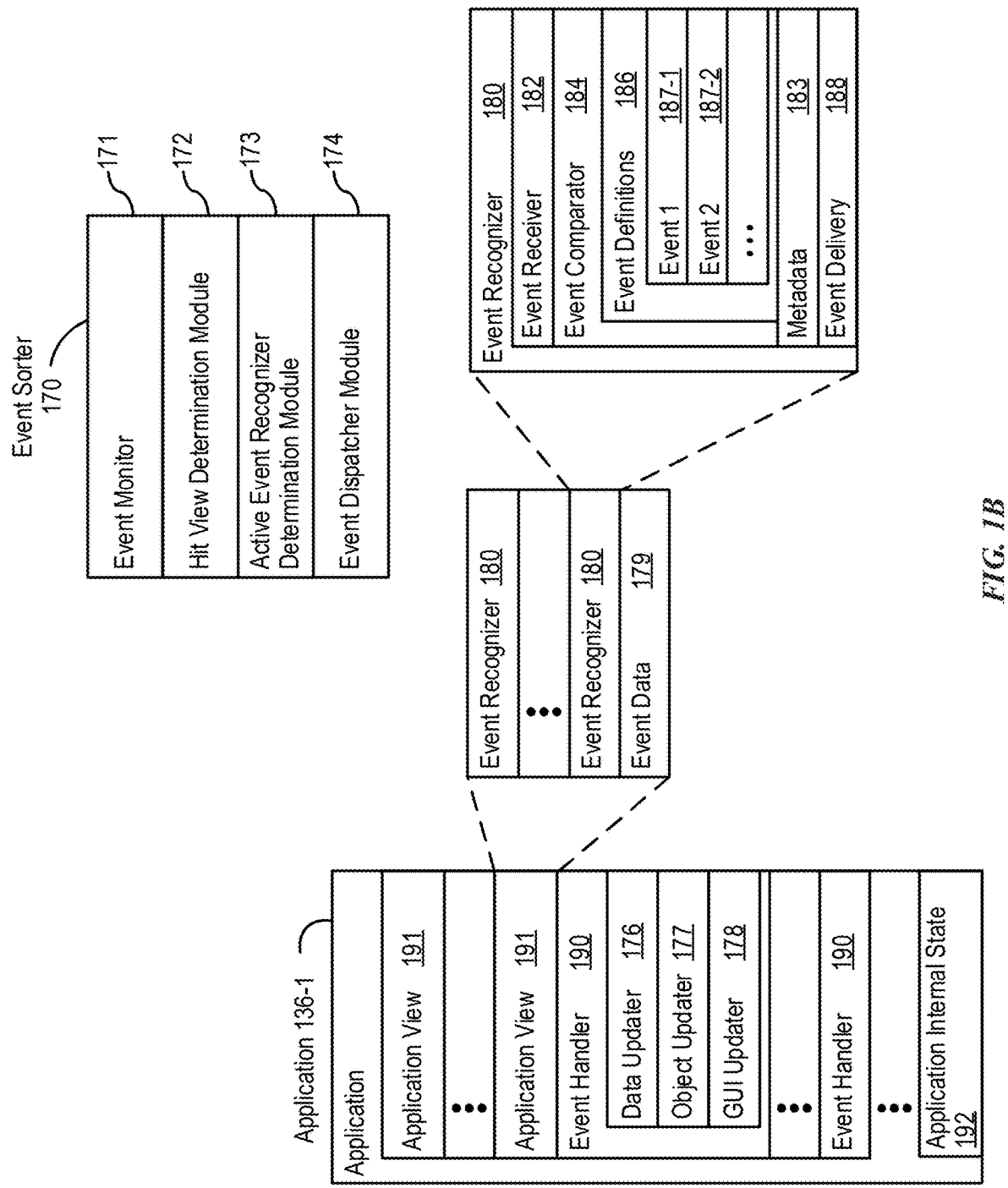
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
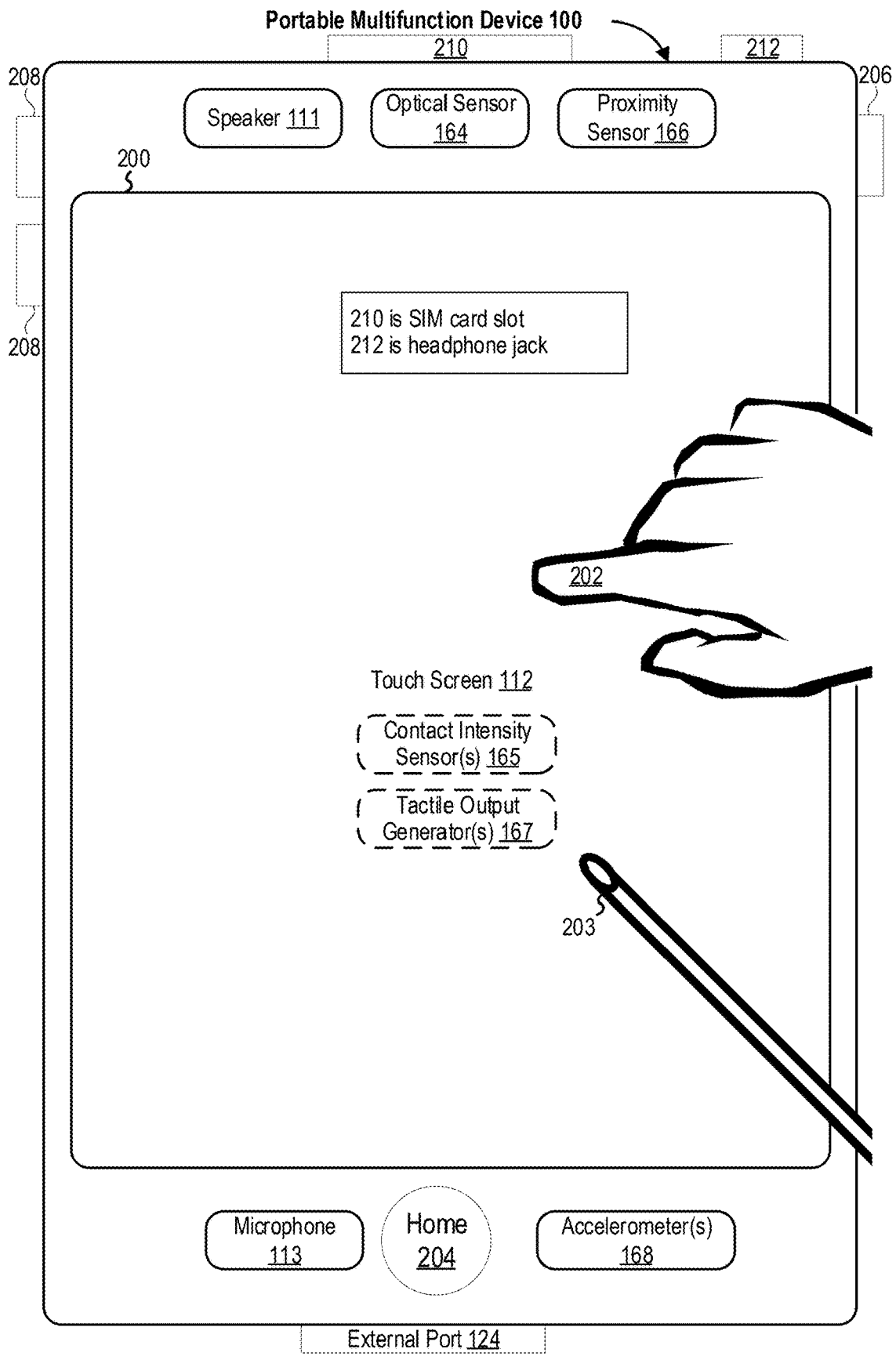
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
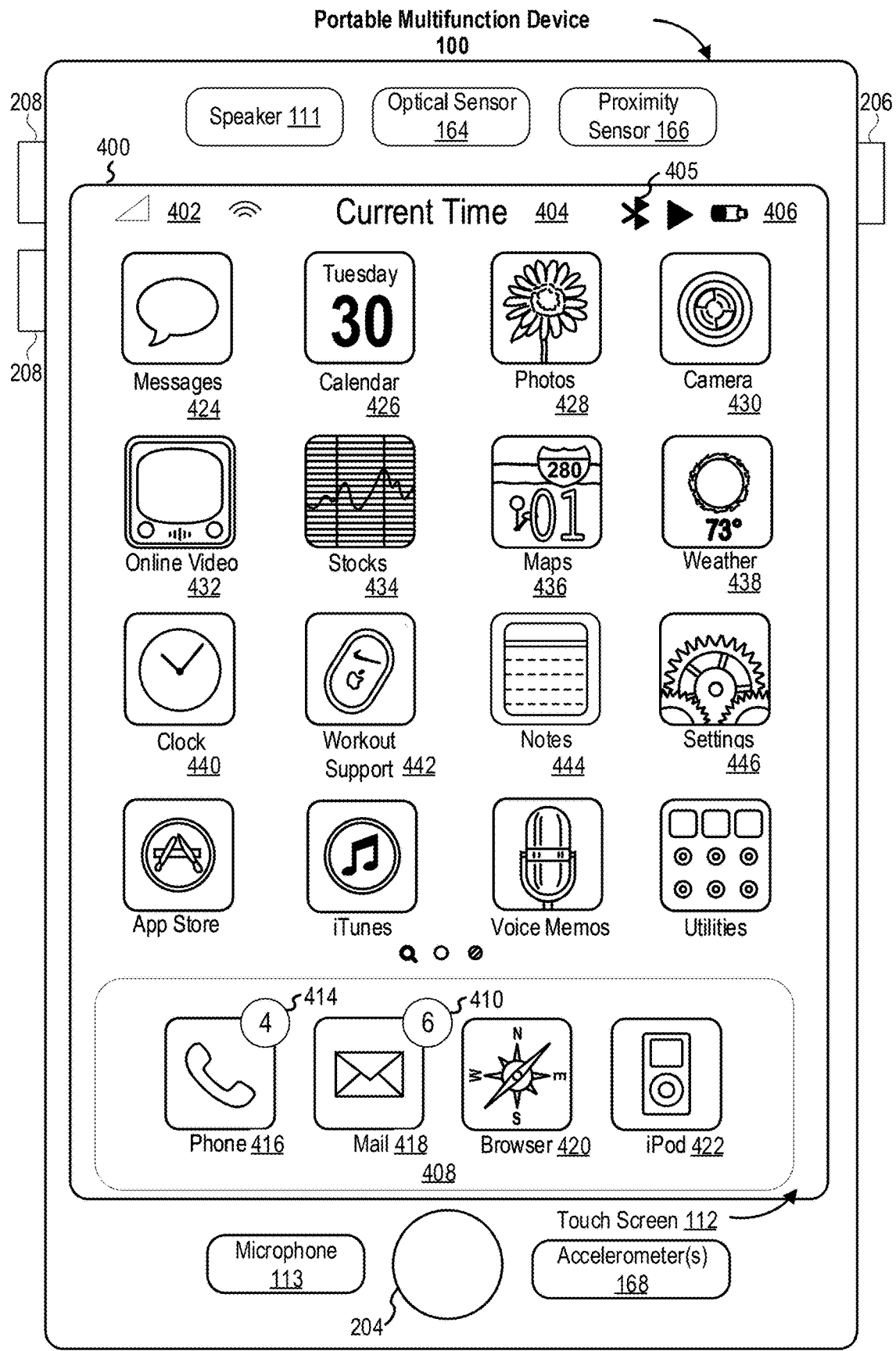
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
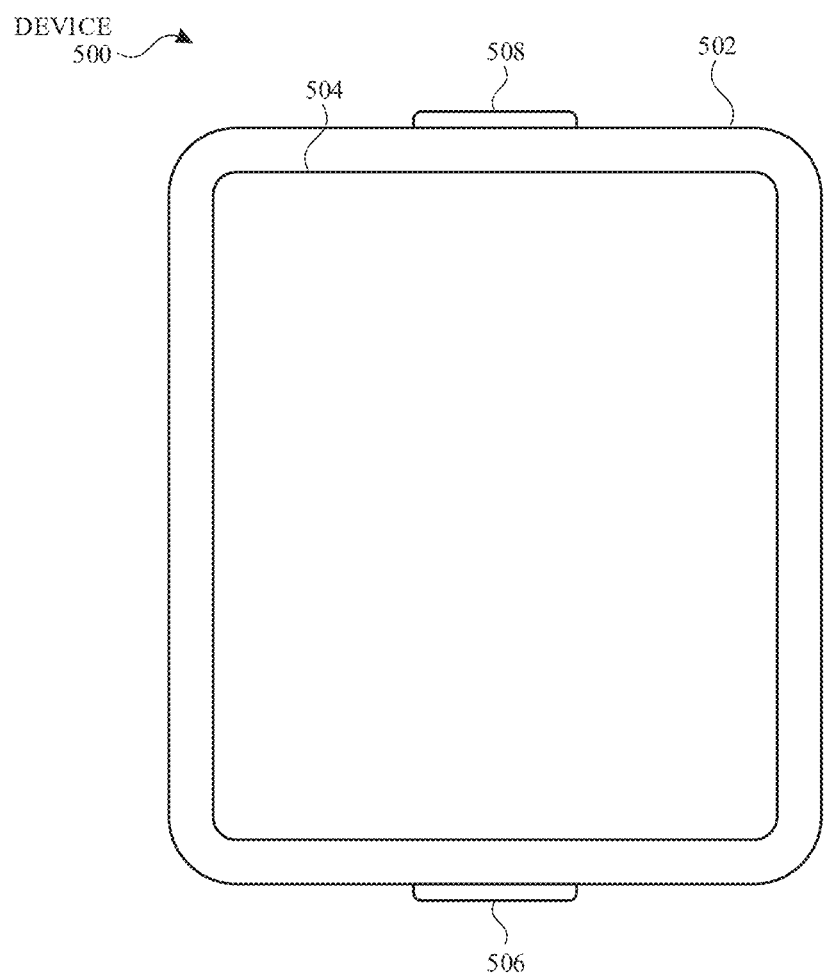
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
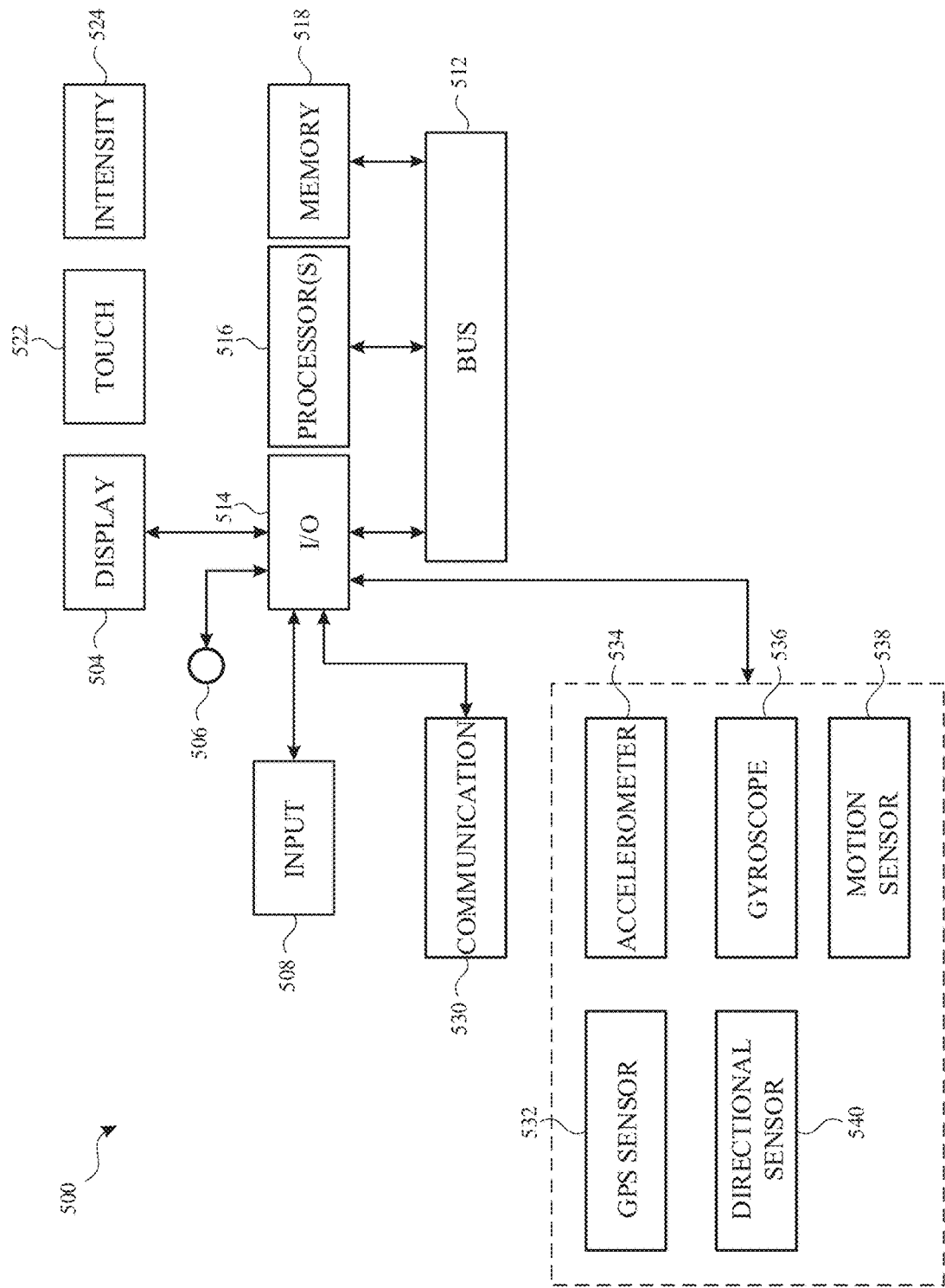
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1200, and 1400 (FIGS. 7, 8, 10, 12, and 14). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6M illustrate exemplary user interfaces for managing one or more portions of a media representation in accordance with some embodiments. The user interfaces in FIGS. 6A-6M are used to illustrate the processes described below, including the processes in FIGS. 7 and 8.

FIG. 6A illustrates computer system 600 displaying a web browser user interface.

The web browser user interface includes browser control region 602, browser display region 604, and browser control region 606. Browser control region 602 includes address field 602a, where a web address for a website can be entered so that computer system 600 can navigate to the website. Browser display region 604 is positioned between application control regions 602 and 606. In FIG. 6A, computer system 600 is currently displaying media representation 610 that is on a webpage that has a web address that includes "example.com" (e.g., as indicated in address field 602a in browser display region 604). As illustrated in FIG. 6A, media representation 610 depicts subject 610a (e.g., a cat) and subject 610b (e.g., a lizard) in a physical environment. Media representation 610 includes background 610c (e.g., tree trunk and line behind tree trunk in FIG. 6A). Browser control region 606 includes one or more controls for interacting with a web browser application that corresponds to the web browser user interface. Browser control region 606 includes back control 606a (e.g., where, in response to detecting selection of back control 606a, computer system 600 displays a webpage for a previously visited web address in a first direction in a queue of recently visited web addresses), forward control 606b (e.g., where, in response to detecting a selection of forward control 606b, computer system 600 displays a webpage for a previously visited web address in a second direction in a queue of recently visited web addresses), share control 606c (e.g., where, in response to detecting a selection of share control 606c, computer system 600 initiates a process for sharing visual content from a web address, history control 606d (e.g., where, in response to detecting a selection of history control 606d, computer system 600 displays a list of previously visited web addresses), and navigation control 606e (e.g., where, in response to detecting a selection of navigation control 606e, computer system 600 displays one or more objects for navigating to different previously displayed webpages). In some embodiments, computer system 600 includes one or more components of electronic devices 100, 300, and/or 500. At FIG. 6A, computer system 600 detects tap input 650a1 on (e.g., directed to and/or at a location that corresponds to) share control 606c or press-and-hold input 650a2 on (e.g., directed to and/or at or directed to a location that corresponds to) media representation 610. In some embodiments, tap input 650a1 and/or press-and-hold input 650a2 (as well as other inputs described below) can be one or more other inputs, such as a mouse click and/or a hover input (e.g., mouse hovering over a particular location).

As illustrated in FIG. 6B, in response to detecting input 650a1 on share control 606c (or, in some embodiments, press-and-hold input 650a2), computer system 600 displays share user interface 616. Share user interface 616 includes exit control 616a (e.g., where, in response to detecting an input directed to exit control 616a, computer system 600 ceases to display share user interface 616 and, in some embodiments, re-displays the web browser user interface of FIG. 6A), media representation 620, share-with-user region 622, share-via-application region 624, and controls menu 626. Media representation 620 is a version of media representation 610 (e.g., a thumbnail representation of media 610 and/or a reduced-sized version of media representation 610). Media representation 620 includes subject 610a (e.g., a cat) and subject 610b (e.g., a lizard) in a physical environment (e.g., that includes background 610c), which were also included in media representation 610. Share-with-user region 622 includes a group of share controls (e.g., 622a-622d) that, when an individual share control of the group of share controls is selected, causes computer system 600 to share media representation 620 with one or more computer systems and/or accounts that are associated with the individual share control. As illustrated in FIG. 6B, share-with-user region 622 includes share-with-David control 622a (e.g., where, in response to detecting an input directed to share-with-David control 622a, computer system 600 shares media representation 620 to an account and/or a computer system associated with a user named "David Appleseed"), share-with-mountaineers 622b (e.g., where, in response to detecting an input directed to share-with-mountaineers control 622b, computer system 600 shares media representation 620 to an account and/or a computer system associated with a user and/or a group of users named "Mountaineers"), share-with-Sarah 622c (e.g., where, in response to detecting an input directed to share-with-Sarah 622c, computer system 600 shares media representation 620 to an account and/or a computer system associated with a user named "Sarah Apples"), and share-with-Andrew 622d (e.g., where, in response to detecting an input directed to share-with-Andrew 622d, computer system 600 shares media representation 620 to an account and/or a computer system associated with a user named "Andrew Casey"). As illustrated in FIG. 6B, computer system 600 displays each of the share controls with an indication (e.g., transmission-mechanism indications 622a1 and/or 622a2) that represents an application and/or mechanism that computer system 600 will share media representation 620 in response to computer system 600 detecting a selection of an individual share control. For example, in response to detecting an input directed to share-with-David control 622a, computer system 600 shares media representation 620 via a communication-protocol application (e.g., a Bluetooth and/or wireless protocol application), as indicated by transmission-mechanism indication 622a1. In response to detecting an input directed to share-with-mountaineers control 622b, computer system 600 will share media representation 620 via a messaging application, as indicated by transmission-mechanism indication 622b1. Share-via-application region 624 includes a group of share controls (e.g., 624a-624d) that, when selected, cause computer system 600 to send media representation 620 to an application that corresponds to the selected individual share control. As illustrated in FIG. 6B, share-via-application region 624 includes share-via-drop control 624a (e.g., where, in response to detecting an input directed to share-via-drop control 624a, computer system 600 initiates a process to share media representation 620 via a communication-protocol application), share-via-messages control 624b (e.g., where, in response to detecting an input directed to share-via-messages control 624b, computer system 600 initiates a process to share media representation 620 via a messaging application, such as a text messaging application), share-via-mail control 624c (e.g., where, in response to detecting an input directed to share-via-mail control 624c, computer system 600 initiates a process to share media representation 620 via an e-mail messaging application), and share-via-chat control 624d (e.g., where, in response to detecting an input directed to share-via-chat control 624d, computer system 600 initiates a process to share media representation 620 via a chat application).

As illustrated in FIG. 6B, controls menu 626 includes copy-photo control 626a and copy-subjects control 626b. Copy-photo control 626a is a control that, when selected, causes computer system 600 to copy media representation 620 (e.g., subjects 610a-610b and background 610c) (e.g., to copy data corresponding to media representation 620 into a copy buffer), and copy-subjects control 626b is a control that, when selected, causes computer system 600 to copy subjects 610a-610b without copying background 610c of media representation 610 (e.g., to copy data corresponding to subjects 610a-610b without data corresponding to background 610c into a copy buffer). As illustrated in FIG. 6B, in response to detecting input 650a1, computer system 600 also displays remove-background control 614 that includes background-status indication 614a. In FIG. 6B, background-status indication 614a indicates (e.g., via the checkmark in background status indication 614a) that computer system 600 is currently displaying media representation 620, such that media representation 620 includes background 610c. Notably, at FIG. 6B, computer system 600 displays copy-subjects control 626b and remove-background control 614 (e.g., including background-status indication 614a) because a determination has been made that media representation 620 (or media representation 610 and/or the media item that media representation 610 and/or media representation 620 represents) includes at least one subject (e.g., subjects 610a-610b). Moreover, computer system 600 also displays copy-subjects control 626b because a determination has been made that media representation 620 includes two or more subjects (e.g., subjects 610a-610b). In some embodiments, computer system 600 displays a copy-subjects control based on a determination that is made that a media representation (and/or the media item represented by the media representation) includes one subject (and not multiple subjects). In some embodiments, a subject is a person, animal, and/or object. In some embodiments, in response to detecting an input directed to the copy-subjects control 626b, computer system 600 copies a detected subject without copying background 610c of media representation 610. In some embodiments, computer system 600 does not display remove-background control 614, copy-subjects control 626b, or a copy-subjects control when a determination has been made that a media representation does not include at least one subject. In some embodiments, computer system 600 displays copy-photo control 626a regardless of whether a determination is made based on at least one subject being included in a media representation. At FIG. 6B, computer system 600 detects tap input 650b on remove-background control 614a. In some embodiments, as a part of detecting tap input 650b on remove-background control 614a, computer system 600 detects an input on updates background-status indication 614a.

As illustrated in FIG. 6C, in response to detecting tap input 650b, computer system 600 removes background 610c of FIG. 6B from media representation 620 of FIG. 6C. Thus, at FIG. 6C, media representation 620 includes subjects 610a-610b and does not include background 610c of FIG. 6B. Additionally, computer system 600 updates background-status indication 614a (e.g., no checkmark in background status indication 614a of FIG. 6C) to indicate that computer system 600 has removed background 610 from media representation 620. At FIG. 6C, in response to computer system 600 detecting an input on a share control (e.g., one or more share controls as described above in relation to FIG. 6B), computer system 600 shares media representation 620 that includes subjects 610a-610b and does not include background 610c of FIG. 6B with one or more computer systems and/or applications. In some embodiments, in response to detecting tap input 650c1 on remove-background 614, computer system 600 re-displays the user interface of FIG. 6B and/or displays media representation 620, such that media representation 620 includes subjects 610a-610b and background 610c. In some embodiments, in response to detecting tap input 650c2 on exit control 616a, computer system 600 re-displays the user interface of FIG. 6A (e.g., with background 610c being removed from media representation 610 of FIG. 6A). Looking back at FIG. 6A, computer system 600 alternatively (e.g., alternative to detecting tap input 650*a*1) detects press-and-hold input 650*a*2 on media representation 610.

As illustrated in FIG. 6D, in response to detecting press-and-hold input 650*a*2 (or, in some embodiments, tap input 650*a*1), computer system 600 displays media representation 612 and menu 636. Media representation 612 is a version of media representation 610 (e.g., a reduced-sized version of media representation 610). In response to detecting press-and-hold input 650*a*2, computer system 600 displays remove-background control 614 that includes background-status indication 614*a* on top of media representation 610, using one or more similar techniques as described above in relation to FIGS. 6B-6C. Menu 636 includes copy-photo control 626*a* and copy-subjects control 626*b*, which computer system 600 displays using one or more similar techniques as described above in relation to FIGS. 6B-6C. Menu 636 also includes other controls, such as share control 636*d* (where, in response to detecting an input directed to share control 636*d*, computer system 600 displays the user interface of FIG. 6B), add-to-photos control 636*e* (e.g., where, in response to detecting an input directed to add-to-photos control 636*e*, computer system 600 adds the currently displayed media representation 612 to a gallery of media items), copy-subjects-for-later control 636*f* (e.g., where, in response to detecting an input directed to copy-subjects-for-later control 636*f*, computer system 600 copies subjects 610*a*-610*b* and saves one or more graphical objects that include subject 610*a* without background 610*c* and subject 610*b* without background 610*c*), and look-up control 636*g* (e.g., where, in response to detecting an input directed to look-up control 636*g*, computer system 600 initiates a process to provide additional information (e.g., location information that a media item was captured, file size of a representation of a media item, and/or one or more media items that are associated with the media item) that corresponds to media representation 612). In some embodiments, in response to detecting input 650*d*2 on copy-subjects control 626*b*, computer system 600 copies subjects 610*a*-610*b* to a copy buffer (or one or more applications) without copying subjects 610*c* to the copy buffer (or one or more applications). In some embodiments, in response to detecting input 650*d*3 directed to copy-subjects-for-later control 636*f*, computer system 600 saves the one or more files that include subject 610*a* without background 610*c* and subject 610*b* without background 610*c*, such that a representation (e.g., a graphical object) of subject 610*a* (e.g., without background 610) and/or a representation (e.g., a graphical object) of subject 610*b* (e.g., without background 610) can be selected via a keyboard input (e.g., such as an input on the keyboard in keyboard region 632 of FIG. 6G described below). In some embodiments, computer system 600 deemphasizes and displays one or more portions of the browser application of FIG. 6A (e.g., such as the text in browser display region 604) while displaying media representation 612 and menu 636, where media representation 612 and menu 636 are emphasized relative to the one or more portions of the browser application of FIG. 6A. In some embodiments, in response to detecting an input directed to remove-background control 614, computer system 600 ceases to display background 610 and continues to display subjects 610*a*-610*b* as a part of media representation 612. At FIG. 6D, computer system 600 detects press-and-hold input 650*d*1 on subject 610*a* (e.g., the cat) and/or tap input 650*d*2 on copy-subjects control 626*b*.

Figure 6E:
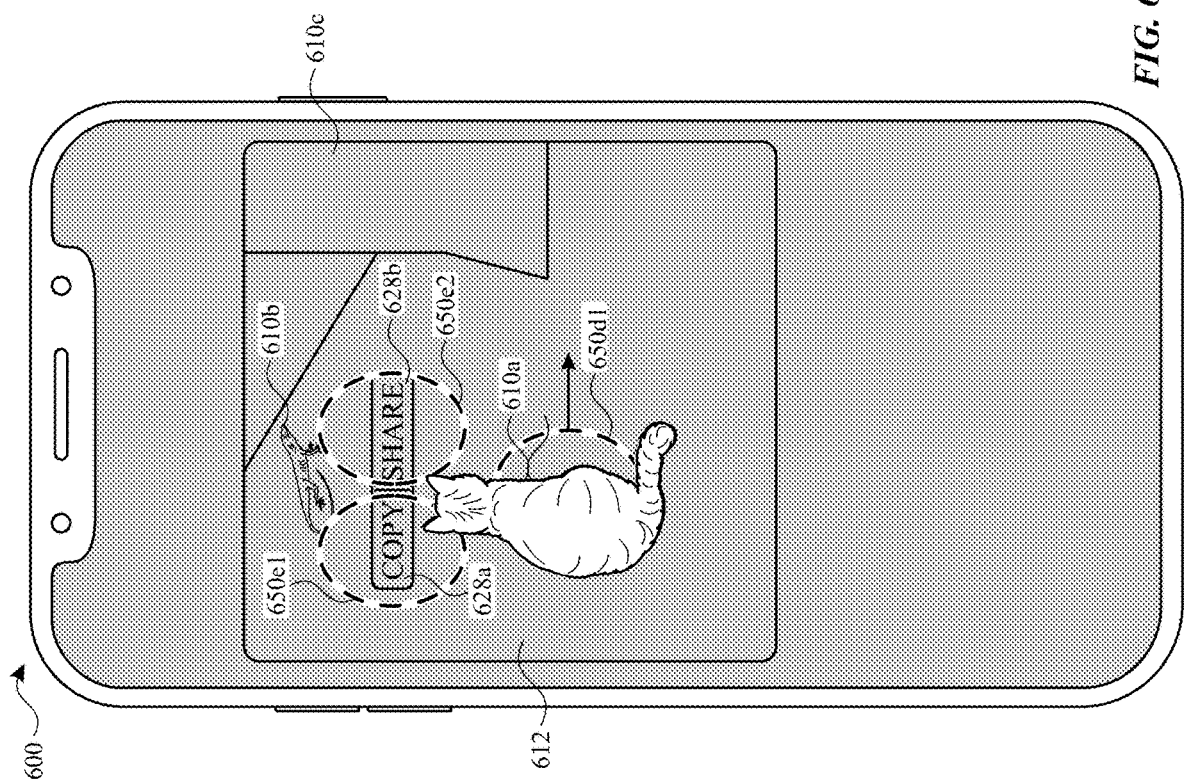
Figure 7:
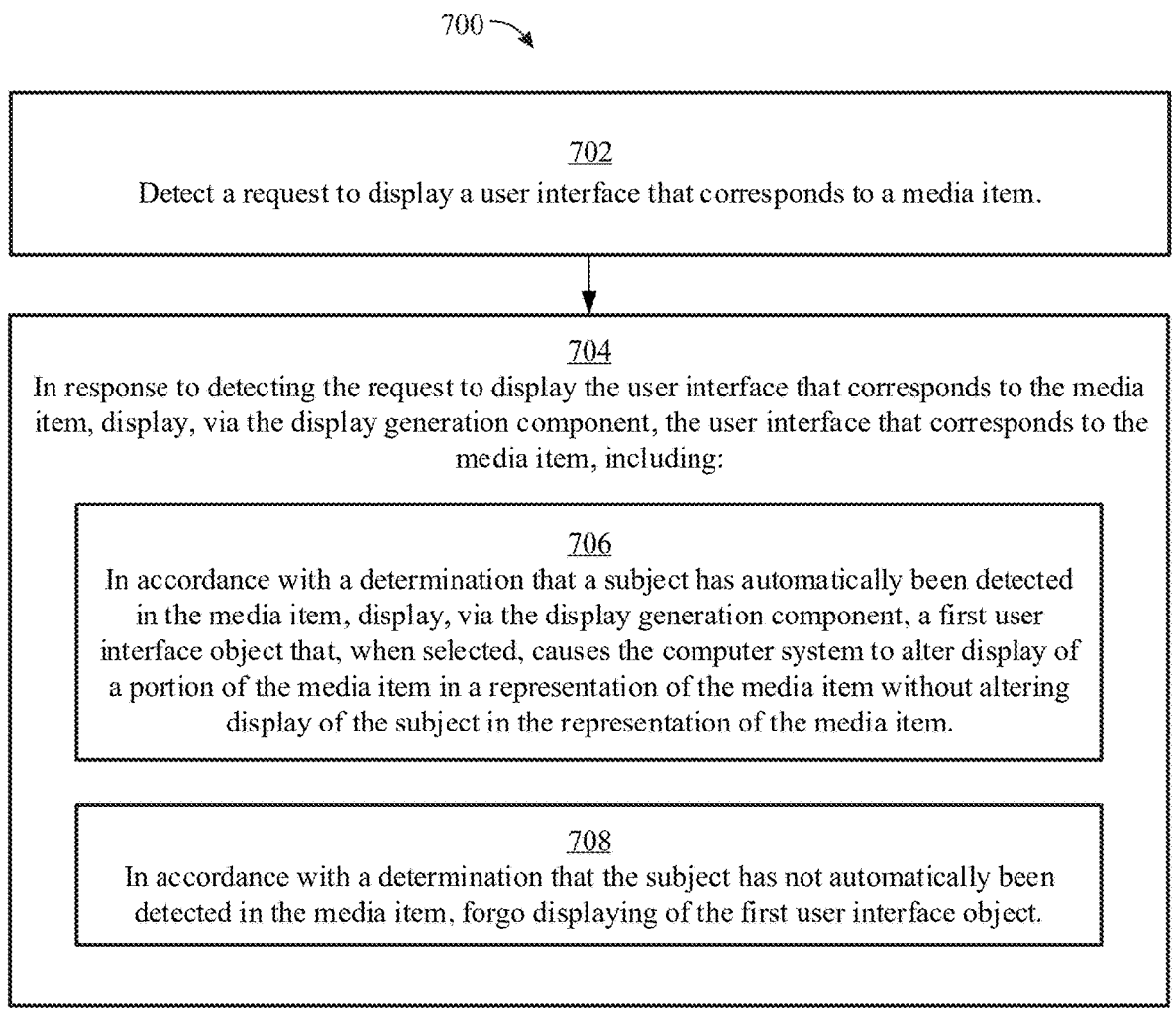
FIG. 7 is a flow diagram illustrating methods of managing the background of a media representation in accordance with some embodiments.

As illustrated in FIG. 6E, in response to detecting press-and-hold input 650*d*1 and/or tap input 650*d*2 on copy-subjects control 626*b*, computer system 600 displays copy-subjects control 628*a* and share control 628*b*, where copy-subjects control 628*a* and share control 628*b* are associated with subject 610*a* and not subject 610*b*. Here, copy-subjects control 628*a* and share control 628*b* are associated with subject 610*a* and not subject 610*b* because computer system 600 detected press-and-hold input 650*d*1 on subject 610*a*. If computer system 600 detected press-and-hold input 650*d*1 on subject 610*c*, computer system 600 would display a copy-subjects control and a share control that is associated with subject 610*b* and not subject 610*a*. At FIG. 6E, in response to detecting tap input 650*e*1 on copy-subjects control 628*a*, computer system 600 copies subject 610*a* without copying subject 610*b* and background 610*c* into a copy buffer. At FIG. 6E, in response to detecting tap input 650*e*2 on share control 628*b*, computer system 600 initiates a process to share a representation of subject 610*a* without sharing the representation of subject 610*b* and background 610*c* (e.g., a process, such as one or more processes as described above in relation to the share controls on share user interface 616 (in some embodiments, without displaying share user interface 616) and/or a process that includes displaying share user interface 616). As illustrated in FIG. 6E, in response to detecting press-and-hold input 650*d*1 and/or tap input 650*d*2, computer system 600 deemphasizes background 610*c* (e.g., greys-out) relative to subjects 610*a*-610*b*. In some embodiments, in response to detecting press-and-hold input 650*d* and/or tap input 650*d*2, computer system 600 deemphasizes background 610*c* and subject 610*b* relative to subject 610*a*. In some embodiments, as a part of deemphasizing background 610*c* and subject 610*b* relative to subject 610*a*, computer system 600 determines and selects a border between subject 610*a* and background 610*c*. In some embodiments, in response to detecting a press-and-hold input directed to subject 610*b* and/or tap input 650*d*2, computer system 600 deemphasizes background 610*c* and subject 610*a* relative to subject 610*b*. At FIG. 6E, while continuing to detect press-and-hold input 650*d*1, computer system 600 rightward movement of press-and-hold input 650*d*1.

As illustrated in FIG. 6F, in response to detecting rightward movement of press-and-hold input 650*d*1 (e.g., and while continuing to detect press-and-hold input 650*d*), computer system 600 displays reduced-sized representation 610*a*1 and moves reduced-sized representation 610*a*1 across the display of computer system 600 based on the movement of press-and-hold input 650*d*1. Reduced-sized representation 610*a*1 is a representation of subject 610*a*, and reduced-sized representation 610*a*1 is smaller than the representation of subject 610*a* that is currently displayed as being a part of media representation 612. As illustrated in FIG. 6F, subject 610*b* does not move and a reduced-sized representation for subject 610*b* is not displayed in response to detecting rightward movement of press-and-hold input 650*d*1. In some embodiments, reduced-sized representation 610*a*1 includes a representation of subject 610*a* and background 610*c*. In some embodiments where reduced-sized representation 610*a*1 includes a representation of subject 610*a* and a representation of background 610*c*, the representation of background 610 is deemphasized relative to the representation of background 610*c* in reduced-sized representation 610*a*1. In some embodiments, in response to detecting rightward movement of press-and-hold input 650*d*1, computer system 600 moves the display of subject 610*a* across the display of computer system 600. In some embodiments, in response to detecting rightward movement of press-and-hold input 650*d*1 (or another input that is directed to subject 610*b*), computer system 600 displays a reduced-sized representation for subject 610*b* and moves the reduced-sized representation for subject 610*b* across the display of computer system 600. In some embodiments, in response to detecting one or more inputs, computer system 600 moves subjects 610*a*-610*b* (and/or reduced-sized representations for subject 610*a*-610*b* across the display of computer system 600). In some embodiments, one or more of subjects 610*a*-610*b* are visually deemphasized relative to reduced-sized representation 610*a*1 while press-and-hold input 650*d*1 is detected. In some embodiments, in response to detecting lift off of press-and-hold input 650*d*1, computer system 600 displays subject 610*a* at a location on media representation 612 at which computer system 600 detected press-and-hold 650*d*1 before lift of press-and-hold input 650*d*1 was detected (e.g., a location that is in a second portion of media representation 612 that did not originally include subject 610*a*). In some embodiments, in response to detecting lift off of press-and-hold input 650*d*1, computer system 600 ceases to deemphasize the background relative to subject 610*a* and/or subject 610*b*. In some embodiments, in response to detecting lift off of press-and-hold input 650*d*1, computer system 600 ceases to display reduced-sized representation 610*a*1. At FIG. 6F, while continuing to detect press-and-hold input 650*d*1, computer system 600 detects downward movement of press-and-hold input 650*d*1.

As illustrated in FIG. 6G, in response to detecting downward movement of press-and-hold input 650*d*1, computer system 600 displays a note-taking application that includes note-content region 630 and keyboard-region 632. As illustrated in FIG. 6G, computer system 600 displays reduced-sized representation 610*a*1 in note-content region 630 in response to detecting downward movement of press-and-hold input 650*d*1 (e.g., reduced-sized representation 610*a*1 has been dragged to note-content region 630). At FIG. 6G, computer system 600 detects lift off of press-and-hold input 650*d*1. As illustrated in FIG. 6H, in response to detecting lift off of press-and-hold input 650*d*1, computer system 600 displays representation 630*a*, where representation 630*a* is subject 610*a* in media representation 612 of FIG. 6D. At FIG. 6H, representation 630*a* continues to be displayed as a part of the note-taking application while computer system 600 detects one or more other inputs and/or after detecting lift off of press-and-hold input 650*d*1. Thus, as described above in relation to FIGS. 6D-6H, computer system 600 can copy one or more subjects from one portion of an application to another portion of the application and/or to a different application based on detecting one or more inputs.

FIGS. 6I-6M illustrate computer system 690 displaying a copy subject control and/or a remove background control. In FIGS. 6I-6M, computer system 690 is a laptop computer and is a different computer system than computer system 600, which is a phone. In some embodiments, computer system 690 includes one or more components of electronic devices 100, 300, and/or 500. In some embodiments, computer system 690 is the same as computer system 600. In some embodiments, computer system 690 performs one or more techniques and/or operations (e.g., in response to detecting inputs) as described above in relation to computer system 600 of FIGS. 6A-6H. In some embodiments, computer system 600 performs one or more techniques and/or operations (e.g., in response to detecting inputs) as described above in relation to computer system 690 of FIGS. 6I-6M. In some embodiments, a computer system displays a copy subject control and/or a remove background control and performs one or more operations in view of the copy subject control and/or the remove background control for media representations that are displayed different applications (e.g., photo editing application, a camera application, and/or a file manager application) than the applications described in relation to FIGS. 6A-6M. In some embodiments, a computer system displays a copy subject control and/or a remove background control and performs one or more operations in view of the copy subject control and/or the remove background control for video media, photo media, previously captured media, live media, and/or live preview media (e.g., media that is currently being captured and/or visual content that is within the field-of-view of one or more cameras of the computer system), using one or more techniques as described in relation to FIGS. 6A-6M. In some embodiments, when a computer system removes a background and/or copies a subject from a media representation, the computer system modifies the media representation and does modify the data of the underlying media item that is represented by the media representation (e.g., only the media representation that is displayed). In other embodiments, when a computer removes a background and/or copies a subject from a media representation, the computer system modifies the underlying the data of the underlying media item.

Figure 6I:
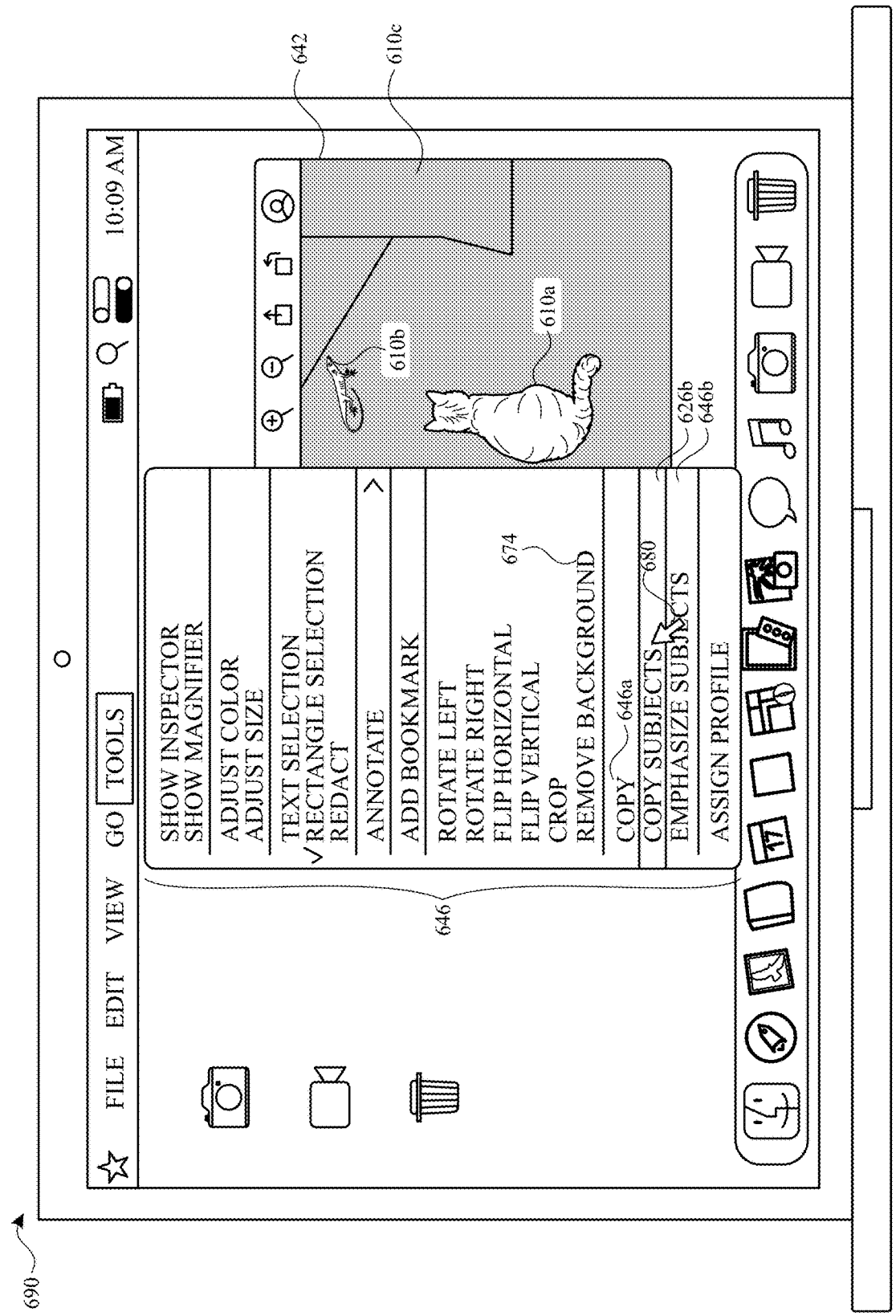

As illustrated in FIG. 6I, computer system 690 displays a user interface that includes media representation 642 and menu 646. Media representation 642 is a version of media representation 610 (e.g., as described above in relation to FIG. 6A), where media representation 610 includes subjects 610*a*-610*b* and background 610. Menu 646 is a tools menu and includes copy option 646*a*, copy-subjects control 626*b*, emphasize-subjects control 646*b*, and remove-background control 674, among other controls for editing media. In some embodiments, computer system 600 displays menu 646 in response to detecting an input directed to a tools option (e.g., "TOOLS" in FIG. 6I). At FIG. 6I, in response to detecting an input on copy option 646*a*, computer system 690 copies media representation 642 (e.g., subjects 610*a*-610*b* and background 610*c*) (e.g., to copy data corresponding to media representation 620 into a copy buffer).

Figure 6J:
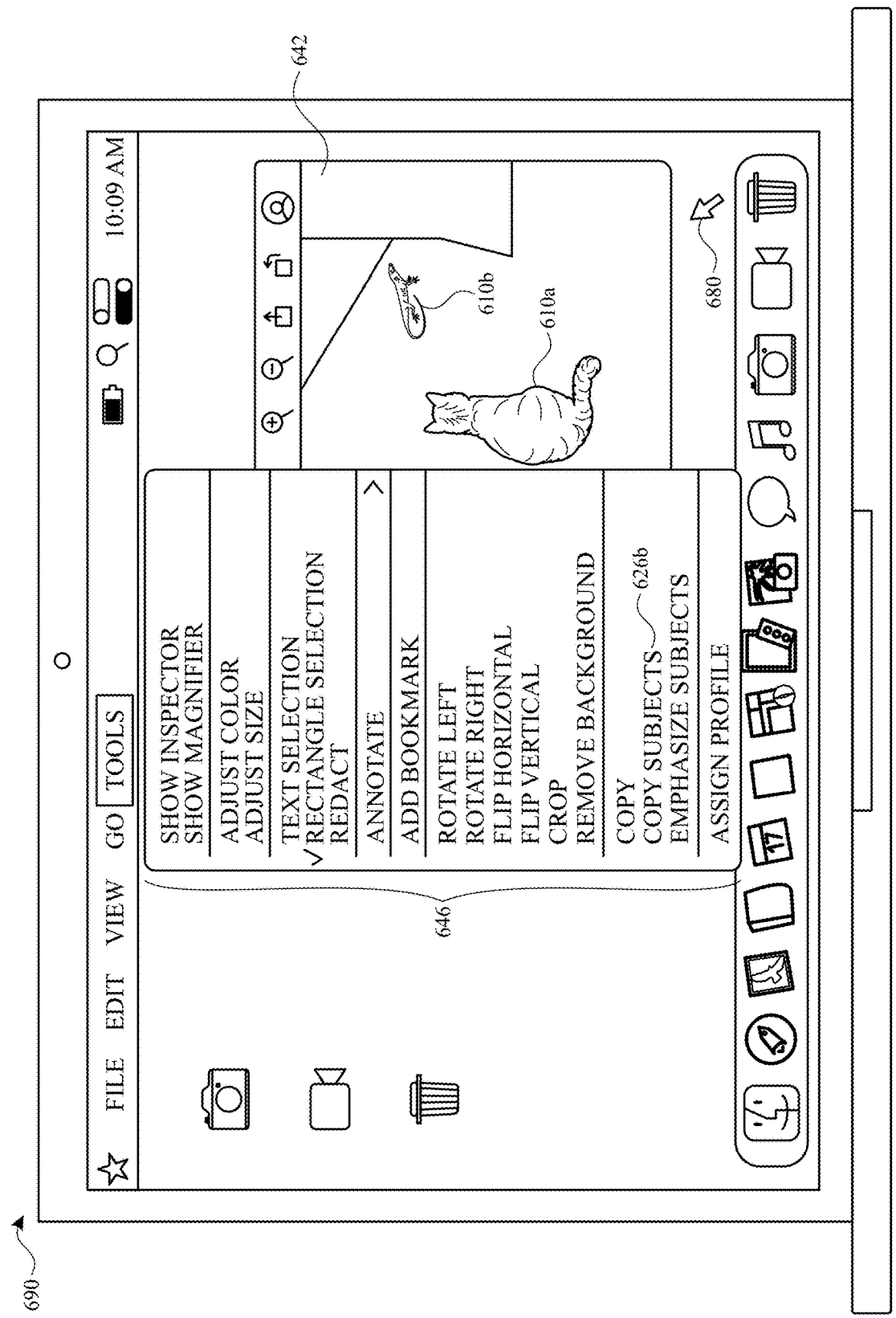

At FIG. 6I, in response to detecting an input on copy-subjects control 626*b*, computer system 690 copies subjects 610*a*-610*b* without copying background 610*c* (e.g., and uses one or more techniques as described above in relation to FIGS. 6A-6H). At FIG. 6I, in response to detecting an input on emphasize-subjects control 646*b*, computer system 690 updates representation 642 to emphasize subject 610*a* and/or subject 610*b* relative to background 610*c*. At FIG. 6I, in response to detecting an input on remove-background control 674, computer system 690 updates representation 642 to include subjects 610*a*-610*b* without including background 610*c* (e.g., and uses one or more techniques as described above in relation to remove-background control 614 of FIGS. 6A-6H). As illustrated in FIG. 6I, computer system 690 displays media representation 642, such that subjects 610*a*-610*b* is emphasized relative to background 610*c* (e.g., as indicated by background 610*c* being grey-out in FIG. 6I). At FIG. 6I, computer system 690 emphasizes subjects 610*a*-610*b* relative to background 610*c* because cursor 680 is within a predetermined distance from (e.g., 0.1-5 centimeters) and/or is on copy-subjects control 626*b* for a predetermined period of time (e.g., 0.05-5 seconds). In some embodiments, in response to detecting that cursor 680 is within the predetermined distance from (e.g., 0.1-5 centimeters) and/or on emphasize-subjects control 646*b* for a predetermined period of time (e.g., 0.05-5 seconds), computer system 690 displays representation 642, such that background 610*c* is removed from media representation 642. In some embodiments, in response to detecting that cursor 680 is within the predetermined distance from (e.g., 0.1-5 centimeters) and/or on remove-background control 674 for a predetermined period of time (e.g., 0.05-5 seconds), computer system 690 displays representation 642, such that background 610c is removed from media representation 642. At FIG. 6I, computer system 690 detects movement of cursor 680. At FIG. 6J, in response to detecting movement of cursor 680, a determination is made that cursor 680 is no longer within the predetermined distance from and/or on copy-subjects control 626b (e.g., for a predetermined period of time (e.g., 1-5 seconds)). As illustrated in FIG. 6J, computer system 690 ceases to emphasize subjects 610a-610b relative to background 610c (e.g., as indicated by background 610c not being greyed-out) because the determination was made that cursor 680 is no longer within the predetermined distance from and/or on copy-subjects control 626b (e.g., for longer than the predetermined period of time).

Figure 6K:
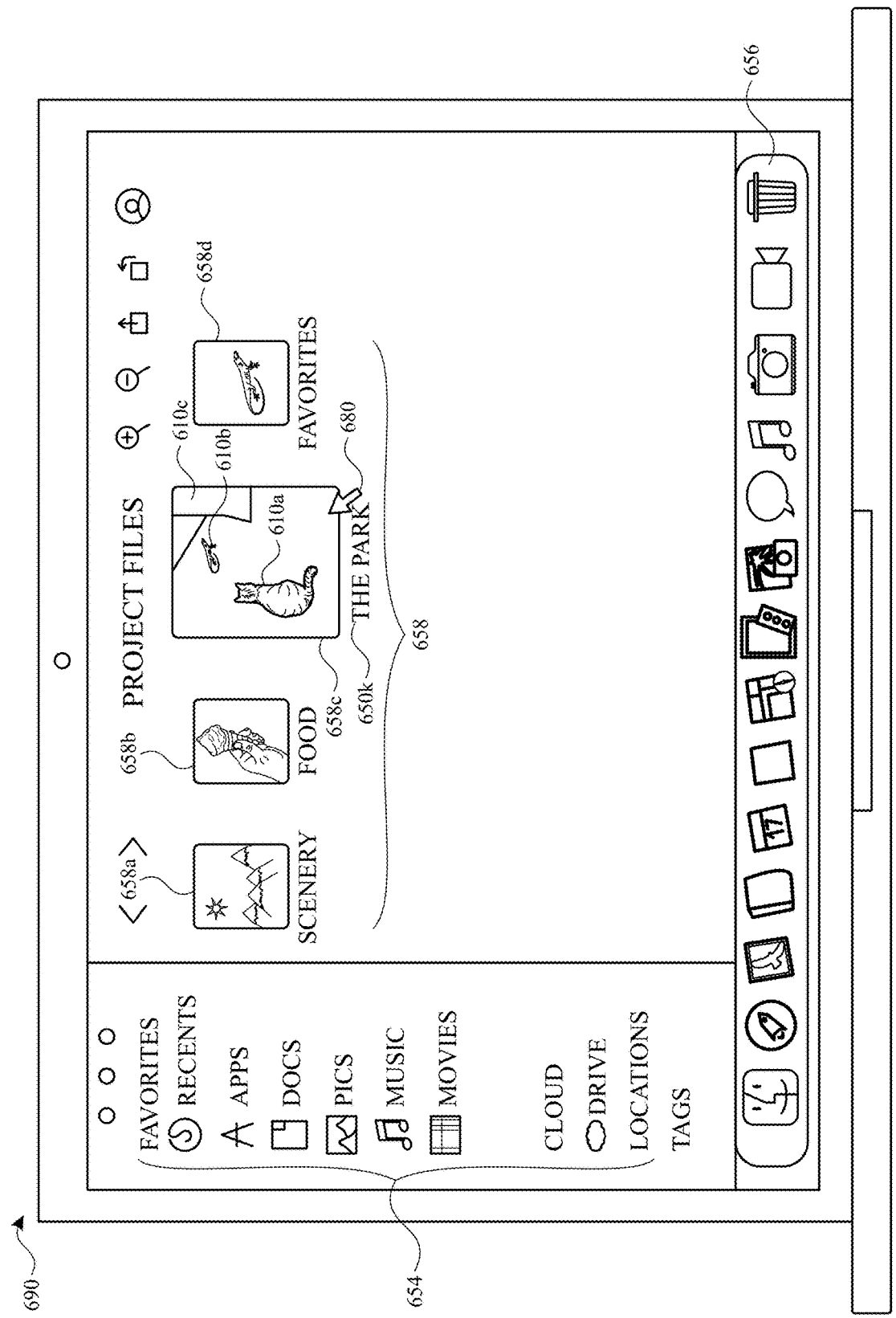

FIG. 6K illustrates computer system 690 displaying a file manager user interface that includes file navigation panel 654 and media icons 658. Media icons 658 include scenery icon 658a (e.g., that corresponds to a photo of a media item that looks like the image included with scenery icon 658a), food icon 658b (e.g., that corresponds to a photo of a media item that looks like the image included with food icon 658b), park icon 658c (e.g., that corresponds to the media item that also corresponds to media representation 610 of FIG. 6A), and favorites icon 658d (e.g., that corresponds to a video of a frame of a video that looks like the image included with favorites 658d). As illustrated in FIG. 6K, computer system 690 displays icons 658 as the contents of a folder (e.g., "Project Files"). At FIG. 6K, computer system 690 detects one or more inputs (e.g., a click input), which include pointer activation 650k (e.g., a left mouse click (and, in some embodiments, a trackpad click), a right mouse click, and/or a press-and-hold mouse click).

Figure 6L:
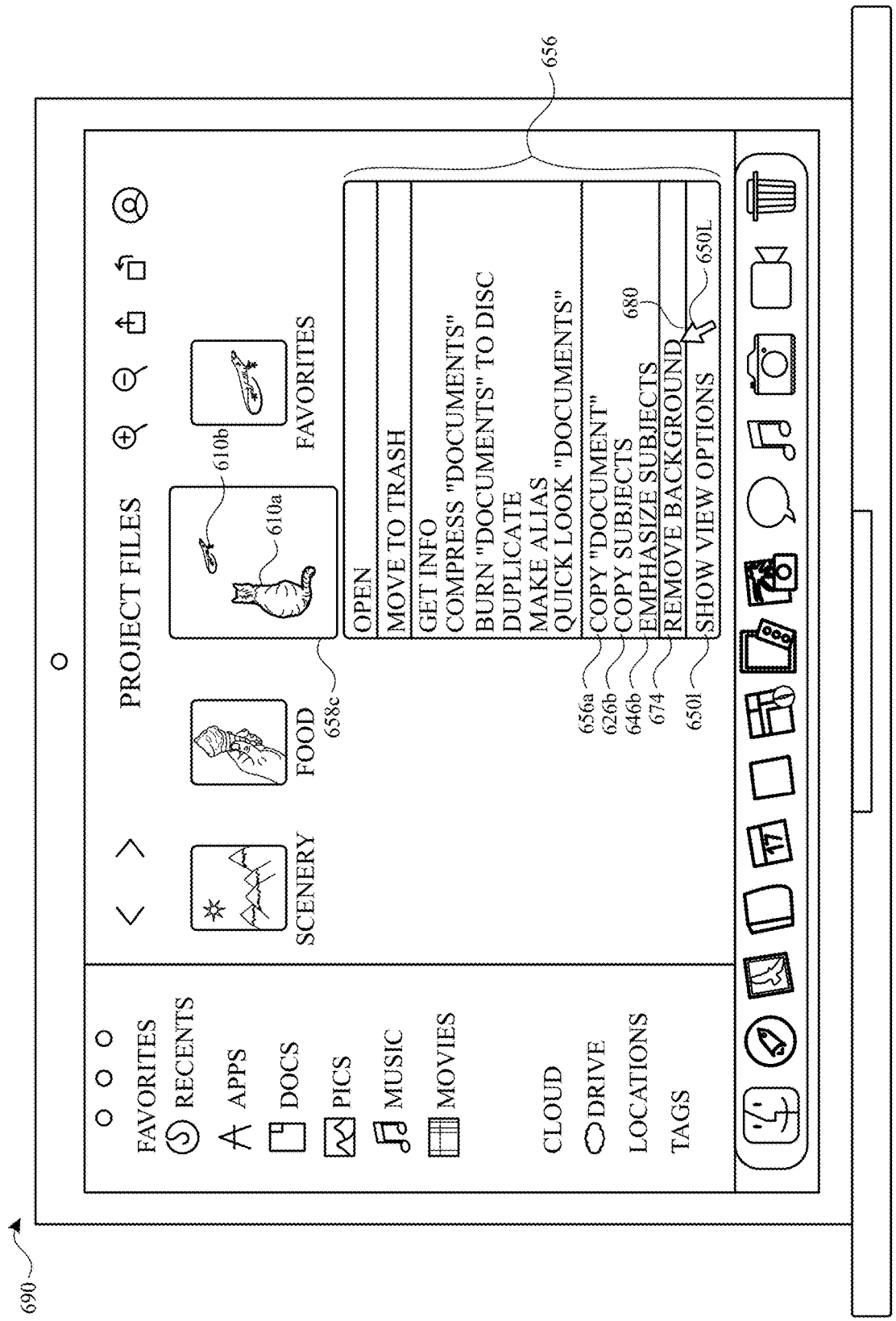
Figure 6M:
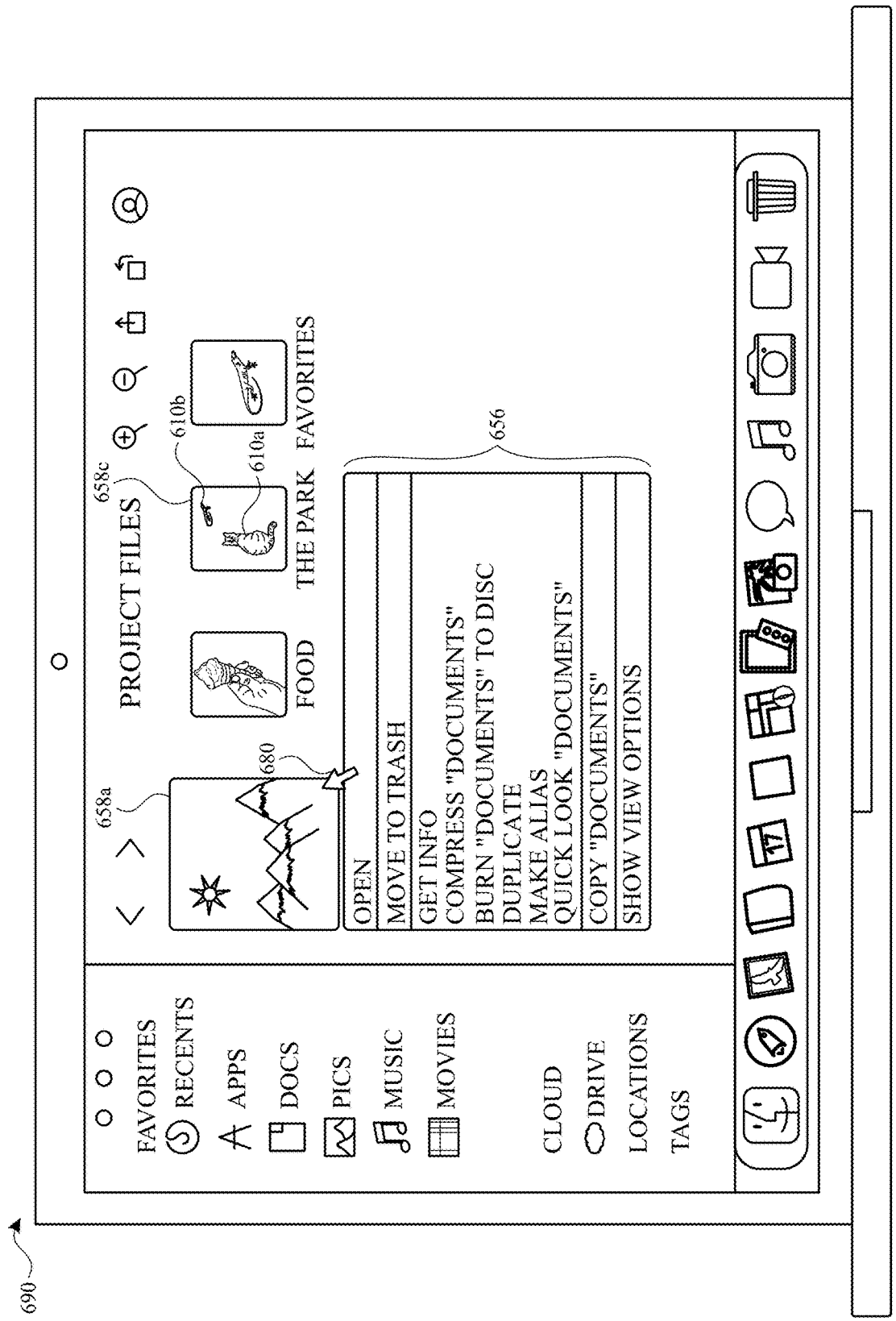

As illustrated in FIG. 6L, in response to detecting the one or more inputs that include pointer activation 650k, computer system 690 displays menu 656 that includes copy documents 656a (that, when selected, causes computer system 690 to copy park icon 658c into a copy buffer), copy-subjects control 626b, emphasize-subjects control 646b, and remove-background control 674. As illustrated in FIG. 6L, in response to detecting the one or more inputs that includes pointer activation 650k and in response to detecting that cursor 680 is within the predetermined distance from (e.g., 0.1-5 centimeters) and/or on remove-background control 674 for a predetermined period of time (e.g., 0.05-5 seconds), computer system 690 modifies park icon 658c, such that park icon 658c is displayed with subjects 610a-610b and without background 610c. At FIG. 6L, computer system 650 detects pointer activation 650l. As illustrated in FIG. 6M, in response to detecting pointer activation 650l, computer system 690 continues to display park icon 658c, such that park icon 658c is displayed with subjects 610a-610b and without background 610c. As illustrated in FIG. 6M, computer system 690 is displaying the file manager user interface after detecting a pointer activation input on scenery icon 658a. At FIG. 6M, in response to detecting the pointer activation input on scenery icon 658a, computer system 690 displays menu 656, where menu 656 does not include copy-subjects control 626b, emphasize-subjects control 646b, and remove-background control 674 because the media item represented by scenery icon 658a (and/or the image that is a part of scenery icon 658a) does not include at least one subject. Thus, in some embodiments, a computer system does not display one or more controls for copying subject(s) in, emphasizing subject(s) in, and/or removing a background of a respective media representation if at least one subject has not been detected in the respective media representation.

FIG. 7 is a flow diagram illustrating methods of managing the background of a media representation in accordance with some embodiments. Method 700 is performed at a computer system (e.g., 100, 300, 500, and/or 600) (e.g., a smartphone, a desktop computer, a laptop, a tablet) that is in communication with a display generation component (e.g., a display controller, a touch-sensitive display system). In some embodiments, the computer system is in communication with one or more input devices (e.g., a touch-sensitive surface). Some operations in method 700 are, optionally, combined, the orders of some operations are, optionally, changed, and some operations are, optionally, omitted.

As described below, method 700 provides an intuitive way for managing the background of a media representation. The method reduces the cognitive burden on a user for managing the background of a media representation, thereby creating a more efficient human-machine interface. For battery-operated computing devices, enabling a user to manage the background of a media representation faster and more efficiently conserves power and increases the time between battery charges.

The computer system detects (702) (e.g., via one or more input devices) a request (e.g., 650a1 and/or 650a2) to display a user interface that corresponds to (e.g., that is associated with) a media item (as described above in relation to, e.g., 610, 612, 620, 642, and/or 658a-658c) (e.g., photo media, video media) (e.g., live media, a live preview (e.g., media corresponding a representation of a field-of-view (e.g., a current field-of-view) of the one or more cameras that has not been captured (e.g., in response to detecting a request to capture media (e.g., detecting selection of a shutter affordance)) and/or previously captured media (e.g., media corresponding a representation of a field-of-view (e.g., a previous field-of-view) of the one or more cameras that has been captured, a media item that has been saved and can be accessed by a user at a later time and/or a representation of media displayed in response to receiving an gesture on a thumbnail representation of the media (e.g., in a media gallery)). In some embodiments, as a part of detecting the request to display the user interface, the computer system detects a request to display the media item.

In response to detecting the request (e.g., 650a1 and/or 650a2) to display the user interface that corresponds to the media item, the computer system displays (704), via the display generation component, the user interface that corresponds to the media item, including: in accordance with a determination that a subject has automatically (e.g., without user input that identifies the subject) been detected in the media item, displaying (706), via the display generation component, a first user interface object (e.g., 614, 614a, and/or 674) that, when selected, causes the computer system (e.g., 600) to alter (e.g., removes) display of a portion (e.g., 610c) (e.g., background) of the media item in a representation (e.g., 610, 612, 620, 642, and/or 658a-658c) of the media item (e.g., the representation of the media continues to include the subject while the background of the media item is removed) without altering display of the subject (e.g., 610a-610b) in the representation of the media item; and in accordance with a determination that the subject has not automatically been detected in the media item, forgoing display (708) of the first user interface object (e.g., as described above in relation to FIGS. 6A-6D and 6M). In some embodiments, the first user interface object is displayed concurrently with the representation of the media item. In some embodiments, in accordance with a determination that the subject has not automatically been detected in the media item, the representation of the media item is displayed and/or continues to be displayed. In some embodiments, before detecting the request to display the user interface that corresponds to the media item, the computer system displays the representation of the media item. In some embodiments, the media item includes (and/or is) an image or a video (e.g., as described above in relation to FIGS. 6I-6M). Choosing whether to display the first user interface object when prescribed conditions are met allows the computer system to automatically display the first user interface object in situations that are relevant (e.g., based on a subject being automatically detected in the media item), which performs an operation when a set of conditions has been met without requiring further user input and provides additional control options without cluttering the user interface.

In some embodiments, in response to detecting the request to display the user interface that corresponds to the media item, the computer system displays, via the display generation component, the user interface (e.g., user interface that includes 610, 612, 620, 642, and/or 658a-658c) that corresponds to the media item, including: displaying, via the display generation component, the representation (e.g., 610, 612, 620, 642, and/or 658a-658c) of the media item (e.g., that displaying the subject and the portion of the media item); and in accordance with a determination that the subject has automatically been detected in the media item, selecting (e.g., automatically and/or automatically without intervening input and/or a request being detected (e.g., after the request to display the user interface was detected)) a boundary between the portion of the media item in the representation of the media item and the subject (e.g., 610a-610b) (e.g., as described above in relation to FIGS. 6E-6F). In some embodiments, in accordance with a determination that a subject has automatically been detected in the media item, the computer system displays the boundary. In some embodiments, in accordance with a determination that the subject has not automatically been detected in the media item, the computer system does not select and/or display a representation of the boundary. In some embodiments, the representation of the media item is concurrently displayed with the first user interface object. Selecting the boundary between the portion of the media item in the representation of the media item and the subject when prescribed conditions are met allows the computer system to automatically distinguish between the portion of the media item in the representation of the media item and the subject in the representation of the media item and can provide visual feedback to the user regarding the difference between the portion of the media item in the representation of the media and the subject in the representation of the media item to inform the user about how a selection of the first user interface object will impact the representation of the media item, which performs an operation when a set of conditions has been met without requiring further user input and provides visual feedback.

In some embodiments, in accordance with a determination that a subject has automatically been detected in the media item, the computer system displays, via the display generation component, a second user interface object (e.g., 626b and/or 628a) that, when selected, copies the subject (e.g., 610a-610b) in the media item without copying the portion (e.g., 610c) of the media item. Choosing whether to display the second user interface object when prescribed conditions are met allows the computer system to automatically display the second user interface object in situations that are relevant (e.g., based on a subject being automatically detected in the media item), which performs an operation when a set of conditions has been met without requiring further user input and provides additional control options without cluttering the user interface.

In some embodiments, the second user interface object (e.g., 626b and/or 628a) is displayed concurrently with a third user interface object (e.g., 626a, 646a, and/or 656a) that, when selected, causes the computer system (e.g., 600) to copy the subject (e.g., 610a-610b) and the portion (e.g., 610c) of the media item. In some embodiments, the second user interface object and the third user interface object are displayed in a first menu (e.g., 636, 646, and/or 646) (e.g., a contextual a menu and/or a menu for a particular application). In some embodiments, the menu that includes the second user interface object and the third user interface object. In some embodiments, the first menu, the first user interface object and/or the second user interface object are provided in the first menu in response to detecting an input, such as a right mouse click, a press-and-hold input, and/or a tap input. In some embodiments, the third user interface object is displayed irrespective and/or regardless of the determination that the subject has automatically been detected in the media item. Concurrently displaying the second user interface object and the third user interface object allows the computer system to provide multiple control options based on a set of prescribed conditions being met, which provides additional control options without cluttering the user interface.

In some embodiments, in response to detecting the request (e.g., 650a1 and/or 650a2) to display the user interface that corresponds to the media item, the computer system displays, via the display generation component, the user interface that corresponds to the media item, including: in accordance with a determination that the subject (e.g., 610a-610b) has automatically been detected in the media item, displaying, via the display generation component, a fourth user interface object (e.g., 636f and/or 646b) that, when selected, causes the computer system (e.g., 600) to visually emphasize (e.g., bolds, highlights, increases and/or decreases the size, fades, and/or displays a bounder around) the subject relative to the portion of the media item. In some embodiments, in accordance with a determination that the subject has not automatically been detected in the media item, the computer system does not display (and/or forgoes display of) the fourth user interface object. In some embodiments, the fourth user interface object is displayed concurrently with one or more of the first user interface object, the second user interface object, and the third user interface object. Choosing whether to display the fourth user interface object when prescribed conditions are met allows the computer system to automatically display the fourth user interface object in situations that are relevant (e.g., based on a subject being automatically detected in the media item), which performs an operation when a set of conditions has been met without requiring further user input and provides additional control options without cluttering the user interface.

In some embodiments, in response to detecting the request (e.g., 650a1 and/or 650a2) to display the user interface that corresponds to the media item, the computer system displays, via the display generation component, the user interface that corresponds to the media item, including: in accordance with a determination that the subject has automatically been detected in the media item, displaying, via the display generation component, a fifth user interface object (e.g., 636*f*) that, when selected, causes the computer system (e.g., 600) to create a graphical user interface object (e.g., a sticker object, an animation, and/or an emoji) that includes the subject (e.g., 610*a*-610*b*) and does not include the portion (e.g., 610*c*) of the media item. In some embodiments, in accordance with a determination that the subject has not automatically been detected in the media item, the computer system does not display the fifth user interface object. In some embodiments, the graphical user interface object can be shared and/or used in a plurality of applications (e.g., a text messaging application, an e-mail application, and/or a keyboard application). In some embodiments, the graphical user interface object is displayed with one or more other graphical user interface objects before the graphical user interface object can be selected to be used one or more of the plurality of applications. In some embodiments, two or more of the first user interface object, the second user interface object, the third user interface object, the fourth user interface object, and/or the fifth user interface object are concurrently displayed. In some embodiments, two or more of the first user interface object, the second user interface object, the third user interface object, the fourth user interface object, and/or the fifth user interface object are concurrently displayed in a menu (e.g., a contextual menu). Choosing to display the fifth user interface object when prescribed conditions are met allows the computer system to automatically display the fifth user interface object in situations that are relevant (e.g., based on a subject being automatically detected in the media item), which performs an operation when a set of conditions has been met without requiring further user input and provides additional control options without cluttering the user interface.

In some embodiments, the user interface that corresponds to the media item is displayed in a respective application (e.g., application in FIGS. 6A and/or 6K-6M) that is different from a media editing application (e.g., user interface described above in FIG. 6J and below in FIG. 11A) (or a media viewing application) (e.g., an application that includes one or more selectable user interface objects for editing the media). Choosing whether to display the first user interface object when prescribed conditions are met in a user interface that is different than a media editing user interface allows the computer system to automatically display the first user interface object, which can cause the computer system to edit a representation of the media item, in applications that were not constructed for the purpose of editing media and/or representations of media, which provides additional control options and extended functionality to other applications.

In some embodiments, the respective application is a file manager application (e.g., application in FIGS. 6K-6M) (e.g., an application for managing (e.g., creating, updating, and/or deleting) files and/or folders (e.g., system files and/or system folders)). Choosing whether to display the first user interface object when prescribed conditions are met in a user interface that is different than a media editing user interface allows the computer system to automatically display the first user interface object, which can cause the computer system to edit a representation of the media item, in a file manager application that was not constructed for the purpose of editing media and/or representations of media, which provides additional control options and extended functionality to other applications.

In some embodiments, the respective application is a file viewer application (e.g., application in FIGS. 6K-6M) (e.g., an application for viewing files and/or folders (e.g., system files and/or system folders)). Choosing whether to display the first user interface object when prescribed conditions are met in a user interface that is different than a media editing user interface allows the computer system to automatically display the first user interface object, which can cause the computer system to edit a representation of the media item, in a file viewer application that was not constructed for the purpose of editing media and/or representations of media, which provides additional control options and extended functionality to other applications.

In some embodiments, the respective application is a productivity application (e.g., application in FIGS. 6G-6H) (e.g., a slide show presentation application, a note-taking application, a word processing application, a speech writing application, and/or a list management application). Choosing whether to display the first user interface object when prescribed conditions are met in a user interface that is different than a media editing user interface allows the computer system to automatically display the first user interface object, which can cause the computer system to edit a representation of the media item, in a productivity application that was not constructed for the purpose of editing media and/or representations of media, which provides additional control options and extended functionality to other applications.

In some embodiments, as a part of detecting the request to display the user interface that corresponds to the media, the computer system detects a pointer activation event (e.g., 650*k* and/or 680) (e.g., a mouse click or a press input on a trackpad) (e.g., an alternative click (e.g., a right-click/press, two finger click/press, an option-click/press, and/or a shift-click/press)). Detecting a pointer activation event as a part of detecting the request to display the user interface gives the user more control of the computer system by allowing the computer system to detect the request to display the user interface via detecting a pointer activation event, which provides conditional control options without cluttering the user interface.

In some embodiments, as a part of displaying, via the display generation component, the user interface, the computer system displays, via the display generation component, the representation (e.g., 610, 612, 620, 642, and/or 658*a*-658*c*) of the media item. In some embodiments, after detecting the request to display a user interface that corresponds to the media item and while displaying the representation of the media item and the first user interface object, the computer system detects (e.g., 680) a first input directed to the first user interface object. In some embodiments, in response to detecting the first input (e.g., 680) directed to the first user interface object and in accordance with a determination that the first input has been directed to the first user interface object for more than a predetermined period of time (e.g., 0.05-5 seconds), the computer system displays, via the display generation component, an indication that corresponds to the portion of the media item (e.g., as described above in relation to FIGS. 6E and 6I-6J) (e.g., the indication corresponds to the portion of the media item being detected). In some embodiments, the indication that corresponds to the portion of the media item does not correspond to the subject in the media item. In some embodiments, in response to detecting the input directed to the first user interface object and in accordance with a determination that the input has been directed to the first user interface object for less than the predetermined period of time, the computer system does not display (forgoes display of) the indication that corresponds to the portion of the media item. In some embodiments, as a part of displaying the indication that corresponds to the portion of the media item, the computer system emphases (e.g., highlights, bolds, fades, desaturates, and/or enlarges) and/or deemphasizes (e.g., removes, ceases to display, blurs, dims, and/or desaturates) the portion of the media item. Displaying an indication that corresponds to the portion of the media item when prescribed conditions are met allows the computer system to automatically display the indication in situations that can be relevant (e.g., based on the input being directed to the first user interface object for more than a predetermined period of time) and provides visual feedback to the user regarding the portion of the media item, which performs an operation when a set of conditions has been met without requiring further user input and provides visual feedback.

In some embodiments, as a part of displaying the indication that corresponds to the portion of the media item, the computer system visually deemphasizes (e.g., removes, ceases to display, blurs, dims, and/or desaturates) the portion (e.g., 610*c*) of the media item in the representation (e.g., 610, 612, 620, 642, and/or 658*a*-658*c*) of the media item (e.g., as described above in relation to FIGS. 6E and 6I-6J) (e.g., in the displayed representation of the media item). In some embodiments, the portion of the media item is deemphasized relative to the subject in the representation of the media item. Deemphasizing the portion of the media item as a part of displaying the indication that corresponds to the media item provides visual feedback to the user that the portion of the media item will be removed in response to detecting a selection of the first user interface object, which provides visual feedback of the identified foreground of the media item.

In some embodiments, as a part of detecting the request to display the user interface that corresponds to the media item, the computer system detects a request (e.g., 650*a*1) to display a sharing user interface (e.g., user interface of FIG. 6B) (e.g., a user interface for sharing the media item and/or one or more portions of the media item). In some embodiments, as a part of detecting the request to display the sharing user interface, the computer system detects an input directed to a user interface object for displaying the sharing user interface and, in response to detecting the input directed to the user interface object for displaying the sharing user interface, the computer system detects the request to display the user interface that corresponds to the media item and/or display the sharing user interface. Detecting a request to display a sharing user interface as a part of detecting the request to display the user interface gives the user more control of the computer system by allowing the computer system to detect the request to display the user interface via detecting a request to display a particular user interface, which provides additional control options without cluttering the user interface.

In some embodiments, as a part of altering (e.g., removing) display of the portion (e.g., background) of the media item in the representation of the media item (e.g., the representation of the media continues to include the subject while the background of the media item is removed) without altering display of the subject in the representation (e.g., 610, 612, 620, 642, and/or 658*a*-658*c*) of the media item, the computer system forgoes altering visual content (e.g., data) of the media item (e.g., as described in relation to FIGS. 6B-6C and FIGS. 6L-6M) (e.g., the actual media item and/or the original visual content of the media item). In some embodiments, the media item is a media item that has been shared (or duplicated) and/or not an original media item. In some embodiments, the first user interface object (e.g., 614) is overlaid on one or more portions of the representation (e.g., 620) of the media item.

In some embodiments, while displaying the first user interface object, the computer system detects a second input directed to the first user interface object. In some embodiments, in response to detecting the second input (e.g., 650*b* and/or 650*cl*) directed to the first user interface object and in accordance with a determination that display of the portion of the media item in the representation of the media item and display of the subject in the media item in the representation of the media item (and/or in accordance with a determination that the first user interface object is in a first state (e.g., an active state)) is not altered, the computer system alters display of the portion (e.g., 610*c*) (e.g., background) of the media item in the representation of the media item without altering display of the subject (e.g., 610*a*-610*b*) in the media item in the representation of the media item. In some embodiments, in response to detecting the second input (e.g., 650*b* and/or 650*cl*) directed to the first user interface object and in accordance with a determination that display of the portion of the media item in the representation of the media item is altered without display of the subject in the media item in the representation of the media item being altered (and/or in accordance with a determination that the first user interface object is in a second state (e.g., an inactive state) that is different from the first state, the computer system forgoes altering display of the portion (e.g., background) of the media item in the representation of the media item without altering display of the subject in the media item in the representation of the media item. Choosing whether to alter display of the portion of the media item in the representation of the media item without altering display of the subject in the media item in the representation of the media item or to alter display of the portion of the media item in the representation of the media item without altering display of the subject in the media item in the representation of the media item when prescribed conditions are met allows the computer system to perform different operations based on the state of the representation being displayed, which provides additional control options without cluttering the user interface.

In some embodiments, the request to display the user interface that corresponds to the media item is a request (e.g., 650*k* and/or 680 in FIGS. 6I and 6M) to display a second menu (e.g., 646 and/or 656) (e.g., a tool menu and/or a menu with one or more media tools user interface object). Detecting a request to display a second menu as a part of detecting the request to display the user interface gives the user more control of the computer system by allowing the computer system to detect the request to display the user interface via detecting a request to display a menu, which provides additional control options without cluttering the user interface.

In some embodiments, while displaying the first user interface object (e.g., 614 and/or 674), the computer system detects a third input (e.g., 650*b*, 650*l*) (e.g., a tap input and/or a non-tap input (a mouse click, a double-tap input, a press-and-hold input, and/or a swipe input)) directed to the first user interface object. In some embodiments, in response to detecting the third input directed to the first user interface object, the computer system displays a second representation (e.g., 612 and/or 658*c*) of the media item (e.g., a modified version of the representation of the media item) that includes the subject and does not include the portion of the representation (e.g., 610, 612, 620, 642, and/or 658*a*-658*c*) of the media item. Displaying a second representation of the media item that includes the subject and does not include the portion of the representation of the media item in response to detecting the third input directed to the first user interface object gives the user the ability to display a representation of the media item that has the portion of the representation of the media item removed, which provides additional control options without cluttering the user interface.

In some embodiments, in response to detecting the third input directed to the first user interface object (and while displaying the second representation of the media item), the computer system displays a sixth user interface object that, when selected, displays a third representation (e.g., 610, 612, 620, 642, and/or 658a-658c) of the media item that includes the subject (e.g., 610a-610b) and includes the portion (e.g., 610c) of the representation of the media item. In some embodiments, while displaying the sixth user interface object, the computer system detects an input directed to the sixth user interface object. In some embodiments, in response to the computer system detecting the input directed to the sixth user interface object, the computer system replaces the display of the second representation of the media item with display of the third representation of the media item. In some embodiments, in response to the computer system detecting the input directed to the sixth user interface object, the computer system replaces display of the sixth user interface object with display of the first user interface object (e.g., displays the first user interface object at a location at which the sixth user interface object was previously displayed). In some embodiments, in response to detecting the third input directed to the first user interface object, the computer system replaces display of the first user interface object with display of the sixth user interface object (e.g., displays the sixth user interface object at a location at which the first user interface object was previously displayed). Displaying the sixth user interface object in response to detecting the third input directed to the first user interface object gives the user the ability to revert (e.g., undo) the change caused in response to detecting the third input at a time that can be relevant (e.g., after the computer system has modified the representation), which provides additional control options without cluttering the user interface.

Note that details of the processes described above with respect to method 700 (e.g., FIG. 7) are also applicable in an analogous manner to the methods described below. For example, method 700 optionally includes one or more of the characteristics of the various methods described above with reference to method 800. For example, method 700 can be used to display a user interface object for managing the background of a media representation that is concurrently displayed with a user interface object for copying subjects of a media representation based on method 800. For brevity, these details are not repeated below.

FIG. 8 is a flow diagram illustrating methods of copying subjects of a media representation in accordance with some embodiments. Method 800 is performed at a computer system (e.g., 100, 300, 500, and/or 600) (e.g., a smartphone, a desktop computer, a laptop, a tablet) that is in communication with a display generation component (e.g., a display controller, a touch-sensitive display system). In some embodiments, the computer system is in communication with one or more input devices (e.g., a touch-sensitive surface). Some operations in method 800 are, optionally, combined, the orders of some operations are, optionally, changed, and some operations are, optionally, omitted.

As described below, method 800 provides an intuitive way for copying subjects of a media representation in accordance with some embodiments. The method reduces the cognitive burden on a user for copying subjects of a media representation in accordance with some embodiments, thereby creating a more efficient human-machine interface. For battery-operated computing devices, enabling a user to copy subjects of a media representation in accordance with some embodiments faster and more efficiently conserves power and increases the time between battery charges.

While displaying, via the display generation component, a representation (e.g., 610, 612, 620, 642, and/or 658a-658c) (e.g., a visual representation) of visual content (e.g., visual content of a media item (e.g., a photo, a video, and/or an animated series of images)) that includes a first portion (e.g., 610a-610b) (e.g., a foreground portion and/or a portion with one or more subjects) and a second portion (e.g., 610c) (e.g., a background portion, one or portions of the media that surround the subject and/or the body of the subject, one or more portions of the representation of the media that are not the subject, and/or one or more portions of the representation of the media different from and/or separate from the subject), the computer system detects (802) (e.g., via one or more inputs devices) an input (e.g., 650a2, 650k, 680 as described above in relation to FIGS. 6I and 6M) (e.g., a dragging input, a long-press input, and/or a press-and-hold input and/or in some embodiments, a tap input, a mouse click, a mouse click followed by a hover input, and/or a voice input) directed to (e.g., a location in) the representation of the visual content. In some embodiments, the second portion is the background of the first portion. In some embodiments, the location in the visual content is not in the first portion of the representation of the visual content. In some embodiments, the location in the visual content is in the first portion of the representation of the visual content. In some embodiments, the location in the visual content is in the first portion and the second portion of the representation of the visual content (e.g., where the first portion is overlaid on and/or is surrounded by the second portion of the representation of the visual content).

In response to detecting the input (e.g., 650a2, 650k, 680 as described above in relation to FIGS. 6I and 6M) directed (e.g., a location in) to the representation of the visual content and in accordance with a determination that the first portion (e.g., 610a-610b) includes a subject (e.g., 610a-610b) that is available to be copied (e.g., is determined to be available to be copied and/or includes a subject where the operation can be performed to copy the subject without copying the second portion of the representation of the visual content), the computer system provides (804) (e.g., displaying, via the display generation component, and/or outputting) an indication (e.g., 626b and/or 628a) (e.g., a visual, haptic, and/or audible indication) (e.g., in the visual content) that an operation can be performed (e.g., by the computer system) to copy the subject (e.g., 610a-610b) without copying the second portion (e.g., 610c) (e.g., the background portion). In some embodiments, the operation is an operation to copy the subject separately from the background portion. In some embodiments, performing the operation does not include copying a subset of the first portion that does not include the first subject. Choosing whether to provide the indication that the operation can be performed to copy the subject without copying the second portion allows the computer system to automatically inform the user about the operation that can be performed, which performs an operation when a set of conditions has been met without requiring further user input and provides visual feedback.

In some embodiments, the input (e.g., 650*a*2) directed to the representation of the visual content is press-and-hold input (and/or a long-press input) (e.g., an input that is detected for longer than a predetermined period of time (e.g., 0.25-10 seconds) and/or an input that is detected at a location for longer than a tap input is detected) (e.g., a press-and-hold input on a display and/or a press-and-hold at an external device (e.g., a mouse click and hold input)). In some embodiments, in response to detecting an input that is different from a press-and-hold input (e.g., a tap input and/or, in some embodiments, a non-tap input (e.g., such as a mouse click, a trackpad click, and/or a swipe input), the computer system does not display the indication (e.g., 626*b* and/or 628*a*) and performs one or more other operations (e.g., selecting an object and/or a subject in the representation of the visual content, displaying a user interface of an application that corresponds to an object and/or the subject that is selected in response to the different input), displaying a preview of the representation of the visual content, opening a file, and/or displaying the representation of the visual content in a user interface that corresponds to the representation of the visual content). Detecting the press-and-hold input as a part of detecting the input directed to the visual content provides the user with more control over the computer system by allowing the user to provide a press-and-hold input without displaying additional user interface elements, which provides additional control options without cluttering the user interface.

In some embodiments, displaying the representation of the visual content includes displaying the subject (e.g., 610*a*-610*b*) at a first location and displaying the second portion (e.g., 610*c*) at a second location. In some embodiments, while detecting the input (e.g., 650*d*) directed to the representation (e.g., 612) of the visual content, the computer system detects movement of the input directed to the representation of the visual content (e.g., while the input continues to be detected) (e.g., from the first location to the third location). In some embodiments, in response to detecting movement of the input directed to the representation of the visual content (e.g., from the first location to the third location), the computer system moves display of the subject (e.g., 610*a*) from the first location (e.g., location of 610*a* in FIG. 6E) (e.g., on the computer system) to a third location (e.g., location of 610*a* in FIGS. 6F-6G) (that is different from the first location) without moving display of the second portion from the second location (and/or without moving a second subject that is different from the subject (e.g., as described above in relation to FIGS. 6E-6H). Moving display of the subject from the first location to the third location without moving display of the second portion from the second location in response to detecting movement of the input directed to the representation of the visual content provides the user with control over the computer system to move the subject between locations on the computer system without moving the second portion, which provides additional control options without cluttering the user interface.

In some embodiments, while detecting the input (e.g., 650*d*) directed to the representation of the visual content and while displaying the subject (e.g., 610*a*-610*b*) at the third location, the computer system detects an end (e.g., an up click and/or liftoff) of the input (e.g., 650*d*) directed to the representation of the visual content (and/or ceasing to detect the input directed to the visual content). In some embodiments, in response to detecting the end of the input directed to the representation of the visual content (and/or ceasing to detect the input directed to the visual content) (and/or in response to detecting the end of the input directed to the visual content at the third location), the computer system displays the subject (e.g., 610*a* and/or 630*a*) at third location without displaying the second portion (e.g., 610*c*) at the third location (e.g., as described in relation to FIG. 6H). In some embodiments, after detecting the end of the input and in response to detecting a respective input that is different from the input directed to the visual content, the computer system continues to display the subject at the third location and continues to display the second portion at which the second portion was displayed before detecting the respective input. Displaying the subject at the third location without displaying the second portion at the third location in response to detecting the end of the input directed to the visual content provides the user with control over the computer system to display and/or drop the subject at a particular location on the display via the input, which provides additional control options without cluttering the user interface.

In some embodiments, the representation of the visual content is displayed in a first application (e.g., application in FIG. 6F). In some embodiments, the third location is in a second application (e.g., application in FIG. 6G) that is different from the first application. In some embodiments, the first location is in the first application. Moving display of the subject from the first location to the third location that is in a different application without moving display of the second portion from the second location in response to detecting movement of the input directed to the representation of the visual content provides the user with control over the computer system to move the subject between applications on the computer system without moving the second portion between different applications, which provides additional control options without cluttering the user interface.

In some embodiments, the representation of the visual content is displayed in a first area (e.g., area of 610*a* in FIGS. 6E-6F) of a third application. In some embodiments, the third location is in a second area (e.g., area of 610*a*1 in FIG. 6F) of the third application that is different from the first area of the third application. In some embodiments, the first location is in the first area of the second application. In some embodiments, the second location is in the first area of the second location. In some embodiments, the first area does not encompass and/or is outside of the second area. In some embodiments, the second area does not encompass and/or is outside of the second area. Moving display of the subject from the first location to the third location that is in a different area of an application without moving display of the second portion from the second location in response to detecting movement of the input directed to the visual content provides the user with control over the computer system to move the subject between different areas of an application on the computer system without moving the second portion between different areas of an application, which provides additional control options without cluttering the user interface.

In some embodiments, displaying the representation (e.g., 610, 612, 620, and/or 658*a*-658*d*) of the visual content includes displaying the subject at a first size in the representation of the visual content. In some embodiments, moving display of the subject from the first location to the third location includes moving a first user interface object (e.g., 610*a*1) (e.g., a proxy object and/or a thumbnail) that includes a first representation of the subject and does not include a first representation of the second portion. In some embodiments, the first representation of the subject in the first user interface object is displayed at a second size that is smaller than the first size. In some embodiments, the first representation is smaller than the representation of the visual content. Displaying the first user interface object that includes a first representation of the subject and does not include a first representation of the second portion provides the user with visual feedback that the subject can be moved in response to detecting the input directed to the visual content, which provides feedback to the user.

In some embodiments, displaying the representation of the visual content includes displaying the subject at a third size in the representation of the visual content. In some embodiments, moving display of the subject from the first location to the third location includes moving a second user interface object (e.g., a proxy object and/or a thumbnail) that includes a second representation of the subject that is emphasized relative to a second representation of the second portion (e.g., as described above in relation to FIG. 6F). In some embodiments, the second representation of the subject in the second user interface object is displayed at a fourth size that is smaller than the third size. In some embodiments, the second representation is smaller than the representation of the visual content. Displaying the second user interface object that includes a second representation of the subject that is emphasized relative to a second representation of the second portion provides the user with visual feedback that the subject can be moved in response to detecting the input directed to the visual content, which provides feedback to the user.

In some embodiments, detecting the input directed to the representation of the visual content includes detecting a pointer activation (e.g., 680) (e.g., mouse click or trackpad press) and detecting that the pointer is hovering over a third user interface object (e.g., 626a) that, when selected, cause the computer system to copy the subject without copying the second portion (e.g., as described above in relation to FIG. 6I) (e.g., for a predetermined period of time (e.g., 0.05-5 seconds)). In some embodiments, the pointer activation is detected before detection of the pointer hovering over the third user interface object. Detecting a pointer activation and detecting that the pointer is hovering over a third user interface object as a part of detecting the input directed to the visual content provides the user with more control over the computer system by allowing the user to provide an input via a mouse click and hovering without displaying additional user interface elements, which provides additional control options without cluttering the user interface.

In some embodiments, while detecting that the pointer (e.g., 680) is hovering over the third user interface object, the computer system detects movement of the pointer (e.g., and/or the mouse) away from the third user interface object (e.g., described above in relation to FIGS. 6I-6J). In some embodiments, in response to detecting movement of the pointer away from the third user interface object, the computer system ceases to display the indication that the operation can be performed to copy the subject (e.g., 610a-610b) without copying the second portion (e.g., 610c) (and/or ceasing to emphasize the subject relative to the second portion). In some embodiments, in response to detecting the input directed (e.g., a location in) to the representation of the visual content and in accordance with a determination that the first portion includes a subject that is available to be copied, the computer system emphasizes the subject relative to the second portion. Ceasing to display the indication that the operation can be performed to copy the subject without copying the second portion in response to detecting movement of the mouse pointer away from the third user interface object provides the user with control over the computer system to cease to display the indication and allows the computer system to reduce the number of user interface objects that are displayed in certain situations, which provides additional control options without cluttering the user interface and performs an operation when a set of conditions has been met without requiring further user input and provides visual feedback.

In some embodiments, in response to detecting the input (e.g., 650a2, 650k, and/or as described above in relation to 680) directed to the representation of the visual content, the computer system provides (e.g., displays) an indication (e.g., 614 and/or 674) that an operation can be performed to modify the representation of the visual content, such that the representation of the visual content includes the subject (e.g., 610a-610b) and does not include the second portion (e.g., 610c). In some embodiments, in response to detecting an input while the indication is displayed, the computer system modifies the representation of the visual content includes the subject and does not include the second portion (e.g., as described above in relation to method 700). Providing an indication that an operation can be performed to modify a representation of the visual content, such that the representation of visual content includes the subject and does not include the second portion in response to detecting the input directed to the visual content provides the user with an additional control option, which provides additional control options without cluttering the user interface.

In some embodiments, the first portion of the representation of visual content includes a first subject (e.g., 610a) and a second subject (e.g., 610b). In some embodiments, in accordance with a determination that the input (e.g., 650d) directed to the representation of the visual content is directed to (e.g., and/or a first location that corresponds to a location of) the first subject in the first portion, the indication that the operation can be performed to copy the subject without copying the second portion is an indication that the operation can be performed to copy the first subject without copying the second subject (and optionally without copying the second portion) (e.g., as described above in relation to FIGS. 6D-6E). In some embodiments, while providing the indication the operation can be performed to copy the first subject without copying the second portion, the computer system detects an input, and in response to detecting the input, the computer system copies the first subject without copying the second subject and the second portion. In some embodiments, in accordance with a determination that the input directed to the representation of the visual content is directed to (e.g., and/or a second location, different from the first location, that corresponds to a location of) the second subject, different from the first subject, in the first portion, the indication that the operation can be performed to copy the subject without copying the second portion is an indication that the operation can be performed to copy the second subject without copying the first subject (e.g., as described above in relation to FIGS. 6D-6E) (and optionally without copying the second portion). In some embodiments, while providing the indication the operation can be performed to copy the second subject without copying the second portion, the computer system detects an input, and in response to detecting the input, the computer system copies the second subject without copying the first subject and the second portion. Providing an indication concerning the first subject or the second subject based on the input being directed to a particular subject provides the user with control over which subject that can be copied without copying the second portion, which provides additional control options without cluttering the user interface.

In some embodiments, in response to detecting the input directed (e.g., a location in) to the representation of the visual content and in accordance with a determination that the first portion is not a subject that is available to be copied, the computer system forgoes providing the indication that the operation can be performed to copy the subject without copying the second portion (e.g., as described above in relation to FIG. 6H). Choosing whether to provide the indication that the operation can be performed to copy the subject without copying the second portion allows the computer system to automatically inform the user about the operation that can be performed, which performs an operation when a set of conditions has been met without requiring further user input and provides visual feedback.

In some embodiments, in response to detecting the input directed (e.g., a location in) to the representation of the visual content and in accordance with a determination that the first portion of the visual content includes a third subject and a fourth subject that are available to be copied, the computer system provides an indication (e.g., 626b) that an operation can be performed to copy the third subject and the fourth subject without copying the second portion of the visual content (e.g., as described above in relation to FIGS. 6A-6E). In some embodiments, as a part of detecting the input directed to the visual content, the computer system detects movement of an input at a location that corresponds to the third subject to a location that corresponds to the fourth subject and/or vice-versa. In some embodiments, in response to detecting an input while the indication is displayed, the computer system copies the third subject and the fourth subject without copying the second portion of the visual content. In some embodiments, in response to detecting the input directed to the representation of the visual content and in accordance with a determination that the representation of the visual content includes one subject, the indication operation can be performed (e.g., by the computer system) to copy the subject (e.g., 610a-610b) without copying the second portion has a first visual appearance (e.g., includes the word "Subject). In some embodiments, in response to detecting the input directed to the representation of the visual content and in accordance with a determination that the representation of the visual content includes multiple subjects, the indication operation can be performed (e.g., by the computer system) to copy the subject (e.g., 610a-610b) without copying the second portion has a second visual appearance (e.g., includes the word "Subjects") that is different from the first visual appearance (e.g., includes the word "Subject" without including the word "Subjects"). Providing an indication that an operation can be performed to copy the third subject and the fourth subject without copying the second portion of the visual content in response to detecting the input directed to the visual content allows a user to perform an operation to copy multiple subjs without copying the second portion of the visual content, which performs an operation when a set of conditions has been met without requiring further user input and provides visual feedback.

In some embodiments, the representation of visual content includes (and/or is) a representation of an image or a video (e.g., as described above in relation to FIG. 6M).

Note that details of the processes described above with respect to method 800 (e.g., FIG. 8) are also applicable in an analogous manner to the methods described below/above. For example, method 800 optionally includes one or more of the characteristics of the various methods described above with reference to method 700. For example, method 700 used to display a user interface object for managing the background of a media representation that is concurrently displayed with a user interface object for copying subjects of a media representation based on method 800. For brevity, these details are not repeated below.

FIGS. 9A-9I illustrate exemplary user interfaces for converting one or more portions of a media representation in accordance with some embodiments. The user interfaces in FIGS. 9A-9I are used to illustrate the processes described below, including the processes in FIG. 10.

FIG. 9A illustrates computer system 600 displaying a settings user interface that includes device-region setting 932. In FIG. 9A, device-region setting 932 is set to the "United States," which indicates that computer system 600 is associated with a location that corresponds to a region occupied by the United States. As illustrated in FIG. 9B, computer system 600 is displaying a web application user interface. The web application user interface includes application control region 602, application display region 604, and application control region 606, which computer system 600 displays using one or more techniques as described above in relation to FIGS. 6A-6M. Application display region 604 includes text 906 that discusses the process of boiling water. Text 906 includes length measurement 906a ("21 CM") and degree measurement 906b ("100°") along with other prose. At FIG. 9B, computer system 600 emphasizes (e.g., underlines in FIG. 9B) length measurement 906a and degree measurement 906b to indicate that a determination has been made that computer system 600 can convert these measurements and/or that these portions of text have been identified as measurements that can and/or should be converted. At FIG. 9B, computer system 600 detects tap input 950b on length measurement 906a.

Figure 9E:
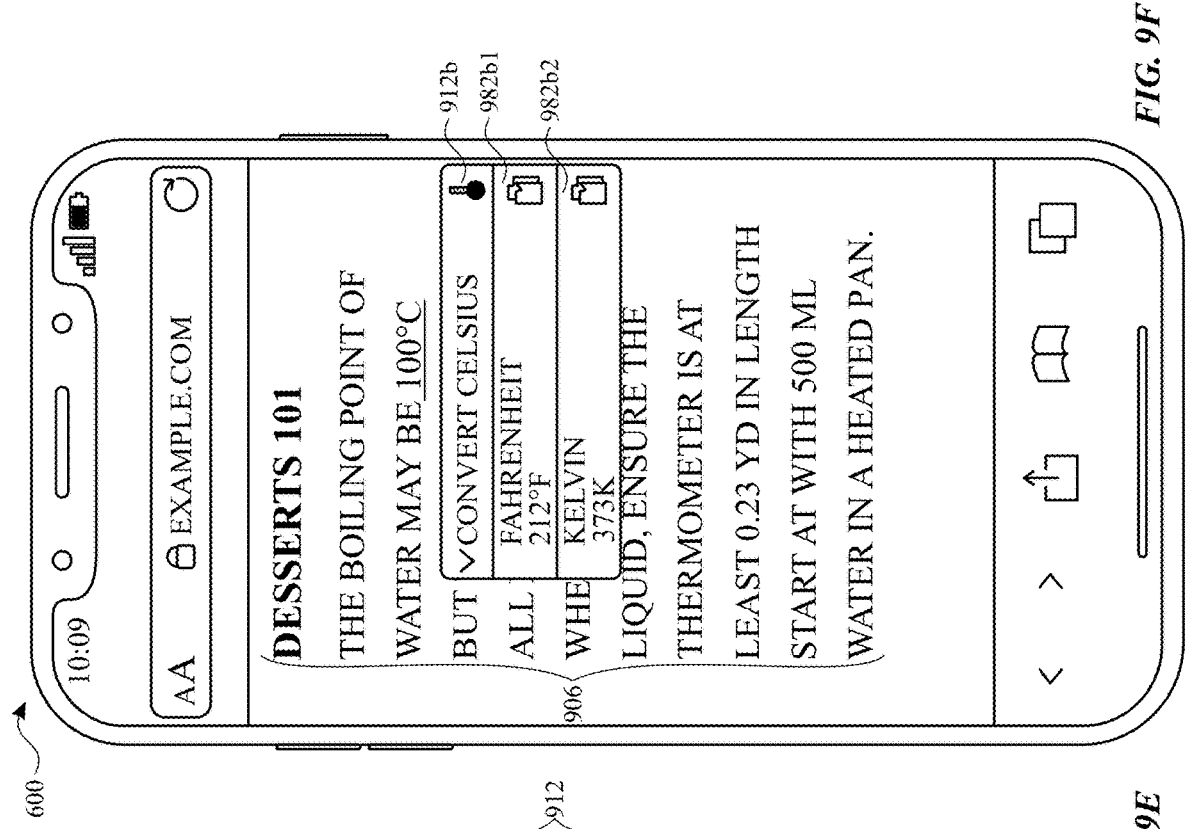

As illustrated in FIG. 9C, computer system 600 displays a conversion user interface that includes conversion-representation 908a and conversion controls 910. Here, the conversion user interface overlays a portion of text 906 of FIG. 9B. Conversion representation 908a indicates the measurement in text 906 (e.g., length measurement 906a of FIG. 9B) for which computer system 600 can convert to an equivalent measurement that has a unit of measurement that is different from the unit of measurement in text 906. Each of conversion controls 910 indicate a particular equivalent measurement to the measurement indicated by conversion-representation 908a, which corresponds to length measurement 906a that was selected via input 950b at FIG. 9B. In particular, each of conversion controls 910 indicate a unit of measurement that indicates a measure of length because the unit of measurement (e.g., "cm") of length measurement 906a (e.g., "21 CM") is a measure of length (e.g., because a determination was made that length measurement corresponds to a measure of length). Conversion controls 910 include inches-conversion control 910a (e.g., "Inches"), feet-and-inches-conversion control 910b (e.g., "Feet and Inches"), yard-conversion control 910c (e.g., "Yards"), millimeters-conversion control 910d (e.g., "Millimeters"), centimeters-conversion control 910e (e.g., "Centimeters"), and meters-conversion control 910f (e.g., "Meters"). Inches-conversion control 910a indicates that length measurement 906a (e.g., "21 CM") is equivalent to a measurement of 8 inches. Feet-and-inches-conversion control 910b indicates that length measurement 906a (e.g., "21 CM") is equivalent to a measurement of 0 feet and 8 inches. Yard-conversion control 910c indicates that length measurement 906a (e.g., "21 CM") is equivalent to a measurement of 0.23 yards. Millimeters-conversion control 910d indicates that length measurement 906a (e.g., "21 CM") is equivalent to a measurement of 210 mm. Centimeters-conversion control 910e indicates that length measurement 906a (e.g., "21 CM") is equivalent to a measurement of 21 cm. Meters-conversion control 910f indicates that length measurement 906a (e.g., "21 CM") is equivalent to a measurement of 0.21 meters. As illustrated in FIG. 9C, the measurements indicated by each of the conversion controls of FIG. 9C are all equivalent to each other and length measurement 906a. For purposes of the description of FIGS. 9A-9I, an equivalent measurement or a measurement that is equivalent can be absolutely and/or approximately (e.g., rounded up and/or down to the nearest tenth, hundredth, ten-hundredth, and/or thousandth) equivalent to the measurement that computer system 600 is converting. In some embodiments, an equivalent measurement is only a measurement that is absolutely equivalent.

In some embodiments, computer system 600 displays one or more other conversion controls for converting length measurement 906a into an equivalent measure of length that has a different unit of measurement from the units of measurement that are represented by conversion controls 910. In some embodiments, computer system 600 displays one or more respective conversion controls of conversion controls 910 because the units of measurements indicated by the one or more respective conversion controls are units of measurements that correspond to a location that is currently associated with the computer system 600, such as the region ("United States") indicated by device-region setting 932 of FIG. 9A and/or a location computer system 600 detects based on geolocation information (e.g., a location based on data that computer system 600 obtains via one or more GPS sensors and/or data that is detected based on one or more Wi-Fi and/or cellular connections) (e.g., current geolocation information and/or information obtained within a period of time (e.g., within 30 minutes, within 5 hours, within 2 weeks, and/or within 1 month)). In some embodiments, a unit of measurement corresponds to a particular location based on a determination of whether a particular unit of measurement is commonly used in a particular location. For example, in some embodiments, computer system 600 does not display yard-conversion control 910c when a determination is made that computer system 600 is not in a region that commonly uses yards and/or the Imperial System of Measurement. In some embodiments, computer system 600 displays a conversion control that indicates a conversion of the measurement represented by conversion-representation 908a into hectares based on a determination that computer system 600 is currently associated with a location that commonly (e.g., and/or preferably) uses hectares. In some embodiments, at FIG. 9B, computer system 600 does not emphasize length measurement 906a (and/or another measurement) based on a determination being made that length measurement 906a has a unit of measurement that is the only commonly used unit of measurement (and/or represents a unit of measurement from the only measurement system, such as the Metric System and/or the Imperial System of Measurement) in the location that is associated with computer system 600. In some embodiments, computer system 600 does not display a conversion user interface in response to detecting an input that is directed to a respective measurement that is not currently being emphasized and/or a measurement for which a determination has been made that the unit of measurement represented by the respective measurement is a unit of measurement that is the only commonly used unit of measurement (and/or represents a unit of measurement from the only measurement system) in the location that is associated with computer system 600. In some embodiments, controls 910 display measurement values that are all rounded to the same decimal place, such as the tenth, hundredth, or thousandths decimal place. At FIG. 9C, computer system 600 detects tap input 950c1 on a first portion of yard-conversion control 910c or tap input 950c2 on a second portion of yard-conversion control 910c. In some embodiments, the first portion of yard-conversion control 910c (e.g., or another control) includes copy control (e.g., as shown by the graphical user interface object in the middle of the indication for input 950cl of FIG. 9C).

As illustrated in FIG. 9D, in response to detecting tap input 950c1 or tap input 950c2, computer system 600 replaces display of length measurement 906a of FIG. 9B ("21 CM") with display of length measurement 906c ("0.23 Yards") in text 906. Length measurement 906c is the measurement ("0.23 Yards") indicated by yard-conversion control 910c of FIG. 9C that is equivalent to length measurement 906a of FIG. 9B ("21 CM"). In some embodiments, computer system 600 overlays length measurement 906c over length measurement 906a of FIG. 9B in text 906. In some embodiments, computer system 600 emphasizes length measurement 906c to indicate that length measurement 906c is not an original portion of text 906. In some embodiments, computer system 600 emphasizes length measurement 906c by displaying length measurement 906c in a box and/or displaying length measurement 906c with a visual characteristic (e.g., color, font, size, share, and/or outline) that is different from the visual characteristic of length measurement 906a of FIG. 9B. In some embodiments, in response to detecting tap input 950cl or tap input 950c2, computer system 600 copies display of length measurement 906a of FIG. 9B into a copy buffer. In some embodiments, in response to detecting tap input 950c1, computer system 600 copies display of length measurement 906a into a copy buffer without replacing display of length measurement 906a of FIG. 9B ("21 CM") with display of length measurement 906c ("0.23 Yards") in text 906. In some embodiments, in response to detecting tap input 950cl, computer system 600 displays length measurement 906c in another application, such as word processing application, a communication application (e.g., an e-mail application and/or a text application), and/or a productivity application (e.g., a note taking application and/or a presentation application), without detecting intervening user input after tap input 950cl is detected. In some embodiments, in response to detecting an input on a conversion control of conversion controls 910 that is different from yard-conversion control 910c at FIG. 9C, computer system 600 copies the measurement represented by the respective conversion control and/or replaces display of length measurement 906a of FIG. 9B with display of the measurement represented by the respective conversion control (e.g., that is different from length measurement 906c), using one or more similar techniques as discussed above. At FIG. 9D, computer system 600 detects tap input 950d on degree measurement 906b ("100°").

As illustrated in FIG. 9E, in response to detecting tap input 950d, computer system 600 displays an ambiguous conversion user interface that includes conversion-representation 908b (e.g., "100°"), conversion-option controls 912, and copy control 914. Computer system 600 displays the ambiguous conversion user interface at FIG. 9E because a determination was made that the unit of measurement of degree measurement 906b is ambiguous. Here, the unit of measurement (e.g., "0") of degree measurement 906b is ambiguous because the unit of measurement does not signify the type of degree, such as a degree of a particular temperature (e.g., Celsius and/or Fahrenheit) and/or a degree of angle. Accordingly, computer system 600 displays the ambiguous conversion user interface at FIG. 9E to determine (e.g., based on input from a user) how computer system 600 should interpret the unit of measurement that corresponds to degree measurement 906b. Conversion-option controls 912 are options for how computer system 600 can interpret the unit of measurement that corresponds to the unit of measurement of degree measurement 906b. Computer system 600 displays a respective conversion-option control of conversion-option controls 912 because a determination is made that the respective conversion-option control indicates an appropriate unit of measurement that could correspond to the unit of measurement of degree measurement 906b. Conversion-option controls 912 include convert-to-Fahrenheit-option control 912a, convert-to-Celsius-option control 912b, and convert-to-angle-option control 912c. Convert-to-Fahrenheit-option control 912a includes temperature indication 912a1, which indicates that the unit of measurement ("F") that corresponds to convert-to-Fahrenheit-option control 912a represents a type of temperature measurement. Convert-to-Celsius-option control 912b includes temperature indication 912b1, which indicates that the unit of measurement ("C") that corresponds to convert-to-Celsius-option control 912b represents a type of temperature measurement. Convert-to-angle-option control 912c includes degree indication 912c1, which indicates the unit of measurement that corresponds to convert-to-angle-option control 912c represents a type of angle measurement. Notably, temperature indication 912a1 and temperature indication 912b1 both include pictures of a thermometer to indicate a temperature measurement. However, at FIG. 9E, the thermometer of temperature indication 912a1 is less filled up than temperature indication 912b1. Here, the thermometer of temperature indication 912a1 is less filled up than temperature indication 912b1 to show that 100° F. is a colder temperature than 100° C. In other words, in some embodiments, indications that correspond to conversion option controls can indicate a degree (e.g., scalding, hot, warm, cold, long, short, wide, and/or narrow) of difference between an ambiguous measurement being converted to one unit of measurement over another unit of measurement. At FIG. 9E, computer system 600 detects tap input 950e on convert-to-Celsius-option control 912b.

Figure 9F:
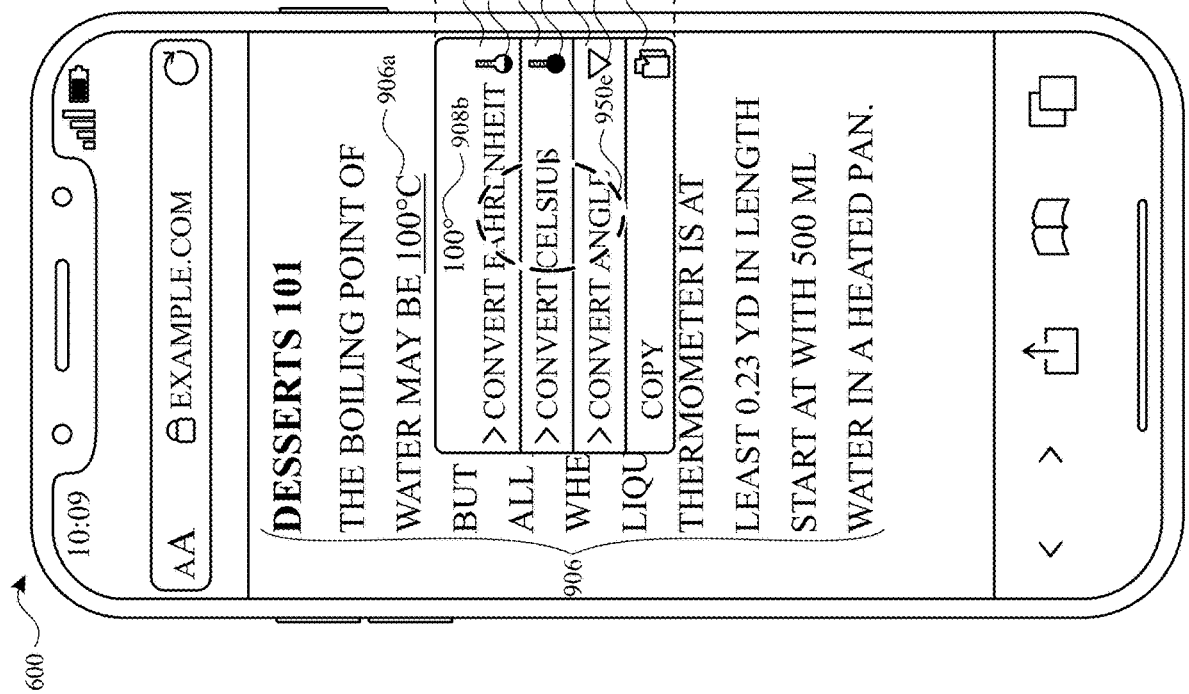

As illustrated in FIG. 9F, in response to detecting tap input 950e, computer system 600 displays Fahrenheit-conversion control 982b1 and Kelvin-conversion control 982b2. Additionally, computer system 600 continues to display convert-to-Celsius-option control 912b with temperature indication 912b1 and ceases to display convert-to-Fahrenheit-option control 912a and convert-to-angle-option control 912c. As illustrated in FIG. 9F, in response to detecting tap input 950e, computer system 600 adds a "C" to degree measurement 906b in text 906. At FIG. 9F, computer system 600 adds a "C" (and/or overlays a "C" over a portion of text 906 that is next) to degree measurement 906b in text 906 in order to indicate that computer system 600 has interpreted 100° to be 100° C. In some embodiments, in response to detecting tap input 950e, computer system 600 does not add the "C" to degree measurement 906b. In some embodiments, in response to detecting an input on one of Fahrenheit-conversion control 982b1 and Kelvin-conversion control 982b2, computer system 600 performs one or more operations corresponding to the control to which the input was on and degree measurement 906b, using one or more techniques discussed above in relation to length measurement 906a and inputs 950c1-950c2 of FIGS. 9B-9D. In some embodiments, computer system 600 expands convert-to-Celsius-option control 912b to display Fahrenheit-conversion control 982b1 and Kelvin-conversion control 982b2. In some embodiments, computer system 600 continues to display one or more convert-to-Fahrenheit-option control 912a and convert-to-angle-option control 912c while continuing to display Fahrenheit-conversion control 982b1 and Kelvin-conversion control 982b2. In some embodiments, computer system 600 detects an input at FIG. 9E on convert-to-Fahrenheit-option control 912a and, in response to detecting the input at FIG. 9E on convert-to-Fahrenheit-option control 912a, displays one or more different conversion controls that correspond to 100° F., such as a control that, when selected, causes computer system 600 to convert 100° F. to 37.78° C. In some embodiments, computer system 600 detects an input at FIG. 9E on convert-to angle-option control 912c and, in response detecting the input at FIG. 9E on convert-to angle-option control 912c, displays one or more different conversion controls (e.g., different from controls 982b1-982b2) that correspond to 100° (e.g., an angle of degrees), such as a control that, when selected, causes computer system to convert 100° to 1.74533 (or 1.7, 1.75, or 1.745) radians. In some embodiments, computer system 600 detects an input at FIG. 9E on copy control 914 and, in response to detecting the input at FIG. 9E on copy control 914, computer system 600 copies 100° a copy buffer without expanding one or more of conversion-option controls 912 of FIG. 9E.

Figure 9G:
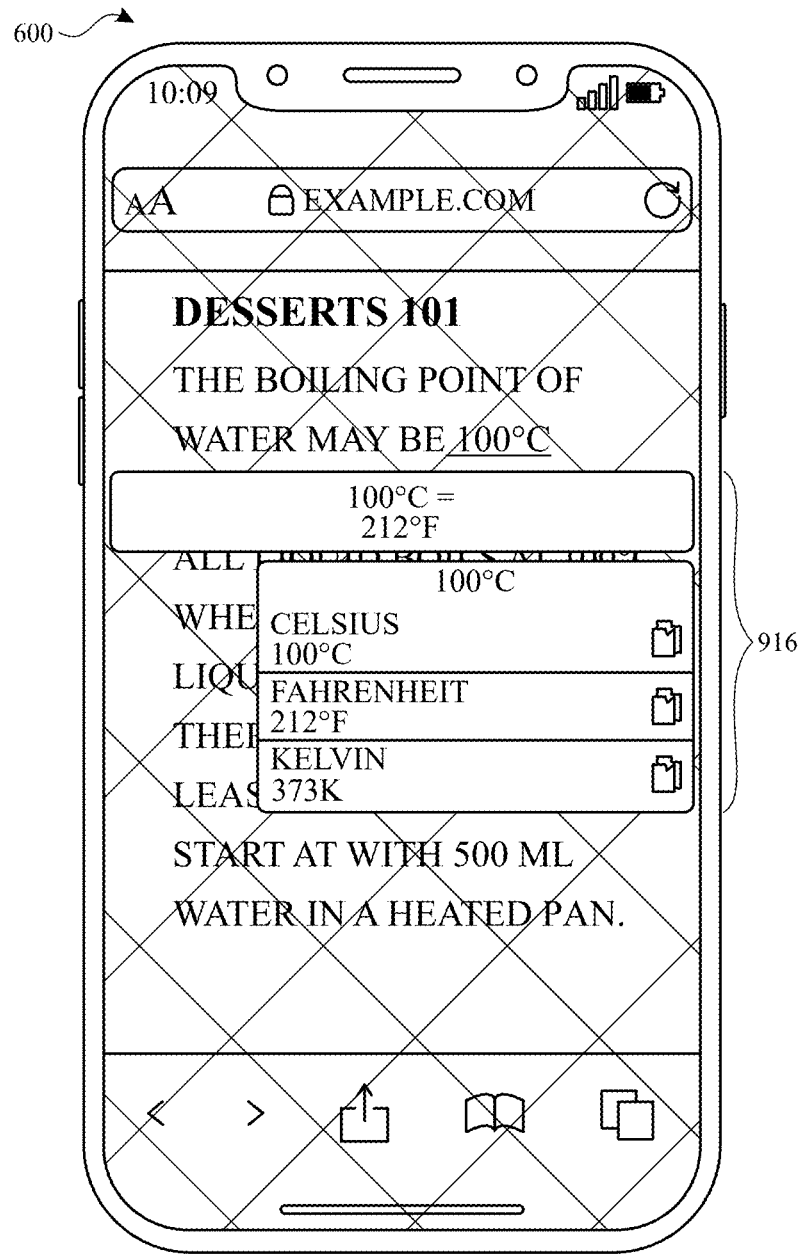

FIG. 9G illustrates an alternative user interface that could be displayed in response to detecting an input directed to degree measurement 906b of FIG. 9D if the unit of measurement that corresponds to degree measurement 906b of FIG. 9D was determined to be unambiguous and be Celsius. At FIG. 9G, instead of displaying an ambiguous conversion user interface, computer system 600 displays a conversion user interface that includes conversion controls 916. The conversion user interface at FIG. 9G is displayed because the unit of measurement that corresponds to degree measurement 906b of FIG. 9D was determined to be unambiguous and be Celsius in response to detecting an input directed to degree measurement 906b of FIG. 9D. In response to detecting an input directed to one of conversion controls 916, computer system 600 coverts 100° C. in the text of FIG. 9G to an equivalent measurement, using or more techniques as described above in relation to FIGS. 9B-9C.

Figure 9H:
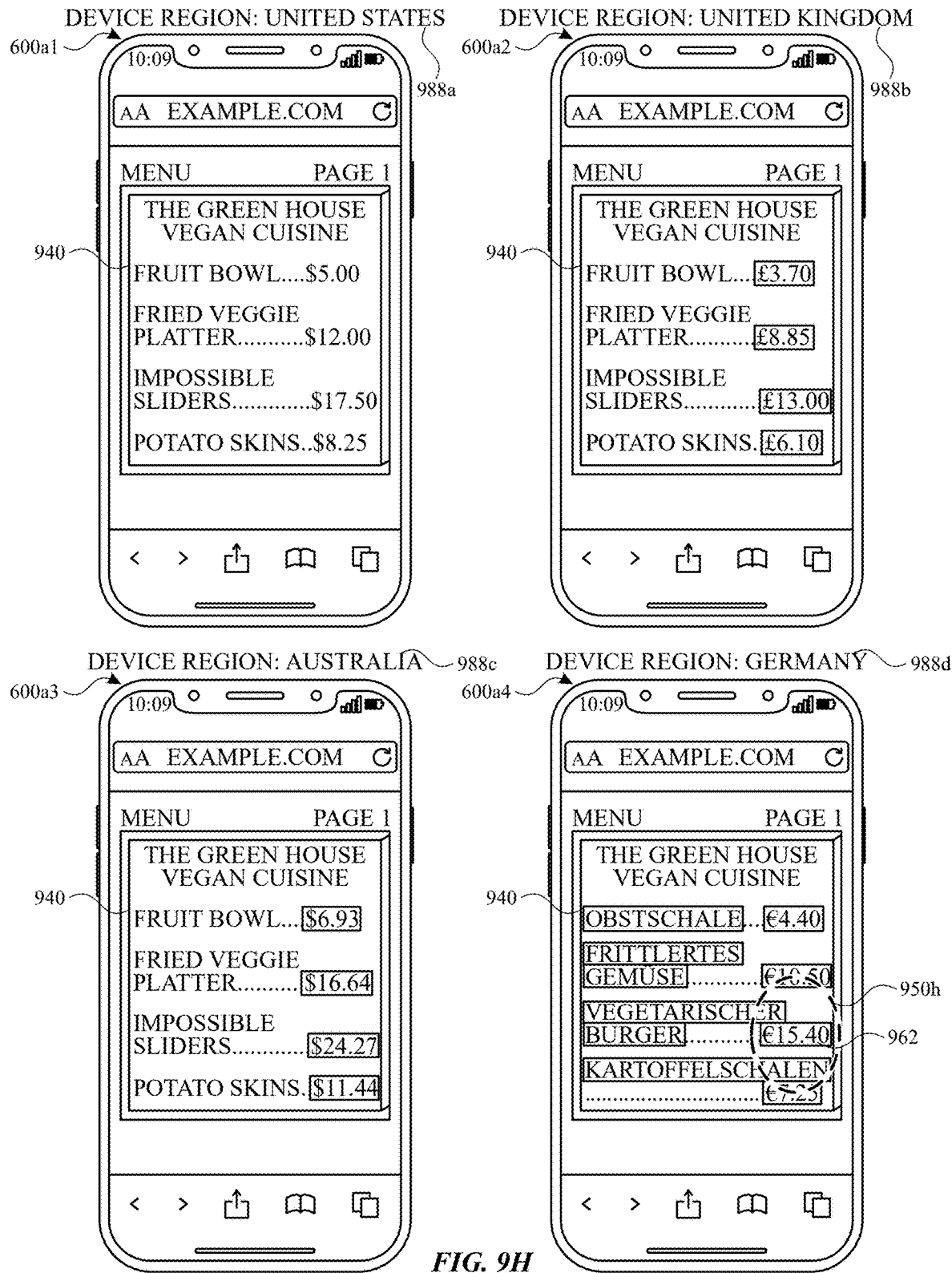
Figure 9I:
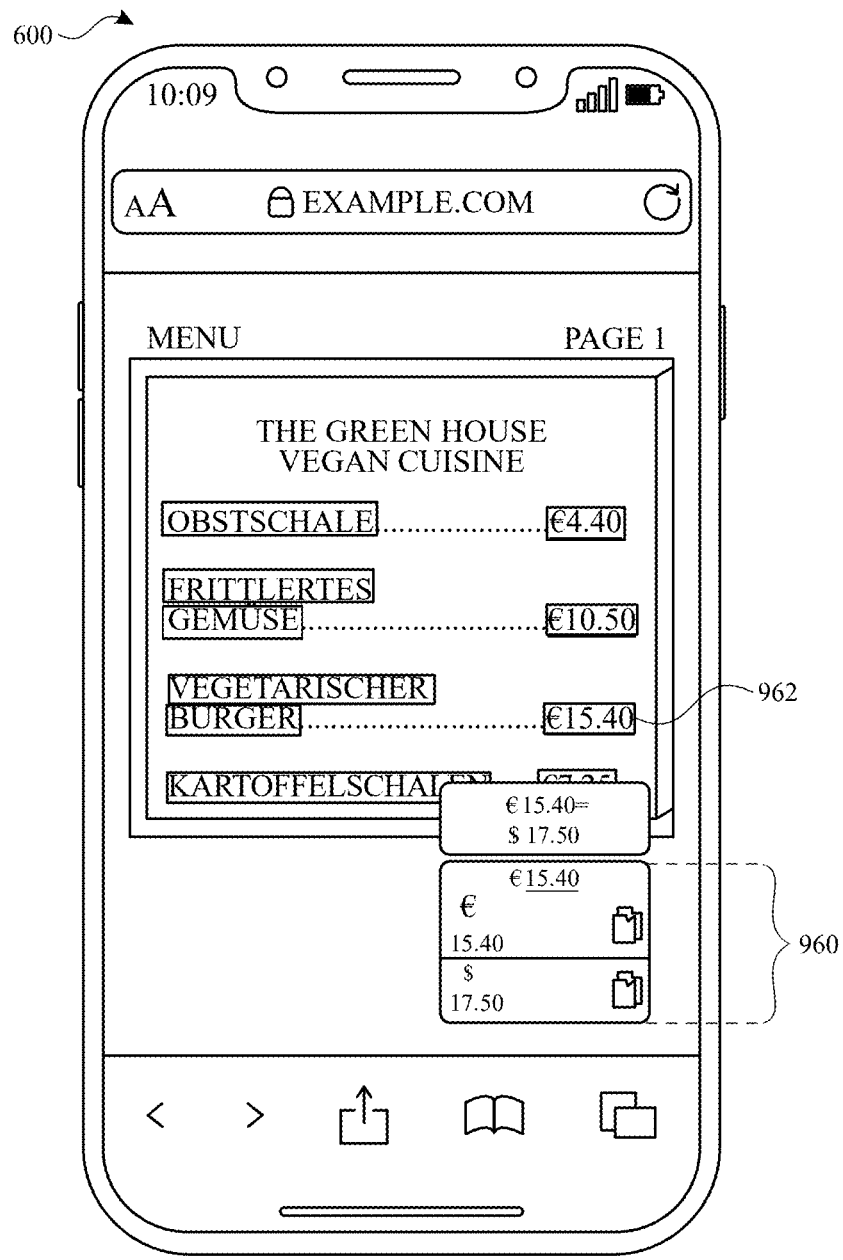

FIG. 9H illustrates exemplary scenarios of how a computer system can translate information and convert measurements from source material differently based on a particular location that is associated with a computer system. Computer systems 600a1-600a4 includes one or more components and/or perform one or more operations described above with respective to electronic device 100, 300, and/or 500 and computer system 600. For the purposes of discussion of FIG. 9H, computer systems 600a1-600a4 are all in the same physical location and are positioned close together. At FIG. 9H, computer systems 600a1-600a4 are displaying a webpage that includes a representation of menu 940. The representation of menu 940 is a representation of previously captured media. The representation of menu 940 includes text in English that describes each menu item and the currency for the menu item is in U.S. Dollars. Thus, the original representation of menu 940 looks like the representation of menu 940 that is being displayed by computer system 600a1. In other words, at FIG. 9H, computer system 600a1 is not translating any portion of the representation of menu 940 or converting any of the prices on menu 940 into any other currency. At FIG. 9H, computer system 600a1 does not translate any portion of the representation of menu 940 or convert any of the prices on menu 940 into any other currency because a determination is made that computer system 600a1 is associated with the United States based on the device region setting of computer system 600*a*1 (e.g., as discussed above in relation to FIG. 9A) being set to "United States" (e.g., as indicated by device region setting indication 988*a*). Moreover, computer system 600*a*1 does not translate any portion of the representation of menu 940 or convert any of the prices on menu 940 into any other currency because a determination has been made that English is a language that is common to the United State and the U.S. Dollar is a currency that is common to the United States (e.g., the device region to which the device region setting of computer system 600*al* is set). At FIG. 9H, computer system 600*a*2 does not translate any portion of the representation of menu 940 but converts the prices on menu 940 into pounds because a determination is made that computer system 600*a*2 is associated with the United Kingdom based on the device region setting of computer system 600*a*2 being set to "United Kingdom" (e.g., as indicated by device region setting indication 988*b*). In particular, computer system 600*a*2 does not translate any portion of the representation of menu 940 because a determination has been made that English is a language that is common to the United Kingdom. However, computer system 600*a*2 converts the prices on menu 940 because the pound is the currency that is common to (or more preferred in and/or the official currency of) the United Kingdom. At FIG. 9H, computer system 600*a*3 translates portions of the representation of menu 940 and converts the prices on menu 940 into Australian Dollars because a determination is made that computer system 600*a*3 is associated with Australia based on the device region setting of computer system 600*a*3 being set to "Australia" (e.g., as indicated by device region setting indication 988*c*). In particular, computer system 600*a*3 does not translate any portion of the representation of menu 940 because a determination has been made that English is a language that is common to Australia. However, computer system 600*a*3 converts the prices on menu 940 because the Australian Dollar is the currency that is common to (or preferred in (e.g., relative to the original currency) and/or the official currency of) Australia. At FIG. 9H, computer system 600*a*4 translates portions of the representation of menu 940 into German and converts the prices on menu 940 into euros because a determination is made that computer system 600*a*4 is associated with Germany based on the device region setting of computer system 600*a*4 being set to "Germany" (e.g., as indicated by device region setting indication 988*d*). In particular, computer system 600*a*4 translates portions of the representation of menu 940 into German because a determination has been made that German is a language that is common to (or more preferred in (e.g., relative to the original language of menu 440) Germany. In addition, computer system 600*a*4 converts one or more prices on menu 940 from dollars to euros because the euro is the currency that is common to (or more preferred in and/or the official currency of) Germany. In some embodiments, a computer system uses the geolocation of the computer system to determine whether or not to translate (e.g., automatically translate) or convert a measurement (e.g., as also described above in relation to FIGS. 9A-9B) in addition to and/or in lieu of using a device region setting to the determine whether or not to translate or convert a measurement. At FIG. 9H, computer system 600*a*4 detects tap input 950*h* on price 962.

FIG. 10 is a flow diagram illustrating methods of converting one or more portions of a media representation in accordance with some embodiments. Method 1000 is performed at a computer system (e.g., 100, 300, 500, and/or 600) (e.g., a smartphone, a desktop computer, a laptop, a tablet) that is in communication with a display generation component (e.g., a display controller, a touch-sensitive display system). In some embodiments, the computer system is in communication with one or more input devices (e.g., a touch-sensitive surface). Some operations in method 1000 are, optionally, combined, the orders of some operations are, optionally, changed, and some operations are, optionally, omitted.

As described below, method 1000 provides an intuitive way for converting one or more portions of a media representation. The method reduces the cognitive burden on a user for converting one or more portions of a media representation, thereby creating a more efficient human-machine interface. For battery-operated computing devices, enabling a user to convert one or more portions of a media representation faster and more efficiently conserves power and increases the time between battery charges.

Method 1000 is performed at a computer system (e.g., 600) (e.g., a smartphone, a desktop computer, a laptop, a tablet) that is in communication with a display generation component (e.g., a display controller, a touch-sensitive display system). In some embodiments, the computer system is in communication with one or more input devices (e.g., a touch-sensitive surface).

While displaying a representation that includes text (e.g., 906 and/or 940) (e.g., a representation of an image, a paragraph, one or more lines, a receipt, and/or a document), the computer system detects (1002) an input (e.g., 950*b* and/or 950*d*) (e.g., a tap input or a non-tap input (e.g., a long-press input, a swipe input, a multi-tap input, an input on a physical input mechanism (e.g., a rotatable input mechanism and/or a button) and/or a mouse click) that corresponds to selection of a portion of the text in the representation (and/or selection of the first measurement).

In response to detecting the input (e.g., 950*b* and/or 950*d*) that corresponds to selection of the portion (e.g., 906*a* and/or 906*b*) of the text in the representation and in accordance with a determination that the portion of the text in the representation meets a respective set of criteria, where the respective set of criteria includes a criterion that is met when a determination is made that the portion of the text corresponds to a first measurement that has a first number and a first unit of measurement, the computer system displays (1004), via the display generation component, a respective user interface (e.g., user interface that displays 910, 912, 912*b*, 916, 960, 982*b*1, and/or 982*b*2) for converting the first measurement into one or more other units of measurement, where the respective user interface includes a visual representation (e.g., one or more of 910, 912, 912*b*, 916, 960, 982*b*1, and/or 982*b*2) of a second measurement that has a second number with a second unit of measurement that is different from the first unit of measurement (e.g., the first unit and the second unit are units for the same type of measurement (e.g., length, width, volume, currency, and/or temperature)). The second number is a conversion of the first number from the first unit of measurement to the second unit of measurement. In some embodiments, the respective user interface includes a second measurement that has a second number (different from the first number) and a second unit, different from the first unit (e.g., the first unit and the second unit are units for the same type of measurement (e.g., length, width, volume, currency, and/or temperature)). In some embodiments, the second measurement is a conversion of the first measurement. In some embodiments, the second measurement and/or the respective user interface is displayed concurrently with the representation that includes text in response to detecting the input that corresponds to selection of the portion of the text in the representation and in accordance with a determination that the portion of the text in the representation meets a respective set of criteria. In some embodiments, in response to detecting the input that corresponds to selection of the portion of the text in the representation and in accordance with a determination that the portion of the text in the representation does not meet the respective set of criteria, the computer system does not display the respective user interface and/or the second measurement. Displaying the respective user interface for converting the first measurement into one or more other units of measurement t when prescribed conditions are met allows the computer system to automatically display a conversion for (and convert) a measurement for a portion of the text in the representation that meets a respective set of criteria, which performs an operation when a set of conditions has been met without requiring further user input.

In some embodiments, the respective user interface (e.g., user interface that displays 910, 912, 912*b*, 916, 960, 982*b*1, and/or 982*b*2) includes a visual representation (e.g., one or more of 910, 912, 912*b*, 916, 960, 982*b*1, and/or 982*b*2) of a third number with a third unit of measurement that is different from the first unit of measurement (e.g., 906*a*, 906*b*, and/or 940) and the second unit of measurement (e.g., one or more of 910, 912, 912*b*, 916, 940, 960, 982*b*1, and/or 982*b*2). In some embodiments, the third number is a conversion of the first number from the first unit of measurement to the third unit of measurement. In some embodiments, the visual representation of a third number with the third unit of measurement is concurrently displayed with the visual representation of the second number with the second unit of measurement. In some embodiments, the visual representation of the third number with the third unit of measurement is concurrently displayed with the visual representation of the second number with the second unit of measurement and the visual representation of the first number with the first unit of measurement. Concurrently displaying the visual representation of a third number with the third unit of measurement with the visual representation of the second number with the second unit of measurement when prescribed conditions are met allows the computer system to automatically display multiple conversions for and convert a measurement for a portion of the text in the representation that meets a respective set of criteria, which performs an operation when a set of conditions has been met without requiring further user input.

In some embodiments, displaying the respective user interface for converting the first measurement into one or more other units of measurements includes displaying, via the display generation component, a first user interface object (e.g., one or more of 910, 912, 912*b*, 914, 916, 960, 982*b*1, and/or 982*b*2). In some embodiments, while displaying the first user interface object, the computer system detects an input (e.g., 950*c*1 and/or 950*c*2) directed to the first user interface object. In some embodiments, in response to detecting the input directed to the first user interface object, the computer system copies (e.g., into a copy buffer) the second number with the second unit of measurement (e.g., without copying the first number with the first unit of measurement). Copying the second number with the second unit of measurement in response to detecting the input directed to the first user interface object provides the user with a control option to copy a conversion of a unit of measurement that is in the portion of the text, which provides additional control options without cluttering the user interface.

In some embodiments, displaying the respective user interface for converting the first measurement into one or more other units of measurements includes displaying, via the display generation component, a second user interface object (e.g., one or more of 910, 912, 912*b*, 916, 960, 982*b*1, and/or 982*b*2). In some embodiments, while displaying the second user interface object, the computer system detects an input (e.g., 950*c*1 and/or 950*c*2) directed to the second user interface object. In some embodiments, in response to detecting the input directed to the second user interface object, the computer system replaces display of the portion of text (e.g., 906*a*) (e.g., the portion of the text corresponding to the first portion of the text) with display of the second number with the second unit of measurement (e.g., 906*c*) (e.g., while continuing to display at least a second portion of the text (e.g., the second portion of text is different from the portion of the text)). Replacing display of the portion of text with display of the second number with the second unit of measurement provides the user with a control option to replace, in the portion of text, the measurement in the portion of text with a conversion of the measurement, which provides additional control options without cluttering the user interface.

In some embodiments, the respective set of criteria includes a criterion that is met when a determination is made that the first unit of measurement (and/or the first measurement) is ambiguous (e.g., as described above in relation to 960*b* in FIG. 9D) (e.g., is a measurement or a portion of a measure that could be used multiple types of measurements (e.g., an ounce (e.g., fluid ounces vs weight ounces) and/or a degree (e.g., a degree of an angle and/or a degree of a temperature)). In some embodiments, in response to detecting the input (e.g., 950*b* and/or 950*d*) that corresponds to selection of the portion of the text in the representation and in accordance with a determination that the portion of the text corresponds to the first measurement (and/or the first measurement) is not ambiguous (e.g., is not a measurement for two different types of measurements (e.g., Kelvins and/or inches)) the computer system displays, via the display generation component, a second user interface (e.g., user interface that includes 912*a*-912*c*) that is different from the respective user interface (e.g., user interface that includes 910). In some embodiments, the second user interface does not include the visual representation of the second number with the second unit of measurement. Choosing whether to display the respective user interface or the second user interface based on prescribed conditions allows the computer system to display different user interface based on whether a detected measurement in the portion of text is ambiguous, which performs an operation when a set of conditions has been met without requiring further user input.

In some embodiments, the second user interface includes: a third user interface object (e.g., 912*a*-912*c*) that, when selected, causes the computer system to identify the first unit of measurement as a third unit of measurement; and a fourth user interface object (e.g., 912*a*-912*c*) that, when selected, causes the computer system to identify the second unit of measurement as a fourth unit of measurement that is different from (e.g., a different type of measurement than) the third unit of measurement. In some embodiments, the third user interface object is concurrently displayed with the fourth user interface object. Displaying the second user interface that includes the third user interface object and the fourth user interface object allows the computer system to provide the user with different user interface objects to choose a type of measurement in the portion of text, which provides additional control options without cluttering the user interface.

In some embodiments, while displaying the second user interface (e.g., user interface that includes 912a-912c) that includes the third user interface object and the fourth user interface object, the computer system detects a first input directed to the second user interface. In some embodiments, in response to detecting the first input directed to the second user interface, the computer system displays, via the display generation component, the visual representation (e.g., 982b1-982b2) of the second number with the second unit of measurement. Displaying the visual representation of the second number with the second unit of measurement in response to detecting the input directed to the second user interface allows the computer system to display the second number with the second unit of measurement after the user has selected a user interface object to choose a type of measurement in the portion of text, which performs an operation when a set of conditions has been met without requiring further user input.

In some embodiments, while displaying the second user interface (e.g., user interface that includes 912a-912c) that includes the third user interface object and the fourth user interface object, the computer system detects a second input (e.g., 950e) directed to the second user interface. In some embodiments, in response to detecting the second input (e.g., 950e) directed to the second user interface and in accordance with a determination that the second input directed to the second user interface was directed to the third user interface object, the computer system displays, via the display generation component, a visual representation (e.g., 982b1-982b2) of a third number with a third unit of measurement that is different from the first unit of measurement. In some embodiments, the third number is a conversion of the first number based on the third unit of measurement (and the third number is not a conversion of the first number based on the fourth unit of measurement) (e.g., as described above in relation to FIG. 9F). In some embodiments, in response to detecting the second input (e.g., 950e) directed to the second user interface and in accordance with a determination that the second input directed to the second user interface was directed to the fourth user interface object, the computer system displays, via the display generation component, a visual representation (e.g., 982b1-982b2) of a fourth number with a fourth unit of measurement that is different from the first unit of measurement and the third unit of measurement. In some embodiments, the fourth number is a conversion of the first number based on the fourth unit of measurement (and the fourth number is not a conversion of the first number based on the third unit of measurement) (e.g., as described above in relation to FIG. 9F). In some embodiments, the third number is different form the fourth number. In some embodiments, the third unit of measurement that is different from the fourth unit of measurement. Displaying the second number and the second unit of measurement as a different number and/or a different unit of measurement based on an input being directed to the third user interface object or the fourth user interface object allows the computer system to automatically display the second number and the second unit of measurement based on the input, which performs an operation when a set of conditions has been met without requiring further user input and provides additional control options without cluttering the user interface.

In some embodiments, while displaying the representation (e.g., 940) that includes the text, the computer system detects an input that corresponds to a request to translate one or more portions of the text. In some embodiments, in response to detecting the input that corresponds to the request to translate one or more portions of the text and in accordance with a determination that the one or more portions of text meets the respective set of criteria and the one or more portions of text are not in a first language (and/or are in a second language that is different form the first language), the computer system displays, via the display generation component, a first translated version of the one or more portions text. In some embodiments, the first translated version of the one or more portions of text includes a visual representation of a seventh number with a seventh unit of measurement. In some embodiments, the first translated version is in the first language (e.g., as described above in relation to FIG. 9H). In some embodiments, the seventh unit of measurement and the seventh number are different units of measurements and numbers than the units of measurements and the numbers in the one or more portions of text. In some embodiments, the first language is associated with a device region (e.g., a primary, secondary, and/or tertiary language of a region) setting (e.g., a setting that designates a region (e.g., United States, Europe, China, India, etc.) that the computer system is set as being commonly used in). In some embodiments, the one or more portions of text include items (e.g., products, food, services, and/or menu items) and currency, where the currency is the unit of measurement). Displaying, a first translated version of the one or more portions text. In some embodiments, the first translated version of the one or more portions of text includes a visual representation of a seventh number with a seventh unit of measurement. In some embodiments, the first translated version is in the first language when prescribed conditions are met allows the computer system to automatically and concurrently translate text and convert measurements in the text, which performs an operation when a set of conditions has been met without requiring further user input and provides additional control options without cluttering the user interface.

In some embodiments, in response to detecting the input (e.g., 950b and/or 950d) that corresponds to selection of the portion of the text in the representation and in accordance with a determination that the portion of the text in the representation meets the respective set of criteria, the computer system displays, via the display generation component, a respective indication (e.g., 912a1, 912b1, and/or 912c1) that represents the first number and the first unit of measurement. In some embodiments, in accordance with a determination that the first number is within a first range of values for the first unit of measurement (e.g., as indicated by 912a-912c), the respective indication (e.g., 912a1, 912b1, and/or 912c1) is a first indication. In some embodiments, in accordance with a determination that the first number is within a second range of values for the first unit of measurement (e.g., as indicated by 912a-912c), where the second range of values is different from (e.g., not within) the first range of values, the respective indication (e.g., 912a1, 912b1, and/or 912c1) is a second indication that is different from (e.g., visually different from and/or represented by one or more different words, symbols, characters, and/or images) the first indication. In some embodiments, the second indication corresponds to the second range of values and the first indication corresponds to the first range of values. In some embodiments, the computer system does not display the respective indication after the first number with the first unit of measurement has been converted (e.g., as described above and shown in relation to 912b of FIGS. 9E-9F) (e.g., an indication, such as the respective indication, that indicates that zero degrees Celsius is cold would not change even if zero degrees Celsius is converted into Fahrenheit or Kelvin). Displaying the respective indication as a different indication based on whether the first number is within a first range of values for the first unit of measurement or within a second range of values for the first unit of measurement provides the user with visual feedback about how the first number relates to first unit of measurement and/or the type of measurement of the first unit of measure and provides the user with feedback concerning the indication of value even if a user is not familiar with the system of measurement and/or the unit of measurement that accompanies the value, which provides visual feedback to the user, which provides visual feedback to the user.

In some embodiments, the respective set of criteria includes a criterion that is met when a determination is made that a location associated with the computer system is one location within a set of locations (e.g., as described above in relation to FIGS. 9A-9B and/or 9H). Displaying the respective user interface for converting the first measurement into one or more other units of measurement when prescribed conditions are met allows the computer system to automatically display a conversion for a measurement in the representation based on a location, which performs an operation when a set of conditions has been met without requiring further user input.

In some embodiments, the location associated with the computer system is determined via a system setting (e.g., 932) (e.g., a region setting and/or a device region setting) (e.g., a setting that does not change (e.g., without additional user input) based on the location of the computer system (e.g., once the setting is set)). In some embodiments, the setting is manually set by a user of the computer system. Displaying the respective user interface for converting the first measurement into one or more other units of measurement when prescribed conditions are met allows the computer system to automatically display a conversion for a measurement in the representation based on a location determined via a system setting (e.g., a device region setting), which performs an operation when a set.

In some embodiments, the location associated with the computer system is determined via geolocation information (e.g., information that changes based on the location of the computer system and/or based on data detected by one or more GPS sensors in communication with the computer system) (e.g., as described above in relation to FIGS. 9A-9B and/or 9H). Displaying the respective user interface for converting the first measurement into one or more other units of measurement when prescribed conditions are met allows the computer system to automatically display a conversion for a measurement in the representation based on a location determined via geolocation information, which performs an operation when a set of conditions has been met without requiring further user input.

In some embodiments, the set of locations are locations where multiple units of measurements (e.g., multiple types of units of measures) that correspond to the first unit of measurement are used (e.g., as described above in relation to FIGS. 9A-9B and/or 9H).

Displaying the respective user interface for converting the first measurement into one or more other units of measurement when prescribed conditions are met allows the computer system to automatically display a conversion of a measurement in the portion of the text based on a location where multiple types of units of measures that correspond to the first unit of measurement are used, which performs an operation when a set of conditions has been met without requiring further user input.

In some embodiments, the respective set of criteria includes a criterion that is met when the first unit of measurement is not a native unit of measurement (e.g., a unit of measurement that is commonly used and/or is identified (e.g., by the computer system) as being commonly used in the second location) in a second location associated with the computer system (e.g., as described above in relation to FIGS. 9A-9B and/or 9H) (e.g., associated based on (e.g., based on and/or via) current (e.g., detected within the last 1-60 minutes, 1-31 days, and/or 1-8 weeks) geolocation information and/or a current system setting). Displaying the respective user interface for converting the first measurement into one or more other units of measurement when prescribed conditions are met allows the computer system to automatically display a conversion of a measurement in the portion of the text in the representation based on whether the unit of measurement is native to the location associated with the computer system, which performs an operation when a set of conditions has been met without requiring further user input.

Note that details of the processes described above with respect to method 1000 (e.g., FIG. 10) are also applicable in an analogous manner to the methods described below/above. For example, method 1000 optionally includes one or more of the characteristics of the various methods described below with reference to method 1200. For example, method 1000 can be used to convert one or more portions of a media representation while descriptions for one or more symbols in a media representation are provided based on method 1200.

FIGS. 11A-11G illustrate exemplary user interfaces for providing descriptions for one or more symbols in a media representation in accordance with some embodiments. The user interfaces in FIGS. 11A-11G are used to illustrate the processes described below, including the processes in FIG. 12.

Figure 11G:
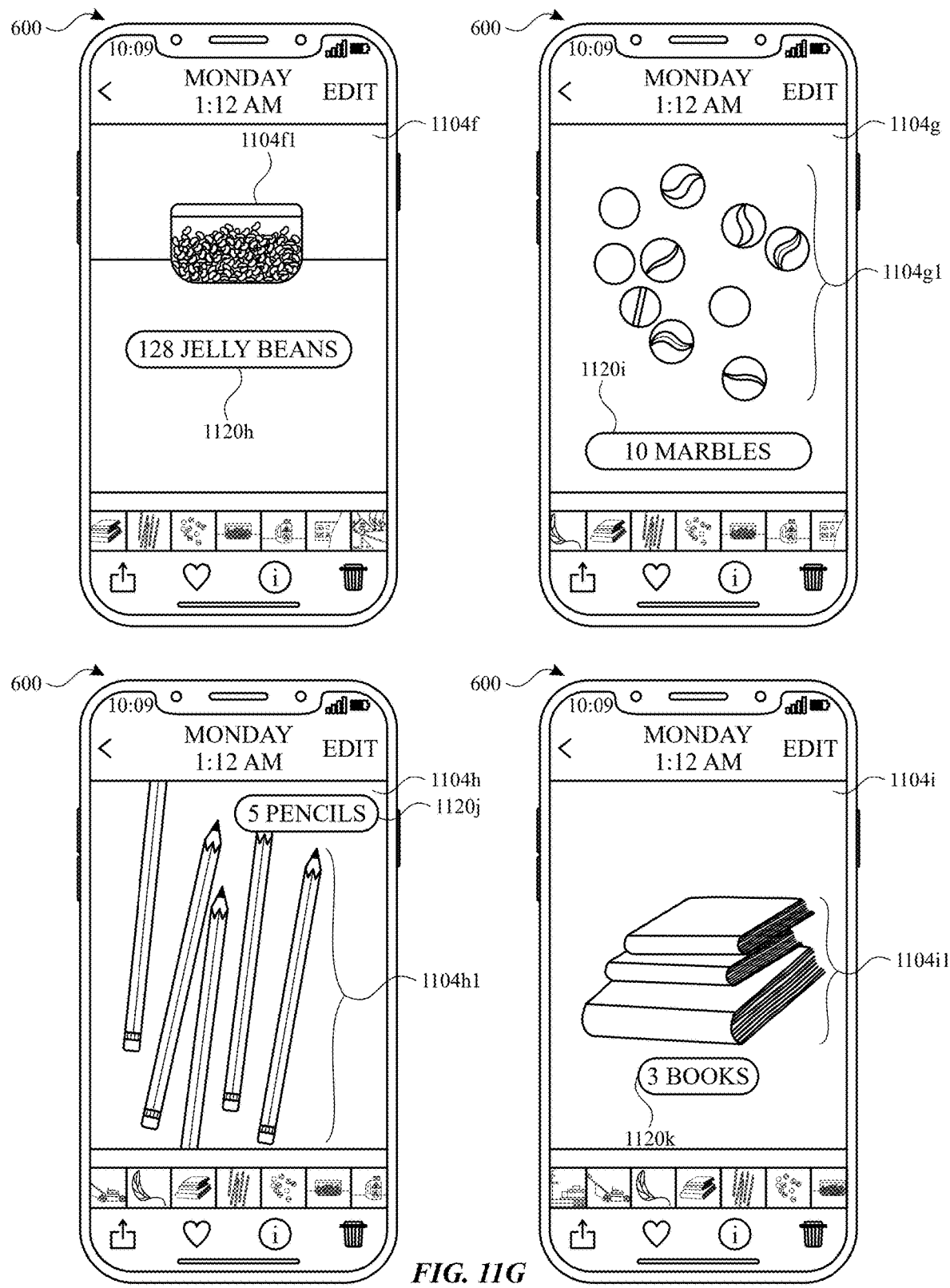

FIG. 11A illustrates computer system 700 displaying a media viewer user interface that includes application control region 1192, media viewer region 1194, and application control region 1196. Media viewer region 1194 includes enlarged representation 1104a, which is representative of the same media item as thumbnail representation 1106a. Media viewer region 1194 is not substantially overlaid with controls, while application control region 1192 and application control region 1196 are substantially overlaid with controls. Enlarged representation 1104a includes a person standing under a sign. Enlarged representation 1104a does not include one or more symbols, such as the symbols (e.g., one or more flags, road signs, laundry symbols, packaging symbols, and/or material hazard symbols) discussed below in reference to FIGS. 11B-11G.

Application control region 1196 includes some of thumbnail representations 1106 (e.g., 1106a-1106c) that are displayed in a single row. Because enlarged representation 1104a is displayed in media viewer region 1194, thumbnail representation 1112a is displayed as being selected. In particular, thumbnail representation 1112a is displayed as being selected in FIG. 11A by being displayed as having space from the other thumbnails (e.g., 1112b and 1112c). In addition, application control region 1196 includes share control 1126a (e.g., that, when selected, causes computer system 600 to initiate a process for transmitting a media item represented by the enlarged representation), favorites control 1126b (e.g., that, when selected, causes computer system 600 to mark/unmark the media item represented by enlarged representation 1104*a* as a favorite media), information control 1126*c* (e.g., that, when selected, causes computer system 600 to display additional information concerning the media item represented by enlarged representation 1104*a*), and trash control 1126*d* (e.g., that, when selected, causes computer system 600 to delete (or initiate a process for deleting) the media item represented by enlarged representation 11*a*). At FIG. 11A, computer system 600 detects rightward swipe input 1150*a* on media viewer region 1194 and/or enlarged representation 1104*a*.

As illustrated in FIG. 11B, in response to detecting rightward swipe input 1150*a*, computer system 600 displays enlarged representation 1104*b* and ceases to display enlarged representation 1104*a*. Enlarged representation 1104*b* includes Nigerian flag 1104*b*1 and U.S. flag 1104*b*2 but does not include flag description 1120*a* and flag description 1120*b*. Instead, computer system 700 displays flag description 1120*a* and flag description 1120*b* by overlaying each description over a respective portion of enlarged representation 1104*b*. As further evidence that enlarged representation 1104*b* does not include flag description 1120*a* and flag description 1120*b*, one can compare enlarged representation 1104*b* to thumbnail media representation 1106*b*, which represent the same media item. As illustrated in FIG. 11B, thumbnail media representation 1106*b* does not include any representations of flag description 1120*a* or flag description 1120*b* and is a smaller version of enlarged representation 1104*b*. At FIG. 11B, computer system 600 displays flag description 1120*a* because a determination is made that Nigerian flag 1104*b*1 has a set of one or more properties that represent the Nigerian Flag. Accordingly, flag description 1120*a* is a description ("FLAG OF THE FEDERAL REPUBLIC OF NIGERIA) that is representative of Nigerian flag 1104*b*1. Likewise, at FIG. 11B, computer system 600 displays flag description 1120*b* because a determination is made that U.S. flag 1104*b*2 has a set of one or more properties that represent the U.S. Flag. Accordingly, flag description 1120*b* is a description ("FLAG OF THE UNITED STATES OF AMERICA") that is representative of U.S. flag 1104*b*2. Notably, computer system 600 overlays flag description 1120*a* over a portion of enlarged representation 1104*b* that is near Nigerian flag 1104*b*1 and overlays flag description 1120*b* over a portion of enlarged representation 1104*b* that is near U.S. flag 1104*b*2. In some embodiments, computer system 600 displays one or more of flag description 1120*a* and flag description 1120*b* in another portion of the user interface of FIG. 11B and/or does not overlay one or more of the flags over a portion of enlarged representation 1104*b*. At FIG. 11B, computer system 600 detects tap input 1150*b* on Nigerian flag 1104*b*1.

As illustrated in FIG. 11C, in response to detecting tap input 1150*b*, computer system 600 displays additional description 1120*c*, which include additional description concerning Nigerian flag 1104*b*1. As illustrated in FIG. 11C, in response to detecting tap input 1150*b*, computer system 600 does not display any additional description that concerns and/or that is near U.S. flag 1104*b*2 because input 1150*b* was not directed to U.S. flag 1104*b*2. Thus, as illustrated in FIGS. 11B-11C, computer system 600 can display additional information concerning a symbol based on an input being directed towards the symbol. At FIG. 11C, computer system 600 continues to display flag descriptions 1120*a*-1120*b* on enlarged representation 1104*b* in response to detecting tap input 1150*b*. In some embodiments, computer system 600 ceases to display one or more of flag descriptions 1120*a*-1120*b* in response to detecting tap input 1150*b*. In some embodiments, in response to detecting tap input 1150*b*, computer system 600 emphasizes Nigerian flag 1104*b*1 relative to U.S. flag 1104*b*2 and/or emphasizes additional description 1120*c* relative to one or more of flag descriptions 1120*a*-1120*b*. At FIG. 11C, computer system 600 detects rightward swipe input 1150*c* on enlarged representation 1104*b*.

As illustrated in FIG. 11D, in response to detecting rightward swipe input 1150*c*, computer system 600 displays enlarged representation 1104*c* and ceases to display enlarged representation 1104*c*. As illustrated in FIG. 11D, enlarged representation 1104*c* includes road sign 1104*c*1 but does not include road-sign description 1120*d* (e.g., as evidenced by thumbnail representation 1160*c* including road sign 1104*c*1 but not including road-sign description 1120*d* for similar reasons as discussed above in relation to enlarged representation 1104*b* and thumbnail representation 1160*b* in FIG. 11B). At FIG. 11D, a determination is made that road sign 1104*c*1 has a set of one or more properties that represent a particular type of road sign (a "Slippery When Wet" road sign). As illustrated in FIG. 11D, because the determination was made that road sign 1104*c*1 has the set of one or more properties that represent the particular type of road sign, computer system 600 displays road-sign description 1120*d* ("Slippery When Wet") over a portion of enlarged representation 1104*c*. At FIG. 11D, computer system detects rightward swipe input 1150*d* on enlarged representation 1104*c*.

As illustrated in FIG. 11E, in response to detecting rightward swipe input 1150*d*, computer system 600 displays enlarged representation 1104*d* and ceases to display enlarged representation 1104*c*. As illustrated in FIG. 11E, enlarged representation 1104*d* includes laundry representations 1104*d*1-1104*d*4 but does not include laundry-symbol description 1120*e* (e.g., as evidenced by thumbnail representation 1160*d* including laundry representations 1104*d*1-1104*d*4 but not including laundry-symbol description 1120*e* for similar reasons as discussed above in relation to enlarged representation 1104*b* and thumbnail representation 1160*b* in FIG. 11B). As illustrated in FIG. 11E, a determination is made that laundry representations 1104*d*1-1104*d*4 have set of one or more properties that represent different types of laundry symbols. As illustrated in FIG. 11E, because the determination is made that laundry representations 1104*d*1-1104*d*4 have set of one or more properties that represent different types of laundry symbol, computer system 600 displays laundry-symbol description 1120*e* ("Do not wash or beach this item. This item may be ironed at low temperature or be professionally dry cleaned). Notably, at FIG. 11E, computer system 600 provides a single description for multiple laundry symbols (e.g., laundry representations 1104*d*1-1104*d*4). Here, computer system 600 provides a single description because computer system 600 has determined that the laundry symbols should be interpreted as a group (e.g., instead of independently and/or separately as the flag were interpreted in FIGS. 11B-11C). In some embodiments, computer system 600 provide a single description for multiple symbols, such as multiple laundry symbols, packaging symbol, and/or material hazard symbols. In some embodiments, computer system 600 interprets the multiple symbols individually to provide the single description. In some embodiments, computer system 600 interprets the multiple symbols as a group to provide the single description. In some embodiments, computer system 600 displays a description for symbols that have been interpreted as a ground concurrently with a description for a symbol that has been interpreted individually. In some embodiments, in response to detecting an input directed to laundry symbol 1104*d*1, computer system 600 displays a description that corresponds to laundry symbol 1104*d*1. In some embodiments, in response to detecting an input directed to laundry symbol 1104*d*2, computer system 600 displays a description that corresponds to laundry symbol 1104*d*2 that is different from the description that corresponds to laundry symbol 1104*d*1. At FIG. 11E, computer system 600 detects rightward swipe input 1150*e* on enlarged representation 1104*d*.

As illustrated in FIG. 11F, in response to detecting rightward swipe input 1150*e*, computer system 600 displays enlarged representation 1104*e* and ceases to display enlarged representation 1104*d*. Enlarged representation 1104*e* includes a product that includes material hazard symbol 1104*e*1 and packaging symbol 1104*e*2 but does not include material-hazard-symbol 1120*f* and packaging symbol 1120*g* (e.g., as evidenced by thumbnail representation 1160*e* including material hazard symbol 1104*e*1 and packaging symbol 1104*e*2 but not including material-hazard-symbol description 1120*f* and packaging symbol description 1120*g* for similar reasons as discussed above in relation to enlarged representation 1104*b* and thumbnail representation 1160*b* in FIG. 11B). At FIG. 11F, a determination is made that material hazard symbol 1104*e*1 has a set of one or more properties that represent a particular type of material hazard symbol. In addition, a determination is made that packaging symbol 1104*e*2 has a set of one or more properties that represent a particular type of packaging symbol. At FIG. 11F, because a determination is made that material hazard symbol 1104*e*1 has a set of one or more properties that represent the particular type of material hazard symbol (e.g., a "Poison" symbol), computer system 600 displays material-hazard-symbol description 1120*f* ("Poison") over a portion of enlarged representation 1104*e*. At FIG. 11F, because determination is made that packaging symbol 1104*e*2 has a set of one or more properties that represent a particular type of packaging symbol (e.g., a "Do Not Recycle" symbol), computer system 600 displays packaging symbol description 1120*g* ("Do not Recycle") over a portion of enlarged representation 1104*e*.

FIG. 11G illustrates exemplary scenario where computer system 600 detects one or more objects (e.g., one or more types of objects) and an amount of the one or objects in a media representation and overlays a representation of the objects and the amount of objects over the media representation. As illustrated in FIG. 11G, computer system 600 displays enlarged representation 1104*f* that includes jelly beans in bowl 1104*f*1. At FIG. 11G, while displaying enlarged representation 1104*f*, a determination is made that 128 jelly beans are depicted in enlarged representation 1104*f*. As illustrated in FIG. 11G, because the determination that 128 jelly beans are depicted in enlarged representation 1104*f*, computer system 600 displays description 1120*h* ("128 Jelly Beans"). As illustrated in FIG. 11G, computer system 600 displays enlarged representation 1104*g* that includes marbles 1104*g*1. At FIG. 11G, while displaying enlarged representation 1104*g*, a determination is made that 10 marbles are depicted in enlarged representation 1104*g*. As illustrated in FIG. 11G, because the determination is made that 10 marbles are depicted in enlarged representation 1104*g*, computer system 600 displays description 1120*i* ("10 Marbles"). As illustrated in FIG. 11G, computer system 600 displays enlarged representation 1104*h* that includes pencils 1104*h*1. At FIG. 11G, while displaying enlarged representation 1104*h*, a determination is made that 5 pencils are depicted in enlarged representation 1104*h*. As illustrated in FIG. 11G, because the determination is made that 5 pencils are depicted in enlarged representation 1104*h*, computer system 600 displays description 1120*j* ("5 Pencils"). As illustrated in FIG. 11G, computer system 600 displays enlarged representation 1104*i* that includes books 1104*i*1. At FIG. 11G, while displaying enlarged representation 1104*i*, a determination is made that 3 books are depicted in enlarged representation 1104*i*. As illustrated in FIG. 11G, because the determination is made that 3 books are depicted in enlarged representation 1104*i*, computer system 600 displays description 1120*k* ("3 Books").

FIG. 12 is a flow diagram illustrating methods of providing descriptions for one or more symbols in a media representation in accordance with some embodiments. Method 1200 is performed at a computer system (e.g., 100, 300, 500, and/or 600) (e.g., a smartphone, a desktop computer, a laptop, a tablet) that is in communication with a display generation component (e.g., a display controller, a touch-sensitive display system). In some embodiments, the computer system is in communication with one or more input devices (e.g., a touch-sensitive surface). Some operations in method 1200 are, optionally, combined, the orders of some operations are, optionally, changed, and some operations are, optionally, omitted.

As described below, method 1200 provides an intuitive way for providing descriptions for one or more symbols in a media representation. The method reduces the cognitive burden on a user for providing descriptions for one or more symbols in a media representation, thereby creating a more efficient human-machine interface. For battery-operated computing devices, enabling a user to provide descriptions for one or more symbols in a media representation faster and more efficiently conserves power and increases the time between battery charges.

Method 1200 is performed at a computer system (e.g., 600) (e.g., a smartphone, a desktop computer, a laptop, a tablet) that is in communication with a display generation component (e.g., a display controller, a touch-sensitive display system). In some embodiments, the computer system is in communication with one or more input devices (e.g., a touch-sensitive surface).

The computer system detects (1202) (e.g., receiving) a request (e.g., 1150*a*, 1150*c*, 1150*d*, 1150*e*, 1150*f*) to display a representation of a media item.

In response to detecting the request (e.g., 1150*a*, 1150*c*, 1150*d*, 1150*e*, 1150*f*) to display the representation of the media item, the computer system displays (1204), via the display generation component, a respective user interface that includes a representation (e.g., 1104*b*-1104*e*) of a media item, where displaying the respective user interface includes: in accordance with a determination that the representation of the media item includes one or more symbols, displaying (1206), via the display generation component, a representation (e.g., 1120*a*-1120*g*) of an interpretation (e.g., text) (e.g., textual representation and/or textual information associated with the symbol and/or textual information that is an interpretation of the symbol) of at least a first symbol (e.g., a flag, laundry symbol, packaging symbol, material hazard symbol, road sign symbol, and/or another non-language and/or text symbol) (e.g., a graphical image that is not composed of only text) (e.g., a symbol that does not include words and/or phrases) of the one or more symbols concurrently with the representation (e.g., 1104*b*-1104*e*) of the media, where the representation of the interpretation of the one or more symbols in the media item is separate (e.g., not a part of the visual content of the media item) from the media item (e.g., the representation of the interpretation of the one or more symbols is automatically generated by the device and/or is not a part of the media item). In some embodiments, the representation of the interpretation of the one or more symbols in the media item is not a part of the representation of the media (e.g., before the request to display the representation of the media item was received). In some embodiments, in accordance with a determination that the representation of the media item does not include the one or more symbols, display the representation of the media item without displaying the representation of the interpenetration of at least the first symbol. Automatically displaying a representation of an interpretation of at least a first symbol of one or more symbols when prescribed conditions are met allows the computer system to automatically display an interpretation of one or more symbols in a representation of media without requiring additional user input, which performs an operation when a set of conditions has been met without requiring further user input.

In some embodiments, the interpretation of the one or more symbols is an interpretation of one symbol of the one or more symbols (e.g., 1120*a*, 1120*b*, 1120*d*, 1120*f*, and/or 1120*g*). In some embodiments, each of the one or more symbols are interpreted separately. In some embodiments, in accordance with a determination that the one symbol is a first type of symbol (e.g., a symbol that can and/or should be interpreted independently (e.g., a flag and/or a road sign)), the computer system displays an interpretation of the one symbol. In some embodiments, in accordance with a determination that the one symbol is a second type of symbol (e.g., a symbol that cannot and/or should not be interpreted independently (e.g., a laundry, a packaging, and/or a material hazard symbol), the computer system does not display an interpretation of the one symbol and/or displays a collective interpretation of the one symbol and another symbol. Automatically displaying a representation of an interpretation of one symbol when prescribed conditions are met allows the computer system to automatically display an interpretation of one of the one or more symbols in a representation of media, which performs an operation when a set of conditions has been met without requiring further user input.

In some embodiments, the interpretation of the one or more symbols is a collective interpretation of a plurality of one or more symbols (e.g., 1120*e*). In some embodiments, the one or more symbols are interpreted collectively. Automatically displaying a representation of an interpretation of one symbol when prescribed conditions are met allows the computer system to automatically display a collective interpretation of multiple symbols in a representation of media, which performs an operation when a set of conditions has been met without requiring further user input.

In some embodiments, while displaying the representation (e.g., 1104*b*-1104*e*) of media that includes the one or more symbols, the computer system detects an input (e.g., 1150*b*) that is directed to a first symbol (e.g., 1104*b*1-1104*b*2) of the one or more symbols. In some embodiments, in response to detecting the input that is directed to the first symbol of the one or more symbols, the computer system displays, via the display generation component, information (e.g., 1120*c*) associated with (e.g., that corresponds to and/or about) the first symbol. In some embodiments, in response to detecting an input that is directed to a symbol of the one or more symbols that is different from the first symbol, the computer system displays information associated with the respective symbol. In some embodiments, the computer system displays information associated with the respective symbol without displaying the information associated with the first symbol. In some embodiments, the information associated with the respective symbol is different from the information associated with the first symbol. Displaying information associated with the first symbol in response to detecting the input that is directed to the first symbol of the one or more symbols provides the user with additional control to obtain information associated with one or more symbols, which provides additional control options without cluttering the user interface.

In some embodiments, the one or more symbols include one or more flags (e.g., 1104*b*1-1104*b*2) (e.g., flag for a country, state, and/or region, and/or flag for a team (e.g., a sports team and/or another team). In some embodiments, the representation (e.g., 1120*a*-1120*b*) of the interpretation of at least the first symbol includes (and/or is) an interpretation of the one or more flags. Automatically displaying a representation of an interpretation of at least a first symbol of one or more symbols that include one or more flags when prescribed conditions are met allows the computer system to automatically display an interpretation of one or more flags without requiring additional user input, which performs an operation when a set of conditions has been met without requiring further user input and provides visual feedback.

In some embodiments, the one or more symbols include one or more laundry symbols (e.g., 1104*d*1-1104*d*4) (e.g., one or more washing, bleaching, ironing, dry cleaning, drying, machine wash normal, machine wash cold, machine wash warm, machine wash hot, hang to dry, dry in shade, do not iron, and/or do not bleach symbols). In some embodiments, the representation (e.g., 1120*e*) of the interpretation of at least the first symbol includes (and/or is) an interpretation of the one or more laundry symbols. Automatically displaying a representation of an interpretation of at least a first symbol of one or more symbols that include one or more laundry symbols when prescribed conditions are met allows the computer system to automatically display an interpretation of one or more laundry symbols without requiring additional user input, which performs an operation when a set of conditions has been met without requiring further user input and provides visual feedback.

In some embodiments, the one or more symbols include one or more packaging symbols (e.g., 1104*e*2) (e.g., one or more fragile, keep dry, compostable, recyclable, handle with care, this way up, do not open with knife, do not place near magnets, lift with two people, do not drop, stacking height/weight, do no stack, food safe, caution, and/or kitemark symbols). In some embodiments, the representation (e.g., 1120*g*) of the interpretation of at least the first symbol includes (and/or is) an interpretation of the one or more packaging symbols. Automatically displaying a representation of an interpretation of at least a first symbol of one or more symbols that includes one or more packaging symbols when prescribed conditions are met allows the computer system to automatically display an interpretation of the one or more packaging symbols without requiring additional user input, which performs an operation when a set of conditions has been met without requiring further user input and provides visual feedback.

In some embodiments, the one or more symbols include one or more material hazard symbols (e.g., 1104*e*1) (e.g., one or more explosive (e.g., symbol: exploding bomb), flammable (e.g., symbol: flame), oxidizing (e.g., symbol: flame over circle), corrosive (e.g., symbol: corrosion), acute toxicity (e.g., symbol: skull and crossbones), and/or hazardous to the environment (e.g., symbol: environment) symbols). In some embodiments, the representation (e.g., 1120*f*) of the interpretation of at least the first symbol includes (and/or is) an interpretation of the one or more material hazard symbols. Automatically displaying a representation of an interpretation of at least a first symbol of one or more symbols that include one or more material hazard symbols when prescribed conditions are met allows the computer system to automatically display an interpretation of the one or more material hazard symbols without requiring additional user input, which performs an operation when a set of conditions has been met without requiring further user input and provides visual feedback.

In some embodiments, the one or more symbols include one or more road signs (e.g., 1104c1) (e.g., one or more traffic signs, red and white regulatory signs, warning signs, highway construction and maintenance signs, service signs, and/or guide signs). In some embodiments, the representation (e.g., 1120d) of the interpretation of at least the first symbol includes (and/or is) an interpretation of the one or more road signs. Automatically displaying a representation of an interpretation of at least a first symbol of one or more symbols that include one or more road signs when prescribed conditions are met allows the computer system to automatically display an interpretation of the one or more road signs without requiring additional user input, which performs an operation when a set of conditions has been met without requiring further user input and provides visual feedback.

In some embodiments, the computer system identifies one or more objects in a representation of media. In some embodiments, the computer system displays an indication that includes the number of the particular type of object that is in the media representation based on detecting the number of the particular types of objects (e.g., as described above in relation to FIG. 11G). In some embodiments, the computer system displays an indication and/or description (e.g., a description that includes the type of object (e.g., a piece of furniture and/or a type of shoe) that has been identified) of an identified object of the one or more objects. In some embodiments, the computer system displays one or more instructions (e.g., one or more instructions that corresponds to how to use and/or how to take care of (e.g., how to take care of plants (e.g., water frequently and/or needs partial sun), food (e.g., how to take care of a mango and eat it), and/or pets) the object and/or a product) for an identified object of the one or more objects. In some embodiments, the computer system displays an indication and/or a description of a subject (e.g., a celebrity) in the representation of media (e.g., where the representation of media is a frame of a video and/or movie). In some embodiments, computer system displays an indication and/or description that is an extended version of the identified object (e.g., a piece of art, book, and/or magazine that is related to an object). In some embodiments, the indication and/or description is interactive and selection of the indication and/or description displays an interactive user interface object that corresponds to an identified object (e.g., where selection of the user interface object, causes the computer system to play augmented-reality version of the identified object; an animation of the identified object and/or that corresponds to the identified object).

Note that details of the processes described above with respect to method 1200 (e.g., FIG. 12) are also applicable in an analogous manner to the methods described above/below. For example, method 1200 optionally includes one or more of the characteristics of the various methods described above with reference to method 1000. For example, method 1000 can be used to convert one or more portions of a media representation while descriptions for one or more symbols in a media representation are provided based on method 1200. For brevity, these details are not repeated below.

FIGS. 13A-13T illustrate exemplary user interfaces for providing one or more animations for detected objects in a media representation in accordance with some embodiments. In particular, FIGS. 13A-13T illustrates exemplary user interfaces, where computer system 600 displays an animation for a detected object in response to detecting an input that is directed to (e.g., on, pointing to, attention on, and/or at a location corresponds to) the detected object. In some embodiments, the animation is displayed before one or more controls to copy an object and/or subject are displayed (e.g., without copying the background portion) (e.g., as described above in relation to FIGS. 6A-6M). In some embodiments, the animation is displayed before one or more controls to remove a background portion of a media item are displayed (e.g., as described above in relation to FIGS. 6A-6M). The user interfaces in FIGS. 13A-13T are used to illustrate the processes described below, including the processes in FIG. 14.

FIG. 13A illustrates computer system 600 displaying a media viewer user interface that includes application control region 1192, media viewer region 1194, and application control region 1196. Media viewer region 1194 includes enlarged representation 1304a, which is representative of the same media item as thumbnail representation 1306a. Application control region 1196 includes some of thumbnail representations 1106 (e.g., 1306a-1306e) that are displayed in a single row. Because enlarged representation 1304a is displayed in media viewer region 1194, thumbnail representation 1306a is displayed as being selected (e.g., which is selected in FIG. 13A for similar reasons as discussed above in relation to thumbnail representation 1106a being selected in FIG. 11A). Application control region 1192, media viewer region 1194, and application control region 1196 include similar controls and/or are displayed using similar techniques as discussed above in relation to FIGS. 11A-11G.

As illustrated in FIG. 13A, enlarged representation 1304a is a previously captured photo that includes buoy 1310 that is hanging on a wall and cup 1320 that is positioned on a counter. At FIG. 13A, computer system 600 detects tap input 1350a on cup 1320. At FIG. 13B, in response to detecting tap input 1350a, computer system 600 generates haptic (and/or audio) feedback and begins displaying an animation that is overlaid on cup 1320 and/or that changes the appearance one or more portions of cup 1320. As illustrated in FIGS. 13B-13I, the animation that computer system 600 begins displaying at FIG. 13B includes interior-animation portion 1340a and edge-animation portion 1340b (e.g., where edge-animation portion 1340b is described in further detail in FIGS. 13F-13I). FIGS. 13B-13E illustrate an exemplary embodiment concerning how computer system 600 can display interior-animation portion 1340a in relation to cup 1320, and FIGS. 13F-13I illustrate an exemplary embodiment concerning how computer system 600 can display edge-animation portion 1340b in relation to cup 1320. Notably, at FIGS. 13B-13I, computer system 600 does not display an animation that changes the display of buoy 1310 because computer system 600 did not detect a tap input on buoy 1310. In some embodiments, in response to computer system 600 detecting an input on a background portion of a displayed media item, computer system 600 does not display an animation (e.g., like the one described in relation to FIGS. 13A-13Q) that changes an appearance of the background portion (e.g., such as the wall where buoy 1310 is hanging in enlarged representation 1304a). In some embodiments, computer system 600 does not display an animation (e.g., like the one described in relation to FIGS. 13A-13Q) that changes an appearance of a respective object (e.g., in response to computer system 600 detecting an input on the respective object) that computer system 600 has not detected. In some embodiments, computer system 600 does not display the animation when a determination is made that one or more controls (e.g., copy subjects/objects controls and/or remove background controls) will not be displayed (e.g., are not available) for performing an operation based on the respective object.

At FIG. 13B, interior-animation portion 1340*a* temporarily changes the appearance of the interior region of cup 1320 (e.g., the interior region of the surface of cup 1320) at the location at which tap input 1320 was detected in FIG. 13A. Thus, as illustrated in FIG. 13B, computer system 600 initially displays interior-animation portion 1340*a* at an interior surface location of cup 1320 that is to the right of and down from a center location of cup 1320 because tap input 1350*a* was detected at the location that is to the right of and down from the center location of cup 1320. In some embodiments, in response to detecting a tap input at another location of cup 1320 (e.g., the center location of cup 1320), computer system 600 initially displays interior-animation portion 1340*a* at the other location of cup 1320 (e.g., a different location than the location of interior-animation portion 1340*a* in FIG. 13B).

As described above, FIGS. 13B-13E illustrate an exemplary embodiment concerning how computer system 600 can display interior-animation portion 1340*a* in relation to cup 1320. While FIG. 13B illustrates how computer system 600 initially displays interior-animation portion 1340*a*, FIGS. 13C-13E illustrate how the display of interior-animation portion 1340*a* progressively changes with time. As illustrated in FIGS. 13C-13E, interior-animation portion 1340*a* progressively expands outward (e.g., towards the top-edge 1320*a*, bottom edge 1320*b*, and the sides of cup 1320). As illustrated in FIG. 13B-13E, computer system 600 moves an upper portion of interior-animation portion 1340*a* towards top-edge 1320*a* of cup 1320 while expanding (and/or enlarging) interior-animation portion 1340*a* towards the sides of cup 1320, and computer system 600 moves a bottom portion of interior-animation portion 1340*a* towards bottom-edge 1320*b* of cup 1320 while expanding interior-animation portion 1340*a* towards the sides of cup 1320. In some embodiments, computer system 600 displays a subset of the upper portion that is closer to top-edge 1320*a* as being brighter than a subset of the upper portion that is further from top-edge 1320*a*.

At FIGS. 13B-13E, the speed, duration, and/or shape of the interior-animation portion 1340*a* is based on the size of cup 1320. Moreover, the speed, duration, and/or shape of interior animation portion 1340*a* is also based on the location at which interior-animation portion 1340*a* (and/or based on where tap input 1350*a* was detected on cup 1320) was initially displayed. In some embodiments, the speed, duration, and/or shape of interior animation portion 1340*a* would change if computer system 600 detected tap input 1350*a* of FIG. 13A at a location that is closer to top-edge 1320*a* (e.g., than the location at which computer system 600 detected tap input 1340*a*) because the top portion of interior-animation portion 1340*a* would not have to move as far from the top portion of interior-animation portion 1340*a* to reach top-edge 1320*a*. In some embodiments, computer system 600 displays interior-animation portion 1340*a* as a translucent overlay (e.g., a portion of cup 1320 corresponding to a location of the translucent overlay is displayed concurrently with (e.g., visible) the translucent overlay; the translucent overlay is at a particular opacity) that moves and expands over the interior region of cup 1320. In some embodiments, interior-animation portion 1340*a* becomes more translucent (e.g., the opacity increases) as animation portion 1340*a* moves and expands over the interior region of cup 1320. Thus, in some embodiments, interior-animation portion 1340*a* of FIG. 13D is more translucent than interior-animation portion 1340*a* of FIG. 13C. In some embodiments, computer system 600 changes the translucence of interior-animation portion 1340*a* when interior-animation portion 1340*a* has reached an edge of cup 1320 (e.g., top-edge 1320*a* or bottom-edge 1320*b*) (e.g., which is illustrated in FIGS. 13D-13E by interior-animation portion 1340*a* including more lines in FIG. 13D than in FIG. 13E, where more lines denotes less translucence). In some embodiments, as a part of the changing the translucence of interior-animation portion 1340*a* when interior-animation portion 1340*a* has reach an edge of cup 1320, computer system 600 only changes the translucence of one or more portions of interior-animation portion 1340*a* that has reached the edge of cup 1320 without changing the translucence of other portions of interior-animation portion 1340*a* that have not reached the edge of cup 1320. In some embodiments, computer system 600 displays interior-animation portion 1340*a* in such a manner, where a flash of light appears to be radiating through the interior region of cup 1320.

After displaying interior-animation portion 1340*a* in FIGS. 13B-13E, computer system 600 displays edge-animation portion 1340*b* of the animation (e.g., animation displayed in response to detecting tap input 1350*a*) in FIGS. 13F-13I. FIG. 13F illustrates the beginning of edge-animation portion 1340*b*, where edge-animation portion 1340*b* is displayed along the right side of cup 1320. As illustrated in FIG. 13F, computer system 600 displays controls options 1326 that includes copy control 626*a* and copy-subjects control 626*b*, which operate as described above in relation to copy control 626*a* and copy-subjects control 626*b* (and copy-subjects control 628*a*) of FIGS. 6A-6M. In some embodiments, computer system 600 displays control options 1326 while or before computer system 600 displays one or more portions of interior-animation portion 1340*a* of FIGS. 13B-13F. In some embodiments, computer system 600 displays control options 1326 after computer system 600 has displayed one or more portions of edge-animation portion 1340*b* of FIGS. 13F-13I.

As illustrated in FIGS. 13F-13I, edge-animation portion 1340*b* travels around the perimeter (and/or edge) of cup 1320 in a clockwise direction. In some embodiments, edge-animation portion 1340*b* travels around the perimeter of cup 1320 in a counterclockwise direction. In some embodiments, the speed, shape, and/or duration of edge-animation portion 1340*b* is based on the shape of cup 1320 (e.g., for similar reasons as discussed above in relation to the display of interior-animation portion 1340*a*). In some embodiments, computer system 600 displays a translucent overlay over the perimeter of cup 1320 to display edge-animation portion 1340*b*. In some embodiments, the translucent overlay has different levels of translucence to indicate that a light is moving around the perimeter of cup 1320. In some embodiments, a subset (e.g., left edge of edge animation portion 1340*b* of FIG. 13G) of edge-animation portion 1340*b* that is closer to a location in which edge-animation 1340*b* is moving than a different subset of -animation portion 1340*b* (e.g., right edge of edge animation portion 1340*b* of FIG. 13G) has a lower level of translucence than the different subset of animation portion 1340*b*. In some embodiments, displaying the translucent overlay with different levels of translucence allows computer system 600 to mimic an effect that is similar to light dissipating at the tail of a comet (e.g., a gas tail and/or a dust tail effect). At FIG. 13I, computer system 600 detects tap input 1350*i*1 on copy control 626*a*, tap input 1350*i*2 on copy-subjects control 626*b*, or tap input 1350*i*3 on buoy 1310. In some embodiments, in response to detecting tap input 1350*i*1 on copy control 626*a*, computer system 600 copies media representation 1304*a* (e.g., the background and the objects/subjects in the media representation), using one or more techniques discussed above in relation to FIGS. 6B and 6D. In some embodiments, in response to detecting tap input 1350*i*2 on copy-subjects control 626*b*, computer system 600 copies cup 1320 without copying other portions of media representation 1304*a* (e.g., the wall), using one or more techniques as discussed above in relation to detecting tap input 650*e*1. In some embodiments, in response to detecting tap inputs 1350*i*1-1350*i*3, computer system 600 ceases display of the animation that was displayed in response to detecting tap input 1350*a* in FIG. 13A (e.g., the animation described above in relation to FIGS. 13B-13I). In some embodiments, computer system 600 ceases display of the animation (e.g., interior-animation portion 1340*a* and/or edge-animation portion 1340*b*) in response to detecting tap inputs 1350*i*1-1350*i*3 because an input that is subsequent to tap input 1350*a* was detected. In some embodiments, computer system 600 continues to display the animation if no input was detected at FIG. 13I. In some embodiments, as a part of continuing to display the animation, computer system 600 re-displays interior-animation portion 1340*a* of FIGS. 13B-13E after displaying edge-animation portion 1340*b* of FIGS. 13F-13I. In some embodiments, as a part of continuing to display the animation, computer system 600 only re-displays edge-animation portion 1340*b* and/or re-displays edge-animation portion 1340*b* one or more times before re-displaying interior-animation portion 1340*a*, or vice-versa.

At FIG. 13J, in response to detecting tap input 1350*i*3 on buoy 1310, computer system 600 generates haptic (and/or audio) feedback and begins displaying an animation that changes the appearance of buoy 1310 (e.g., without displaying an animation that changes the appearance of cup 1320 because tap input 1350*i*3 was not detected on cup 1320). Notably, the animation that changes the appearance of buoy 1310 includes an interior and edge animation portion like the animation that changed the appearance of cup 1320 described above in relation FIGS. 13B-13I. FIGS. 13J-13P illustrate the animation that changes the appearance of buoy 1310, where FIGS. 13J-13N illustrate an exemplary embodiment concerning how computer system 600 can display interior-animation portion 1340*a* in relation to buoy 1310, and FIGS. 13O-13P illustrate an exemplary embodiment concerning how computer system 600 can display edge-animation portion 1340*b* in relation to buoy 1310.

As illustrated in FIGS. 13J-13N, computer system 600 displays interior-animation portion 1340*a* in relation to buoy 1310 ("buoy-interior-animation portion") using similar techniques as those discussed above in relation to displaying interior-animation portion 1340*a* in relation to cup 1320 ("cup-interior-animation portion"). However, the movement and expansion of buoy-interior-animation portion is different from cup-interior-animation portion because the shape buoy 1310 is different from the shape of cup 1320. In addition, the speed of the movement and expansion of buoy-interior-animation is faster than the speed of the movement and expansion of cup-interior-animation portion because buoy 1310 is larger than cup 1320. In some embodiments, the increase in speed between buoy-interior-animation portion and cup-interior-animation portion is non-linear relative to the difference in the size of buoy 1310 and the size of cup 1320. In some embodiments, the duration of buoy-interior-animation is longer than the duration of cup-interior-animation portion because buoy 1310 is larger than cup 1320. In some embodiments, the increase in the duration between buoy-interior-animation portion and duration of cup-interior-animation portion is non-linear relative to the difference in the size of buoy 1310 and the size of cup 1320.

Notably, at FIGS. 13J-13N, computer system 600 expands interior-animation portion 1340*a* such that interior-animation portion 1340*a* only changes the appearance of buoy 1310 without changing the appearance of other portions of enlarged media representation 1104*a* (e.g., the wall). As illustrated in FIGS. 13J-13M, computer system 600 displays interior-animation portion 1340*a* between outside edge (or boundary) 1310*a* and inside edge (or boundary) 1310*b* of buoy 1310. As illustrated in FIGS. 13J-13M, computer system 600 does not display interior-animation portion 1340*a* in the negative space within inside edge 1310*b* of buoy 1310 because the negative space is not a part of buoy 1310. At FIG. 13N, computer system 600 displays interior-animation portion 1340*a* with a different level of translucence because interior-animation portion 1340*a* has reached outside edge 1310*a* (e.g., for similar reasons and using one or more similar techniques as discussed above in relation to FIG. 13E). FIGS. 13O-13P illustrate an exemplary embodiment concerning how computer system 600 can display edge-animation portion 1340*b* in relation to buoy 1310. At FIGS. 13O-13P, computer system 600 displays edge-animation portion 1340*b* traveling around the perimeter and/or outside edge 1310*a* of buoy 1310 using one or more similar techniques as discussed above in relation to FIGS. 13F-13I (e.g., including displaying controls options 1326 that includes copy control 626*a* and copy-subjects control 626*b* to provide options to perform with respective operations based on buoy 1310 instead of cup 1320). At FIG. 13P, computer system 600 detects tap input 1350*p* on a background portion of media representation 1104*a*. As illustrated in FIG. 13O, in response to detecting tap input 1350*p*, computer system 600 ceases to display the animation with respect to buoy 1310 and does not display any other animation (e.g., for similar reasons as discussed above in relation to not displaying an animation when a subsequent input is detected at FIG. 13I).

FIGS. 13R-13T illustrate an exemplary embodiment concerning how computer system 690 can display an edge-animation portion for a detected object without displaying an interior-animation portion for the detected object. As illustrated in FIG. 13R, computer system 690 displays enlarged media representation 1304*a*, which includes buoy 1310 and cup 1320. As illustrated in FIG. 13R, computer system 690 is displaying menu 656, where menu 656 is being displayed because an input (e.g., a right click input) has been detected on buoy 1310. At FIG. 13R, computer system 690 detects movement of cursor 680. As illustrated in FIG. 13S, in response to detecting movement of cursor 680, computer system 690 displays cursor 680 as being hovered over copy-subjects control 656*a*. At FIG. 13S, computer system 690 detects that a hover input has been performed because cursor 680 has been hovered over copy-subjects control 656*a* for longer than a predetermined period of time (e.g., 0.2-3 seconds). At FIG. 13T, in response to detecting that the hover input has been performed, computer system 690 displays an animation that includes edge-animation portion 1340*b* (e.g., that travels around the perimeter of buoy 1310, using one or more similar techniques as described above in relation to FIGS. 13O-13P) without including an interior animation portion (e.g., such as interior-animation portion 1340*a* of FIGS. 13J-13N). At FIG. 13T, in response to detecting the hover input has been performed, computer system 690 also does not generate a haptic (and/or audio) output. Looking back at tap input 1350*a* of FIG. 13A (and input 1350*i*3 of FIG. 13I), computer system 600 generated a haptic output in response to detecting tap input 1350*a* because a determination was made that tap input 1350*a* was a directed input, whereas computer system 690 does not generate a haptic output at FIG. 13T because a determination is made that the hover input was not a direct input (or was an indirect input). Likewise, computer system 600 displays an animation that includes interior-animation portion 1340*a* and edge-animation portion 1340*b* because input 1350*a* of FIG. 13A (and input 1350*i*3 of FIG. 13I) was determined to be a directed input, and computer system 690 displays an animation that includes edge-animation portion 1340*b* and does not include interior-animation portion 1340*a* because a determination is made that the hover input was not a direct input. Thus, in some embodiments, a computer system can display animations differently and/or forgo displaying different portions of the animation for a detected object based on the type of input that was detected (e.g., direct input vs. indirect input). In some embodiments, a direct input is a touch input on a touch-sensitive display (e.g., on a detected object) and/or an input that is not detected with a separate input device such as a trackpad, mouse, keyboard, or a camera). In some embodiments, edge-animation portion 1340*b* is displayed when cursor 1380 is hovering over a menu control that is different from copy subject control 656*a* (e.g., such as a remove background control, a copy control, and/or an emphasize subjects control). In some embodiments, edge-animation portion 1340*b* is not displayed when cursor 1380 is hovering over one or more other menu item controls (e.g., such as an open control and/or a move-to-trash control). In some embodiments, a computer system can display animations differently and/or forgo displaying different portions of the animation for a detected object based on the type of computer system that detected the input (e.g., smartwatch vs. personal computer, phone vs. laptop, laptop vs. tablet, and/or tablet vs. phone) While FIGS. 13R-13S are described above as an exemplary embodiment concerning how computer system 600 can display an edge-animation portion for a detected object without displaying an interior-animation portion for the detected object, it should be understood that an embodiment concerning computer system 600 displaying an interior-animation portion for a detected object without displaying an edge-animation portion for a detected object can also be anticipated in view of the discussion above.

FIG. 14 is a flow diagram illustrating methods of providing one or more animations for detected objects in a media representation in accordance with some embodiments. Method 1400 is performed at a computer system (e.g., 600) (e.g., a smartphone, a desktop computer, a laptop, a tablet, or a head mounted device (e.g., a head mounted augmented reality and/or extended reality device)) that is in communication with a display generation component (e.g., a display controller, a touch-sensitive display system, and/or a head mounted display system): In some embodiments, the computer system is in communication with one or more input devices and/or output devices (e.g., one or more touch-sensitive surfaces, cameras, gyroscopes, and/or accelerometers). Some operations in method 1400 are, optionally, combined, the orders of some operations are, optionally, changed, and some operations are, optionally, omitted.

As described below, method 1400 provides an intuitive way for providing one or more animations for detected objects in a media representation. The method reduces the cognitive burden on a user for identifying detected objects in a media representation, thereby creating a more efficient human-machine interface. For battery-operated computing devices, enabling a user to identify a detected object faster and more efficiently conserves power and increases the time between battery charges.

While displaying, via the display generation component, a representation (e.g., 1304*a*) (e.g., a visual representation) (e.g., a representation of previously captured and/or concurrently saved media item or a representation a current of the field-of-view of one or more cameras) of visual content (e.g., visual content of a media item (e.g., a photo, a video, and/or an animated series of images) that includes a first portion (e.g., a foreground portion and/or a portion with one or more subjects) and a second portion (e.g., a background portion, one or portions of the media that surround the subject and/or the body of the subject, one or more portions of the representation of the media that are not the subject, and/or one or more portions of the representation of the media different from and/or separate from the subject), the computer system detects (1402) (e.g., via one or more inputs devices) an input (e.g., 1350*a*, 1350*i*3, and/or 1380 as described in relation to FIGS. 13S-13T) (e.g., a dragging input, a long-press input, and/or a press-and-hold input and/or in some embodiments, a tap input, a mouse click, a mouse click followed by a hover input, an air gesture, and/or a voice input) directed to (e.g., a location in) the first portion (e.g., 1310 and/or 1320) of the representation (e.g., 1304*a*) of the visual content. In some embodiments, the second portion is the background of the first portion. In some embodiments, the location in the visual content is not in the first portion of the representation of the visual content. In some embodiments, the location in the visual content is in the first portion of the representation of the visual content. In some embodiments, the location in the visual content is in the first portion and the second portion of the representation of the visual content (e.g., where the first portion is overlaid on and/or is surrounded by the second portion of the representation of the visual content).

In response to detecting the input (e.g., 1350*a*, 1350*i*3, and/or 1380 as described in relation to FIGS. 13S-13T) directed (e.g., a location in) to the first portion of the representation of the visual content and in accordance with a determination that the first portion of the representation of the visual content includes a detected (e.g., an object that is automatically detected in and/or segmented from the visual content of a captured media item) foreground object (e.g., 1310 and/or 1320) (e.g., a person, an animal (e.g., a dog, cat, and/or frog), a plant, a flower, and/or an object) (e.g., not a user interface element and/or a part of content and/or user interface elements that are overlaid on and/or submerged under the representation of the visual content) that is represented in (e.g., that is captured in a media item that corresponds to the visual content and/or that is a part of the visual content and/or the media item that corresponds to the visual content) the visual content, the computer system displays (1404), via the display generation component, an animation (e.g., concurrently with the representation of the visual content) (e.g., an animation that changes the appearance of the detected foreground object (e.g., while the input is being detected)), including: during a first period of time while displaying the animation, displaying (1406), via the display generation component, a first portion (e.g., 1340*b*) of the animation at a location that corresponds to the detected foreground object, wherein displaying the first portion of the animation includes emphasizing (e.g., highlighting, bolding, changing the color of, and/or increasing the size of) a detected (e.g., automatically detected and/or segmented) boundary (e.g., 1310a, 1320a, and/or 1320b) (e.g., an edge, a perimeter, and/or an outside edge and/or boundary) of the detected foreground object (e.g., where the computer system highlights one or more portions of the boundary while ceasing to highlight other portions of the boundary (e.g., highlighting travels around the boundary)) during the first period of time (e.g., without emphasizing an inner portion (e.g., a portion that is inside of the detected boundary) of the foreground object). In some embodiments, as a part of displaying the animation, the computer system, during a second period of time while displaying the animation, displays, via the display generation component, a second portion of the animation is displayed at a location that corresponds to (e.g., changes and/or obstructs) at least a portion of the foreground object. In some embodiments, the second portion of the animation does not include displaying the detected boundary of the foreground object being highlight during the first period of time. In some embodiments, displaying the second period of time occurs after the first period of time. In some embodiments, in response to detecting the input directed (e.g., a location in) to the first portion of the representation of the visual content and in accordance with a determination that the first portion of the representation of the visual content does not include a detected foreground object that is represented in the visual content (e.g., a person, an animal (e.g., a dog, cat, and/or frog), a plant, a flower, and/or an object), the computer system does not display the animation and/or displays the representation of the visual content without displaying the animation. In some embodiments, the animation does not change and/or obstruct the second portion. In some embodiments, the detected boundary is an external boundary and not an internal boundary. In some embodiments, emphasizing the detected boundary of the foreground object during the first period of time includes emphasizing an external boundary (e.g., outside of a donut) of the foreground object without emphasizing an internal boundary (e.g., inside of a donut hole) of the foreground object. Displaying the animation that includes the first portion of the animation in response to detecting the input directed to the first portion of the representation of the visual content provides a user with control to display an animation for a particular foreground object and provides visual feedback that the foreground object has been selected, including visual feedback concerning the boundary of the foreground object, which provides additional control options without cluttering the user interface with additional displayed controls and provides improved visual feedback.

In some embodiments, as a part of emphasizing the detected boundary (e.g., 1310a, 1320a, and/or 1320b) of the detected foreground object (e.g., 1310 and/or 1320) the computer system changes an appearance of at least a first portion of the detected boundary from a first visual appearance to a second visual appearance. Displaying the animation that includes changing an appearance of at least a first portion of the detected boundary from a first appearance to a second appearance provides a user with control to display an animation for a particular foreground object and provides visual feedback that the foreground object has been selected, which provides additional control options without cluttering the user interface with additional displayed controls and provides improved visual feedback.

In some embodiments, as a part of emphasizing the detected boundary (e.g., 1310a, 1320a, and/or 1320b) of the detected foreground object (e.g., 1310 and/or 1320) the computer system displays, via the display generation component, an indication (e.g., 1340b) (e.g., a light, a highlighting, an object, and/or a visual representation) that travels around at least a fourth portion of the detected boundary (and/or the entirety of the detected boundary). Displaying the animation that includes displaying an indication that travels around at least a fourth portion of the detected boundary provides a user with control to display an animation for a particular foreground object and provides visual feedback that the foreground object has been selected, which provides additional control options without cluttering the user interface with additional displayed controls and provides improved visual feedback.

In some embodiments, the detected boundary (e.g., 1310a, 1320a, and/or 1320b) includes a second portion and a third portion that are (e.g., are both) displayed with a third visual appearance (e.g., a color, a highlighting, a bolding, and/or a texture) before the computer system detects the input (e.g., 1350a, 1350i3, and/or 1380 as described in relation to FIGS. 13S-13T) directed to the first portion (e.g., 1310 and/or 1320) of the representation of the visual content. In some embodiments, as a part of emphasizing the detected boundary (e.g., 1310a, 1320a, and/or 1320b) of the detected foreground object, at a first time, during the first period of time while displaying the animation, the computer system displays, via the display generation component, the second portion of the boundary (e.g., 1310a, 1320a, and/or 1320b) with a fourth visual appearance while displaying the third portion of the boundary with the third visual appearance, wherein the fourth visual appearance is different from the third visual appearance. In some embodiments, as a part of emphasizing the detected boundary (e.g., 1310a, 1320a, and/or 1320b) of the detected foreground object, at a second time, during the first period of time while displaying the animation, the computer system displays, via the display generation component, the second portion of the boundary (e.g., 1310a, 1320a, and/or 1320b) with the fourth visual appearance while displaying the third portion of the boundary with the third visual appearance. In some embodiments, the second portion includes a subset of the third portion and includes a subset that is not in the third portion. In some embodiments, the second portion is next to and/or adjacent to the third portion.

In some embodiments, the animation (e.g., 1340a and/or 1340b) is displayed within (or less than) a period of time (e.g., 0.1-1 seconds) (e.g., immediately after (e.g., abruptly after)) after detecting the input (e.g., 1350a, 1350i3, and/or 1380 as described in relation to FIGS. 13S-13T) directed to the first portion (e.g., 1310 and/or 1320) of the representation of the visual content. Displaying the animation within (or less than) a period of time after detecting the input directed to the first portion of the representation of the visual content provides a user with control to display the animation that the foreground object has been selected, which provides additional control options without cluttering the user interface with additional displayed controls and provides improved visual feedback.

In some embodiments, while displaying at least a portion of the animation, the computer system detects a subsequent input and in response to detecting the subsequent input (e.g., 1350i1, 1350i2, and/or 1350p), the computer system ceases to display the animation (e.g., 1340a and/or 1340b). Continuing to display the animation in accordance with a determination that a respective input is detected while displaying the animation and ceasing to display the animation in accordance with a determination that the respective input is not detected while displaying the animation provides the user with control over how long the animation is displayed and provides visual feedback concerning whether the foreground object has or has not remained selected, which provides additional control options without cluttering the user interface with additional displayed controls and provides improved visual feedback.

In some embodiments, displaying the animation (e.g., 1340*a* and/or 1340*b*) includes: in accordance with a determination that the detected boundary (e.g., 1310) is a first shape, displaying, via the display generation component, a first animation (e.g., 1340*a* and/or 1340*b* on 1310) (e.g., an animation that expands over a second shape and/or moves along a second path) (e.g., without displaying the second animation) and in accordance with a determination that the detected boundary (e.g., 1320) is a second shape that is different from the first shape, displaying, via the display generation component, a second animation (e.g., 1340*a* and/or 1340*b* on 1320) (e.g., an animation that expands over a second shape and/or moves along a second path) that is different from the first animation (e.g., without displaying the first animation).

In some embodiments, while displaying the animation (e.g., 1340*a* and/or 1340*b*) (e.g., during the first period of time (or another period of time)), the computer system provides non-visual feedback that corresponds to the input (e.g., 1350*a*, 1350*i3*, and/or 1380 as described in relation to FIGS. 13S-13T) directed to the first portion (e.g., 1310 and/or 1320) of the representation of the visual content (e.g., haptic feedback and/or audio feedback). In some embodiments, the computer system provides first non-visual feedback while displaying the first portion of the animation and provides second non-visual feedback while displaying another portion of the animation, where the first non-visual feedback is different from (e.g., has a different vibration and/or tone) the second non-visual feedback. Providing non-visual feedback during the first period of time while displaying the animation provides feedback that the animation is being displayed and/or that the foreground object has been selected, which provides improved feedback.

In some embodiments, in response to detecting the input (e.g., 1350*a*, 1350*i3*, and/or 1380 as described in relation to FIGS. 13S-13T) directed to the first portion (e.g., 1310 and/or 1320) of the representation of the visual content and in accordance with a determination that the first portion of the representation of the visual content does not include the detected foreground object that is represented in the visual content, the computer system forgoes displaying, via the display generation component, the animation (e.g., as described above in relation to FIGS. 13A-13Q) (e.g., irrespective of whether a different portion of the representation includes a different detected foreground object) (e.g., and/or any animation) (e.g., while continuing to display the representation). In some embodiments, in response to detecting the input directed to the first portion of the representation of the visual content and in accordance with a determination that a respective portion of the representation of the visual content includes a different detected foreground object that is represented in the visual content, the computer system does not display the animation. Choosing not to display, via the display generation component, the animation when prescribed conditions are met allows the computer system to choose not to display the animation and/or to not provide feedback that a respective foreground object is selected when the input was not directed to the respective foreground object, which performs an operation when a set of conditions has been met without requiring further user input.

In some embodiments, as a part of displaying the animation (e.g., 1340*a* and/or 1340*b*) during a second period of time while displaying the animation, the computer system displays, via the display generation component, a second portion (e.g., 1340*a*) of the animation at a second location that corresponds to the detected foreground object, wherein displaying the second portion of the animation includes emphasizing an internal region (e.g., a region that is inside of the detected boundary and/or a middle region of the detected foreground object) of the detected foreground object during the second period of time, wherein the second period of time is different from the first period of time. In some embodiments, the second period of time is after the first period of time. In some embodiments, the second period of time is before the first period of time. In some embodiments, the second period of time is outside of the first period of time. Displaying a second portion of the animation at a second location that corresponds to the detected foreground object provides visual feedback that the foreground object has been selected, including feedback of the internal region of the detected foreground object, which provides additional control options without cluttering the user interface with additional displayed controls and provides improved visual feedback.

In some embodiments, at least a portion (or all) of the second portion (e.g., 1340*a*) of the animation is displayed before the first portion (e.g., 1340*b*) of the animation starts. In some embodiments, the first portion of the animation is displayed before the second portion. In some embodiments, at least a subset of the portion of the animation is displayed before at least a subset the first portion of the animation. In some embodiments, the second portion of the animation ends before the portion of the animation, or vice-versa. In some embodiments, at least a subset of the portion of the animation is displayed concurrently with at least a subset the first portion of the animation.

In some embodiments, as a part of displaying the second portion (e.g., 1340*a*) of the animation, the computer system changes an appearance of at least a portion of the internal region of the detected foreground object (e.g., 1310 and/or 1320) without extending outside of the detected boundary (e.g., 1310*a*, 1320*a*, and 1320*b*). In some embodiments, the second portion of the animation is not applied (e.g., does not change the appearance of) to any portion of the representation that is outside of the detected boundary of the detected foreground object. Changing an appearance of the internal region of the detected foreground object without extending outside of the detected boundary as a part of displaying the second portion of the animation provides feedback that the detected foreground object is selected, including feedback about the internal region of the detected foreground object, which provides improved visual feedback.

In some embodiments, a negative space (e.g., as discussed in relation to FIGS. 13K-13N) (e.g., cut-out areas where the background of the representation is visible) (e.g., a hole in a donut) is between (e.g., positioned inside of and/or with) portions of the internal region of the detected foreground object, and wherein emphasizing the internal region of the detected foreground object includes forgoing emphasizing the negative space between the portions of the internal region of the detected foreground object. Forgoing emphasizing the negative space between the portions of the internal region of the detected foreground object as a part of emphasizing the internal region of the detected foreground object provides feedback to the user that the negative space is not a part of the selected foreground object and/or the internal region of the foreground object, which provides improved visual feedback.

In some embodiments, as a part of emphasizing the internal region of the detected foreground object the computer system expands (e.g., increasing the size of) a translucent user interface object (e.g., 1340a) (and/or a translucent region and/or plane) (and/or one or more translucent user interface objects) over at least a portion of the internal region. Expanding a translucent user interface object over the internal region provides feedback that the detected foreground object is selected, including feedback about the internal region of the detected foreground object, which provides improved visual feedback.

In some embodiments, the translucent user interface object (e.g., 1340a) includes a respective edge that is brighter than an internal portion of the translucent user interface object (and/or a second edge that is different from the first edge), and wherein expanding the translucent user interface object over the internal region includes moving the respective edge towards the boundary. Moving the respective edge that is brighter than an internal portion of the translucent user interface object as a part of expanding the translucent user interface object over the internal region provides feedback that the detected foreground object is selected, including feedback about the internal region of the detected foreground object, which provides improved visual feedback.

In some embodiments, as a part of expanding the translucent user interface object over the internal region: in accordance with a determination that the translucent user interface object has been expanded to be within (e.g., and/or an edge of the translucent user interface object is within) a predetermined distance (e.g., 0-300 mm) from the detected boundary, the computer system displays, via the display generation component, the translucent user interface object (e.g., 1340a) with a first amount of translucence and in accordance with a determination that the translucent user interface object has not been expanded to be within (e.g., and/or an edge of the translucent user interface object is not within) the predetermined distance from the detected boundary, the computer system displays, via the display generation component, the translucent user interface object (e.g., 1340a) with a second amount of translucence that is greater than (e.g., more than) the first amount of translucence. In some embodiments, as the translucent user interface object approaches the detected boundary, the computer system increases the translucence of the translucent user interface object (and/or at least a portion of the translucent user interface object). Displaying, via the display generation component, the translucent user interface object with a second amount of translucence that is greater than the first amount of translucence in accordance with a determination that the translucent user interface object has not been expanded to be within the predetermined distance from the detected boundary provides the user with feedback concerning the end of the second portion of the animation.

In some embodiments, as a part of displaying the second portion (e.g., 1340a) of the animation at the second location that corresponds to the detected foreground object (e.g., 1310 and/or 1320): in accordance with a determination that the input (e.g., 1350a, 1350i3, and/or 1380 as described in relation to FIGS. 13S-13T) directed to the first portion (e.g., 1310 and/or 1320) of the representation of the visual content was detected at a third location, the computer system starts to display (e.g., starting expansion of a translucent object) of the second portion of the animation at a location that corresponds to the third location and in accordance with a determination that the input (e.g., 1350a, 1350i3, and/or 1380 as described in relation to FIGS. 13S-13T) directed to the first portion of the representation of the visual content was detected at a fourth location that is different from the third location, the computer system starts to display (e.g., starting expansion of a translucent object) of the second portion of the animation at a location that corresponds to the fourth location, wherein the location that corresponds to the fourth location is different from the location that corresponds to the third location. Starting display of the second portion of the animation at a location that corresponds to the location of the input gives the user control over how the animation is displayed and provides feedback to the user concerning the location at which the input was detected, which provides additional control options without cluttering the user interface with additional displayed controls and provides improved visual feedback.

In some embodiments, in accordance with a determination that the detected foreground object (e.g., 1310 and/or 1320) is a first size (and/or the internal region is a first size), the second portion (e.g., 1340a) of the animation (e.g., 1340a and/or 1340b) (and/or, in some embodiments, speed of first animation) is displayed (and/or the expansion of the translucent object occurs) at a first speed and in accordance with a determination that the detected foreground object is a second size (and/or the internal region is a second size) that is different from the first size, the second portion of the animation (and/or, in some embodiments, speed of first animation) is displayed (and/or the expansion of the translucent object occurs) at a second speed that is different from the first speed. In some embodiments, when the second size is greater than the first size, the second speed is faster than the first speed (e.g., faster animation for larger object and, in some embodiments, the difference in speed has a non-linear relationship with the change in size of the object). In some embodiments, when the second size is greater than the first size, the second speed is slower than the first speed (e.g., slower animation for larger object and, in some embodiments, the difference in speed has a non-linear relationship with the change in size of the object). In some embodiments, when the second size is less than the first size, the second speed is slower than (and/or not faster) the first speed. Displaying the second portion of the animation with a speed that is based on the size of the foreground object allows the computer system to automatically control the speed at which animation is displayed for different sized foreground objects, which performs an operation when a set of conditions has been met without requiring further user input.

In some embodiments, the first portion includes the detected foreground object (e.g., 1310 and/or 1320) and a second detected foreground object that is different from the detected foreground object. In some embodiments, after displaying the animation (e.g., 1340a and/or 1340b), the computer system detects a second input (e.g., 1350a and/or 1350i3) (e.g., a dragging input, a long-press input, and/or a press-and-hold input and/or in some embodiments, a tap input, a mouse click, a mouse click followed by a hover input, an air gesture, and/or a voice input) directed to the first portion (e.g., 1310 and/or 1320) of the representation of the visual content. In some embodiments, in response to detecting the second input (or the input) directed to the first portion of the representation of the visual content: in accordance with a determination that the second input is directed to the second detected foreground object (and not directed to the detected foreground object), the computer system displays, via the display generation component, a third animation that changes a displayed appearance of the detected second foreground object without changing a displayed appearance of the first foreground object and in accordance with a determination that the second input is directed to the detected foreground object (and not directed to the second detected foreground object), the computer system displays the animation without displaying the third animation. In some embodiments, displaying the third animation includes, during the first period of time while displaying the third animation, displaying, via the display generation component, a first portion of the third animation at a location that corresponds to the second detected foreground object, where displaying the first portion of the third animation includes emphasizing a detected boundary of the second detected foreground object during the first period of time while displaying the third animation. In some embodiments, displaying the third animation includes, during a second period of time while displaying the third animation, displaying, via the display generation component, a second portion of the third animation at a second location that corresponds to the second detected foreground object, where displaying the second portion of the third animation includes emphasizing an internal region (e.g., a region that is inside of the detected boundary and/or a middle region of the detected foreground object) of the second detected foreground object during the second period of time while displaying the third animation, where the second period of time while displaying the third animation is different from the first period of time while displaying the third animation. Choosing to display the animation or the third animation the foreground object to which the second input was directed provides the user with control to choose between selecting different foreground objects based on input and provides the user with visual feedback concerning which foreground object was selected via the second input, which provides additional control options without cluttering the user interface with additional displayed controls and provides improved visual feedback.

In some embodiments, in accordance with a determination that the detected second foreground object (e.g., 1310 and/or 1320) is bigger than the detected foreground object (e.g., 1310 and/or 1320), the time to cycle through (e.g., loop through one time and/or display the animation before repeating the animation) the third animation is longer than the time to cycle through the animation and in accordance with a determination that the detected second foreground object is smaller than the detected foreground object, the time to cycle through the animation is longer than the time to cycle through the third animation. Having a time to cycle an animation for a larger object be longer than the time to cycle through a smaller object provides the user with feedback concerning the size of a foreground object.

In some embodiments, in accordance with a determination that the detected second foreground object (e.g., 1310 and/or 1320) is bigger than the detected foreground object, a speed of the third animation is greater than a speed of the animation and in accordance with a determination that the detected second foreground object (e.g., 1310 and/or 1320) is smaller than the detected foreground object, the speed of the third animation is less than the speed of the animation. Having a speed of the animation be faster for a larger object be faster than the speed of the animation for a larger object provides the user with feedback concerning the size of a foreground object.

In some embodiments, the input (e.g., 1350a, 1350i3, and/or 1380 as described in relation to FIGS. 13S-13T) directed to the first portion (e.g., 1310 and/or 1320) of the representation of the visual content is a direct input (e.g., a touch input on a touch-sensitive display at a location corresponding to the representation of the visual content or another input detected on the display generation component). Displaying the animation that includes the first portion of the animation in response to detecting a direct input that is directed to the first portion of the representation of the visual content provides a user with control to display an animation for a particular foreground object and provides visual feedback that the foreground object has been selected, including visual feedback concerning the boundary of the foreground object, which provides additional control options without cluttering the user interface with additional displayed controls and provides improved visual feedback.

In some embodiments, the input (e.g., 1350a, 1350i3, and/or 1380 as described in relation to FIGS. 13S-13T) directed to the first portion (e.g., 1310 and/or 1320) of the representation of the visual content is an indirect input (e.g., a selection input that is detected with a separate input device such as a trackpad, mouse, keyboard, or hand tracking device, while an indication of user intent such as a cursor or gaze is directed to the location corresponding to the representation of the visual content or another input that is not detected on the display generation component). Displaying the animation that includes the first portion of the animation in response to detecting an indirect input that is directed to the first portion of the representation of the visual content provides a user with control to display an animation for a particular foreground object and provides visual feedback that the foreground object has been selected, including visual feedback concerning the boundary of the foreground object, which provides additional control options without cluttering the user interface with additional displayed controls and provides improved visual feedback.

In some embodiments, as a part of displaying the animation: in accordance with a determination that the input (e.g., 1350a, 1350i3, and/or 1380 as described in relation to FIGS. 13S-13T) directed to the first portion (e.g., 1310 and/or 1320) of the representation of the visual content is a direct input, the computer system displays, via the display generation component, the first portion (e.g., 1340b) of the animation and a respective portion (e.g., the second portion of the animation, as described above) of the animation that includes emphasizing an internal region of the detected foreground object and in accordance with a determination that the input (e.g., 1350a, 1350i3, and/or 1380 as described in relation to FIGS. 13S-13T) directed to the first portion of the representation of the visual content is an indirect input, the computer system displays, via the display generation component, the first of the animation without displaying the respective portion of the animation. Choosing whether to display the first portion of the animation and a respective portion of the animation or display the first of the animation without displaying the respective portion of the animation based on the type of input that is detected (e.g., direct and/or indirect) provides the user with feedback concerning the type of input that was detected and provides the user with more control over the portions of the animation that are displayed, which provides additional control options without cluttering the user interface with additional displayed controls and provides improved visual feedback.

In some embodiments, in accordance with a determination that the input (e.g., 1350a, 1350i3, and/or 1380 as described in relation to FIGS. 13S-13T) directed to the first portion (e.g., 1310 and/or 1320) of the representation of the visual content is a direct input, the computer system provides a type of output (e.g., a haptic output and/or an audio output) and in accordance with a determination that the input directed to the first portion of the representation of the visual content is an indirect input, the computer system forgoes providing the type of output. Choosing whether or not to provide a type of input based on the type of input that is detected (e.g., direct and/or indirect) provides the user with feedback concerning the type of input that was detected and provides the user with more control over the portions of the animation that are displayed, which provides additional control options without cluttering the user interface with additional displayed controls and provides improved visual feedback.

In some embodiments, in response to detecting the input (e.g., 1350a, 1350i3, and/or 1380 as described in relation to FIGS. 13S-13T) directed to the first portion (e.g., 1310 and/or 1320) of the representation of the visual content, the computer system automatically segments the detected foreground object from the second portion (e.g., a background portion) of the representation of the visual content. In some embodiments, determining that the first portion of the representation of the visual content includes the detected foreground object that is represented in the visual content includes automatically segmenting the detected foreground object from the second portion (e.g., a background portion) of the representation of the visual content.

In some embodiments, in response to detecting the input (e.g., 1350a, 1350i3, and/or 1380 as described in relation to FIGS. 13S-13T) directed to the first portion (e.g., 1310 and/or 1320) of the representation of the visual content, the computer system displays, via the display generation component, one or more controls for performing one or more operations that correspond to the detected foreground object, wherein the one or more controls includes a first control for performing a first operation (e.g., copying/pasting, dragging/dropping, and/or saving the detected foreground with a removed background and with the second portion removed). In some embodiments, while displaying the one or more controls for performing one or more operations the computer system detects an input (e.g., 1350i1 and/or 1350i2) (e.g., a tap input, dragging input, a long-press input, and/or a press-and-hold input and/or in some embodiments, a mouse click, a mouse click followed by a hover input, an air gesture, and/or a voice input) directed to the first control (e.g., 626a and/or 626b) for performing the first operation. In some embodiments, in response to detecting the input directed to the first control for performing the first operation, the computer system performs the first operation using the detected foreground object (e.g., without using another foreground object). Performing the first operation using the detected foreground object in response to detecting the input directed to the first control for performing the first operation provides the user with additional control options corresponding to the detected foreground object, which provides additional control options without cluttering the user interface with additional displayed controls and provides improved visual feedback.

In some embodiments, the one or more controls for performing the one or more operations includes a second control (e.g., 626a and/or 626b) for performing a second operation (e.g., copying/pasting, dragging/dropping, and/or saving the detected foreground with a removed background and with the second portion removed) that is different from the first operation. In some embodiments, while displaying the one or more controls for performing one or more operations, the computer system detects an input (e.g., 1350i1 and/or 1350i2) (e.g., a tap input, a dragging input, a long-press input, and/or a press-and-hold input and/or in some embodiments, a mouse click, a mouse click followed by a hover input, an air gesture, and/or a voice input) directed to the second control for performing the second operation (e.g., as described above methods 700 and 800 (e.g., copying a subject and/or copying a subject without a background)). In some embodiments, in response to detecting the input directed to the second control for performing the second operation, the computer system performs the second operation using the detected foreground object (e.g., without using another foreground object) operation (e.g., as described above methods 700 and 800 (e.g., copying a subject and/or copying a subject without a background)). Performing the second operation using the detected foreground object in response to detecting the input directed to the first control for performing the first operation provides the user with additional control options corresponding to the detected foreground object, which provides additional control options without cluttering the user interface with additional displayed controls and provides improved visual feedback.

Note that details of the processes described above with respect to method 1400 (e.g., FIG. 14) are also applicable in an analogous manner to the methods described above. For example, method 1400 optionally includes one or more of the characteristics of the various methods described above with reference to methods 700 and 800. For example, method 1400 can be used display animations for detected objects that have been selected to perform one or more processes involving the detected object based on methods 700 and 800. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of media representations, including identifying various subjects and/or objects in media representations. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to manage media representations, including identifying subjects and/or objects in the media representations that are of greater interest to the user. Accordingly, use of such personal information data enables users to have calculated control of the management of media representations. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing media representations, the present technology can be configured to allow users to select to "opt in" or "opt out" of participation in the collection of personal information data during registration for services or anytime thereafter. In another example, users can select not to provide certain data, such as data used to identify subjects in media representations that are identified and/or collected from the users' devices (e.g., information associated with one or more contacts of a particular user). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, subjects and/or objects can be identified in media representations for users by inferring preferences based on non-personal information data or a bare minimum amount of personal information, such as the content being requested by the device associated with a user, other non-personal information available to the media representation management services, or publicly available information.

What is claimed is:

1. A non-transitory computer-readable storage medium storing one or more programs configured to be executed by one or more processors of a computer system that is in communication with a display generation component, the one or more programs including instructions for:
   detecting a request to display a user interface that corresponds to a media item; and
   in response to detecting the request to display the user interface that corresponds to the media item, displaying, via the display generation component, the user interface that corresponds to the media item, including:
      in accordance with a determination that a subject has automatically been detected in the media item without user input that identifies the subject, displaying, via the display generation component, a respective visual indication that the subject was automatically detected in the media item without user input; and
      in accordance with a determination that the subject has not automatically been detected in the media item, forgoing display of the respective visual indication;
   while displaying the respective visual indication that the subject was automatically detected in the media item without user input, detecting an input directed to a location of the respective visual indication; and
   in response to detecting the input directed to the location of the respective visual indication, displaying, via the display generation component, a selectable user interface object that, when selected, initiates a process for copying the subject in the media item without copying another portion of the media item.

2. The non-transitory computer-readable storage medium of claim 1, wherein the media item is an image or a video.

3. The non-transitory computer-readable storage medium of claim 1, the one or more programs further including instructions for:
   in response to detecting the request to display the user interface that corresponds to the media item, displaying, via the display generation component, the user interface that corresponds to the media item, including:

displaying, via the display generation component, a representation of the media item; and in accordance with a determination that the subject has automatically been detected in the media item, selecting a boundary between the portion of the media item in the representation of the media item and the subject.

4. The non-transitory computer-readable storage medium of claim 1, the one or more programs further including instructions for:

in accordance with a determination that the subject has automatically been detected in the media item, displaying, via the display generation component, a second user interface object that, when selected, copies the subject in the media item without copying the portion of the media item.

5. The non-transitory computer-readable storage medium of claim 4, wherein the second user interface object is displayed concurrently with a third user interface object that, when selected, causes the computer system to copy the subject and the portion of the media item, and wherein the second user interface object and the third user interface object are displayed in a first menu.

6. The non-transitory computer-readable storage medium of claim 1, the one or more programs further including instructions for:

in response to detecting the request to display the user interface that corresponds to the media item, displaying, via the display generation component, the user interface that corresponds to the media item, including:

in accordance with a determination that the subject has automatically been detected in the media item, displaying, via the display generation component, a fourth user interface object that, when selected, causes the computer system to visually emphasize the subject relative to the portion of the media item.

7. The non-transitory computer-readable storage medium of claim 1, the one or more programs further including instructions for:

in response to detecting the request to display the user interface that corresponds to the media item, displaying, via the display generation component, the user interface that corresponds to the media item, including:

in accordance with a determination that the subject has automatically been detected in the media item, displaying, via the display generation component, a fifth user interface object that, when selected, causes the computer system to create a graphical user interface object that includes the subject and does not include the portion of the media item.

8. The non-transitory computer-readable storage medium of claim 1, wherein the user interface that corresponds to the media item is displayed in a respective application that is different from a media editing application.

9. The non-transitory computer-readable storage medium of claim 1, wherein the user interface that corresponds to the media item is displayed in a respective application, and wherein the respective application is a file manager application.

10. The non-transitory computer-readable storage medium of claim 1, wherein the user interface that corresponds to the media item is displayed in a respective application, and wherein the respective application is a file viewer application.

11. The non-transitory computer-readable storage medium of claim 1, wherein the user interface that corresponds to the media item is displayed in a respective application, and wherein the respective application is a productivity application.

12. The non-transitory computer-readable storage medium of claim 1, wherein detecting the request to display the user interface that corresponds to the media item includes detecting a pointer activation event.

13. The non-transitory computer-readable storage medium of claim 1, wherein displaying, via the display generation component, the user interface includes displaying, via the display generation component, a representation of the media item, the one or more programs further including instructions for:

in accordance with the determination that the subject has automatically been detected in the media item without user input that identifies the subject, displaying, via the display generation component, a first user interface object;

after detecting the request to display the user interface that corresponds to the media item and while displaying the representation of the media item and the first user interface object, detecting a first input directed to the first user interface object; and in response to detecting the first input directed to the first user interface object and in accordance with a determination that the first input has been directed to the first user interface object for more than a predetermined period of time, displaying, via the display generation component, an indication that corresponds to the portion of the media item.

14. The non-transitory computer-readable storage medium of claim 13, wherein displaying the indication that corresponds to the portion of the media item includes visually deemphasizing the portion of the media item in the representation of the media item.

15. The non-transitory computer-readable storage medium of claim 1, wherein detecting the request to display the user interface that corresponds to the media item includes detecting a request to display a sharing user interface.

16. The non-transitory computer-readable storage medium of claim 1, the one or more programs further including instructions for:

in accordance with the determination that the subject has automatically been detected in the media item without user input that identifies the subject, displaying, via the display generation component, a first user interface object;

while displaying the first user interface object, detecting an input corresponding to selection of the first user interface object; and in response to detecting the input corresponding to selection of the first user interface object, altering display of a portion of the media item in a representation of the media item without altering display of the subject in the representation of the media item, wherein altering display of the portion of the media item in the representation of the media item without altering display of the subject in the representation of the media item includes forgoing altering visual content of the media item.

17. The non-transitory computer-readable storage medium of claim 1, the one or more programs further including instructions for:

in accordance with the determination that the subject has automatically been detected in the media item without user input that identifies the subject, displaying, via the display generation component, a first user interface object, wherein the first user interface object is overlaid on one or more portions of a representation of the media item.

18. The non-transitory computer-readable storage medium of claim 1, the one or more programs further including instructions for:
in accordance with the determination that the subject has automatically been detected in the media item without user input that identifies the subject, displaying, via the display generation component, a first user interface object;
while displaying the first user interface object, detecting a second input directed to the first user interface object; and
in response to detecting the second input directed to the first user interface object:
in accordance with a determination that display of the portion of the media item in a representation of the media item and display of the subject in the media item in the representation of the media item is not altered, altering display of the portion of the media item in the representation of the media item without altering display of the subject in the media item in the representation of the media item; and
in accordance with a determination that display of the portion of the media item in the representation of the media item is altered without display of the subject in the media item in the representation of the media item being altered, forgoing altering display of the portion of the media item in the representation of the media item without altering display of the subject in the media item in the representation of the media item.

19. The non-transitory computer-readable storage medium of claim 1, wherein the request to display the user interface that corresponds to the media item is a request to display a second menu.

20. The non-transitory computer-readable storage medium of claim 1, the one or more programs further including instructions for:
in accordance with the determination that the subject has automatically been detected in the media item without user input that identifies the subject, displaying, via the display generation component, a first user interface object;
while displaying the first user interface object, detecting a third input directed to the first user interface object; and
in response to detecting the third input directed to the first user interface object, displaying a second representation of the media item that includes the subject and does not include the portion of the media item.

21. The non-transitory computer-readable storage medium of claim 20, the one or more programs further including instructions for:
in response to detecting the third input directed to the first user interface object, displaying a sixth user interface object that, when selected, displays a third representation of the media item that includes the subject and includes the portion of the media item.

22. A method, comprising:
at a computer system that is in communication with a display generation component:
detecting a request to display a user interface that corresponds to a media item; and
in response to detecting the request to display the user interface that corresponds to the media item, displaying, via the display generation component, the user interface that corresponds to the media item, including:
in accordance with a determination that a subject has automatically been detected in the media item without user input that identifies the subject, displaying, via the display generation component, a respective visual indication that the subject was automatically detected in the media item without user input; and
in accordance with a determination that the subject has not automatically been detected in the media item, forgoing display of the respective visual indication;
while displaying the respective visual indication that the subject was automatically detected in the media item without user input, detecting an input directed to a location of the respective visual indication; and
in response to detecting the input directed to the location of the respective visual indication, displaying, via the display generation component, a selectable user interface object that, when selected, initiates a process for copying the subject in the media item without copying another portion of the media item.

23. A computer system that is configured to communicate with a display generation component, the computer system comprising:
one or more processors; and
memory storing one or more programs configured to be executed by the one or more processors, the one or more programs including instructions for:
detecting a request to display a user interface that corresponds to a media item; and
in response to detecting the request to display the user interface that corresponds to the media item, displaying, via the display generation component, the user interface that corresponds to the media item, including:
in accordance with a determination that a subject has automatically been detected in the media item without user input that identifies the subject, displaying, via the display generation component, a respective visual indication that the subject was automatically detected in the media item without user input; and
in accordance with a determination that the subject has not automatically been detected in the media item, forgoing display of respective visual indication;
while displaying the respective visual indication that the subject was automatically detected in the media item without user input, detecting an input directed to a location of the respective visual indication; and
in response to detecting the input directed to the location of the respective visual indication, displaying, via the display generation component, a selectable user interface object that, when selected, initiates a process for copying the subject in the media item without copying another portion of the media item.

24. The method of claim 22, further comprising:
in response to detecting the request to display the user interface that corresponds to the media item, displaying, via the display generation component, the user interface that corresponds to the media item, including:
displaying, via the display generation component, a representation of the media item; and
in accordance with a determination that the subject has automatically been detected in the media item, selecting a boundary between the portion of the media item in the representation of the media item and the subject.

25. The method of claim 22, further comprising:
in accordance with a determination that the subject has automatically been detected in the media item, displaying, via the display generation component, a second user interface object that, when selected, copies the subject in the media item without copying the portion of the media item.

26. The method of claim 22, further comprising:
in response to detecting the request to display the user interface that corresponds to the media item, displaying, via the display generation component, the user interface that corresponds to the media item, including:
in accordance with a determination that the subject has automatically been detected in the media item, displaying, via the display generation component, a fourth user interface object that, when selected, causes the computer system to visually emphasize the subject relative to the portion of the media item.

27. The method of claim 22, further comprising:
in response to detecting the request to display the user interface that corresponds to the media item, displaying, via the display generation component, the user interface that corresponds to the media item, including:
in accordance with a determination that the subject has automatically been detected in the media item, displaying, via the display generation component, a fifth user interface object that, when selected, causes the computer system to create a graphical user interface object that includes the subject and does not include the portion of the media item.

28. The method of claim 22, wherein the user interface that corresponds to the media item is displayed in a respective application that is different from a media editing application.

29. The method of claim 22, wherein displaying, via the display generation component, the user interface includes displaying, via the display generation component, a representation of the media item, the method further comprising:
in accordance with the determination that the subject has automatically been detected in the media item without user input that identifies the subject, displaying, via the display generation component, a first user interface object;
after detecting the request to display the user interface that corresponds to the media item and while displaying the representation of the media item and the first user interface object, detecting a first input directed to the first user interface object; and
in response to detecting the first input directed to the first user interface object and in accordance with a determination that the first input has been directed to the first user interface object for more than a predetermined period of time, displaying, via the display generation component, an indication that corresponds to the portion of the media item.

30. The method of claim 22, wherein detecting the request to display the user interface that corresponds to the media item includes detecting a request to display a sharing user interface.

31. The method of claim 22, further comprising:
in accordance with the determination that the subject has automatically been detected in the media item without user input that identifies the subject, displaying, via the display generation component, a first user interface object;
while displaying the first user interface object, detecting an input corresponding to selection of the first user interface object; and
in response to detecting the input corresponding to selection of the first user interface object, altering display of a portion of the media item in a representation of the media item without altering display of the subject in the representation of the media item, wherein altering display of the portion of the media item in the representation of the media item without altering display of the subject in the representation of the media item includes forgoing altering visual content of the media item.

32. The method of claim 22, further comprising:
in accordance with the determination that the subject has automatically been detected in the media item without user input that identifies the subject, displaying, via the display generation component, a first user interface object, wherein the first user interface object is overlaid on one or more portions of a representation of the media item.

33. The method of claim 22, further comprising:
in accordance with the determination that the subject has automatically been detected in the media item without user input that identifies the subject, displaying, via the display generation component, a first user interface object;
while displaying the first user interface object, detecting a second input directed to the first user interface object; and
in response to detecting the second input directed to the first user interface object:
in accordance with a determination that display of the portion of the media item in a representation of the media item and display of the subject in the media item in the representation of the media item is not altered, altering display of the portion of the media item in the representation of the media item without altering display of the subject in the media item in the representation of the media item; and
in accordance with a determination that display of the portion of the media item in the representation of the media item is altered without display of the subject in the media item in the representation of the media item being altered, forgoing altering display of the portion of the media item in the representation of the media item without altering display of the subject in the media item in the representation of the media item.

34. The method of claim 22, wherein the request to display the user interface that corresponds to the media item is a request to display a second menu.

35. The method of claim 22, further comprising:
in accordance with the determination that the subject has automatically been detected in the media item without user input that identifies the subject, displaying, via the display generation component, a first user interface object;
while displaying the first user interface object, detecting a third input directed to the first user interface object; and in response to detecting the third input directed to the first user interface object, displaying a second representation of the media item that includes the subject and does not include the portion of the media item.

36. The computer system of claim 23, the one or more programs further including instructions for:
in response to detecting the request to display the user interface that corresponds to the media item, displaying, via the display generation component, the user interface that corresponds to the media item, including:
displaying, via the display generation component, a representation of the media item; and
in accordance with a determination that the subject has automatically been detected in the media item, selecting a boundary between the portion of the media item in the representation of the media item and the subject.

37. The computer system of claim 23, the one or more programs further including instructions for:
in accordance with a determination that the subject has automatically been detected in the media item, displaying, via the display generation component, a second user interface object that, when selected, copies the subject in the media item without copying the portion of the media item.

38. The computer system of claim 23, the one or more programs further including instructions for:
in response to detecting the request to display the user interface that corresponds to the media item, displaying, via the display generation component, the user interface that corresponds to the media item, including:
in accordance with a determination that the subject has automatically been detected in the media item, displaying, via the display generation component, a fourth user interface object that, when selected, causes the computer system to visually emphasize the subject relative to the portion of the media item.

39. The computer system of claim 23, the one or more programs further including instructions for:
in response to detecting the request to display the user interface that corresponds to the media item, displaying, via the display generation component, the user interface that corresponds to the media item, including:
in accordance with a determination that the subject has automatically been detected in the media item, displaying, via the display generation component, a fifth user interface object that, when selected, causes the computer system to create a graphical user interface object that includes the subject and does not include the portion of the media item.

40. The computer system of claim 23, wherein the user interface that corresponds to the media item is displayed in a respective application that is different from a media editing application.

41. The computer system of claim 23, wherein displaying, via the display generation component, the user interface includes displaying, via the display generation component, a representation of the media item, the one or more programs further including instructions for:
in accordance with the determination that the subject has automatically been detected in the media item without user input that identifies the subject, displaying, via the display generation component, a first user interface object;
after detecting the request to display the user interface that corresponds to the media item and while displaying the representation of the media item and the first user interface object, detecting a first input directed to the first user interface object; and
in response to detecting the first input directed to the first user interface object and in accordance with a determination that the first input has been directed to the first user interface object for more than a predetermined period of time, displaying, via the display generation component, an indication that corresponds to the portion of the media item.

42. The computer system of claim 23, wherein detecting the request to display the user interface that corresponds to the media item includes detecting a request to display a sharing user interface.

43. The computer system of claim 23, the one or more programs further including instructions for:
in accordance with the determination that the subject has automatically been detected in the media item without user input that identifies the subject, displaying, via the display generation component, a first user interface object;
while displaying the first user interface object, detecting an input corresponding to selection of the first user interface object; and
in response to detecting the input corresponding to selection of the first user interface object, altering display of a portion of the media item in a representation of the media item without altering display of the subject in the representation of the media item, wherein altering display of the portion of the media item in the representation of the media item without altering display of the subject in the representation of the media item includes forgoing altering visual content of the media item.

44. The computer system of claim 23, the one or more programs further including instructions for:
in accordance with the determination that the subject has automatically been detected in the media item without user input that identifies the subject, displaying, via the display generation component, a first user interface object, wherein the first user interface object is overlaid on one or more portions of a representation of the media item.

45. The computer system of claim 23, the one or more programs further including instructions for:
in accordance with the determination that the subject has automatically been detected in the media item without user input that identifies the subject, displaying, via the display generation component, a first user interface object;
while displaying the first user interface object, detecting a second input directed to the first user interface object; and
in response to detecting the second input directed to the first user interface object:
in accordance with a determination that display of the portion of the media item in a representation of the media item and display of the subject in the media item in the representation of the media item is not altered, altering display of the portion of the media item in the representation of the media item without altering display of the subject in the media item in the representation of the media item; and
in accordance with a determination that display of the portion of the media item in the representation of the media item is altered without display of the subject in the media item in the representation of the media item being altered, forgoing altering display of the portion of the media item in the representation of the media item without altering display of the subject in the media item in the representation of the media item.

46. The computer system of claim 23, wherein the request to display the user interface that corresponds to the media item is a request to display a second menu.

47. The computer system of claim 23, the one or more programs further including instructions for:
- in accordance with the determination that the subject has automatically been detected in the media item without user input that identifies the subject, displaying, via the display generation component, a first user interface object;
- while displaying the first user interface object, detecting a third input directed to the first user interface object; and
- in response to detecting the third input directed to the first user interface object, displaying a second representation of the media item that includes the subject and does not include the portion of the media item.

* * * * *